(12) United States Patent
Hayashida

(10) Patent No.: US 10,019,828 B2
(45) Date of Patent: Jul. 10, 2018

(54) IMAGE GENERATING APPARATUS, IMAGE GENERATING SYSTEM, AND NON-TRANSITORY COMPUTER-READABLE STORAGE MEDIUM

(71) Applicant: FUJITSU LIMITED, Kawasaki-shi, Kanagawa (JP)

(72) Inventor: Naoko Hayashida, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/286,089

(22) Filed: Oct. 5, 2016

(65) Prior Publication Data
US 2017/0103564 A1    Apr. 13, 2017

(30) Foreign Application Priority Data
Oct. 8, 2015 (JP) ................. 2015-200553

(51) Int. Cl.
| | |
|---|---|
| G06T 13/80 | (2011.01) |
| G06F 3/01 | (2006.01) |
| G06F 3/048 | (2013.01) |
| H04N 7/15 | (2006.01) |
| A63F 13/211 | (2014.01) |

(Continued)

(52) U.S. Cl.
CPC ............ *G06T 13/80* (2013.01); *A63F 13/211* (2014.09); *A63F 13/212* (2014.09); *A63F 13/213* (2014.09); *A63F 13/56* (2014.09); *A63F 13/58* (2014.09); *G06F 3/011* (2013.01); *G06F 3/048* (2013.01); *H04N 7/15* (2013.01); *A63F 13/35* (2014.09); *A63F 13/5255* (2014.09); *A63F 2300/6607* (2013.01); *G06T 19/006* (2013.01)

(58) Field of Classification Search
USPC .................................................... 345/419, 473
See application file for complete search history.

(56) References Cited

U.S. PATENT DOCUMENTS

| | | | |
|---|---|---|---|
| 8,390,680 B2* | 3/2013 | Perez ...................... | G06F 3/017 345/474 |
| 8,451,278 B2* | 5/2013 | Geisner ................... | G06F 3/011 345/474 |

(Continued)

FOREIGN PATENT DOCUMENTS

| | | |
|---|---|---|
| JP | 2012-525643 | 10/2012 |
| JP | 2014-522018 | 8/2014 |

(Continued)

*Primary Examiner* — Kimbinh T Nguyen
(74) *Attorney, Agent, or Firm* — Fujitsu Patent Center

(57) ABSTRACT

An image generating apparatus, including a memory storing avatar data representing a motion of an avatar in a virtual space and a processor coupled to the memory and the processor configured to obtain sensor information that represents a motion of a person in a real space acquired from at least one sensor, determine a first value that indicates an impression of the person based on the obtained sensor information, determine a type of the motion based on the obtained sensor information, select at least one candidate data set corresponding to the type of the motion from the memory, determine a second value that indicates impression of the avatar for each of the selected at least one data set, select a representative data set based on the determined first value and the determined second value, and generate an avatar image based on the representative data set.

9 Claims, 51 Drawing Sheets

(51) Int. Cl.
    *A63F 13/213*     (2014.01)
    *A63F 13/212*     (2014.01)
    *A63F 13/58*     (2014.01)
    *A63F 13/56*     (2014.01)
    *G06T 19/00*     (2011.01)
    *A63F 13/35*     (2014.01)
    *A63F 13/5255*     (2014.01)

(56) References Cited

U.S. PATENT DOCUMENTS

| | | | | |
|---|---|---|---|---|
| 8,483,436 | B2* | 7/2013 | Lee | G06K 9/00362 |
| | | | | 345/418 |
| 8,610,723 | B2* | 12/2013 | Lee | G06T 13/40 |
| | | | | 345/473 |
| 8,744,121 | B2* | 6/2014 | Polzin | G06K 9/00342 |
| | | | | 382/103 |
| 2012/0327089 | A1* | 12/2012 | Lee | G06T 17/00 |
| | | | | 345/473 |
| 2013/0038601 | A1* | 2/2013 | Han | G06T 13/40 |
| | | | | 345/419 |
| 2013/0249947 | A1* | 9/2013 | Reitan | G06F 3/011 |
| | | | | 345/633 |
| 2014/0002580 | A1* | 1/2014 | Bear | H04N 5/445 |
| | | | | 348/14.07 |
| 2015/0077434 | A1* | 3/2015 | Fukuchi | G06F 3/011 |
| | | | | 345/633 |

FOREIGN PATENT DOCUMENTS

| | | |
|---|---|---|
| WO | 2010/126816 | 11/2010 |
| WO | 2012/177643 | 12/2012 |

\* cited by examiner

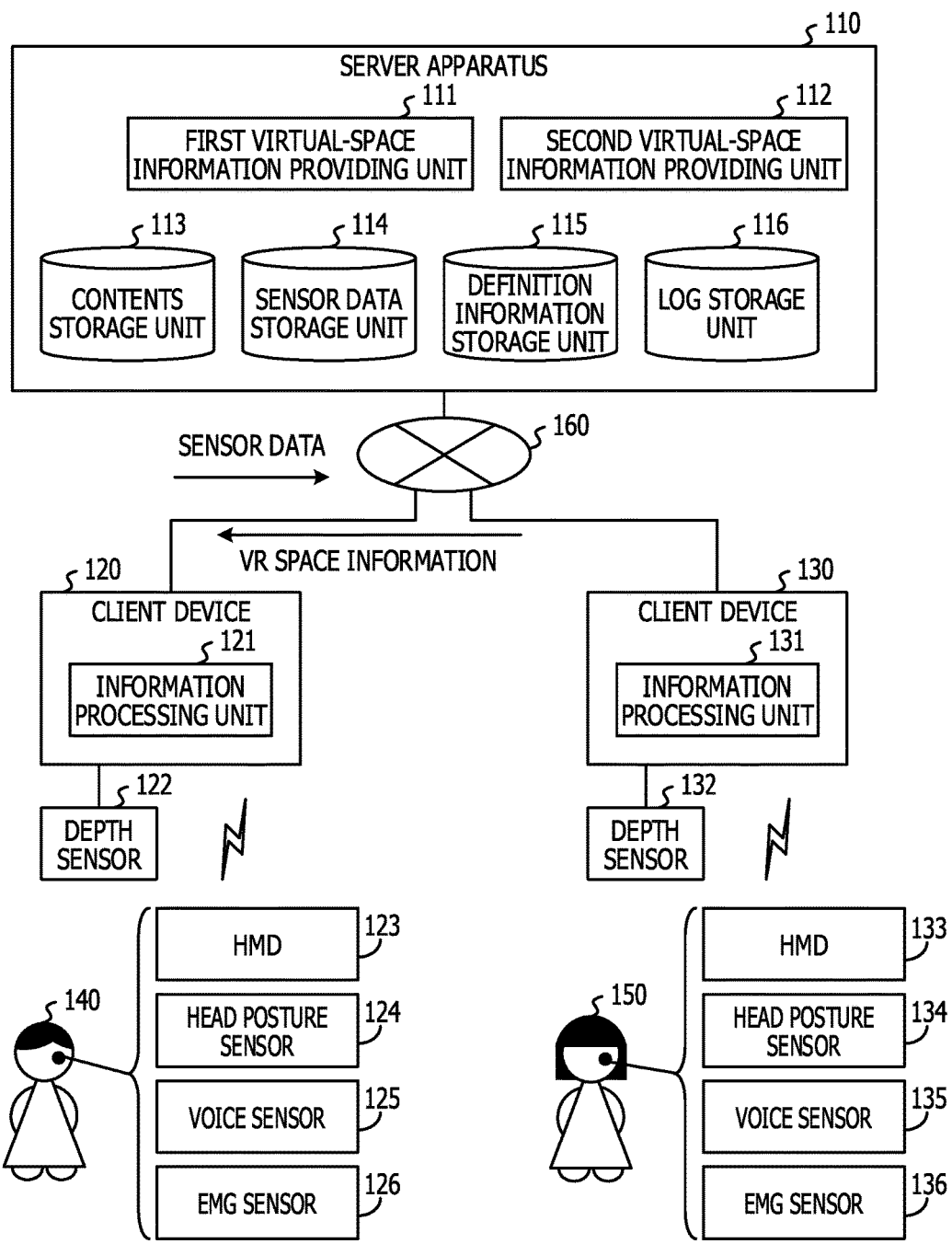

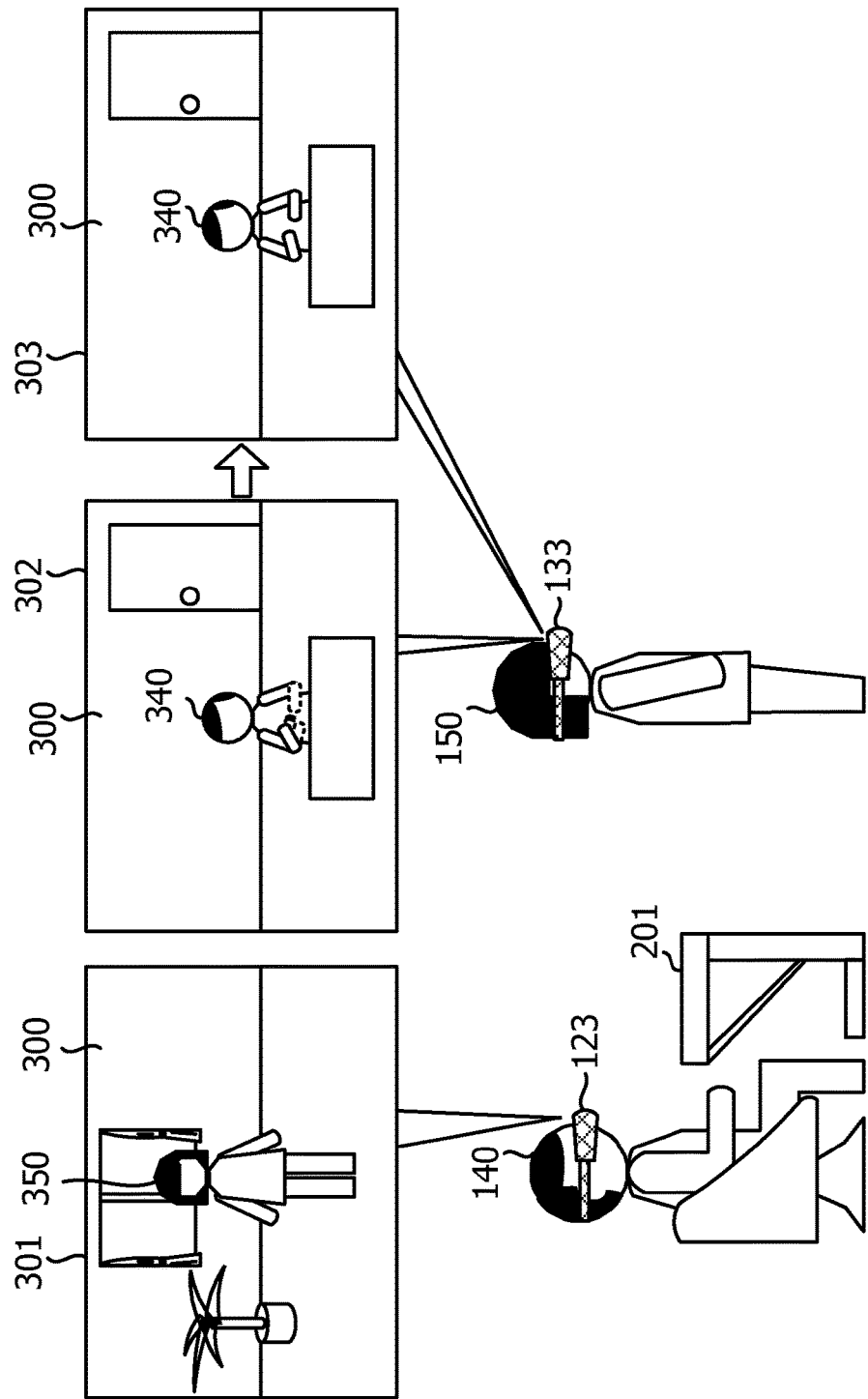

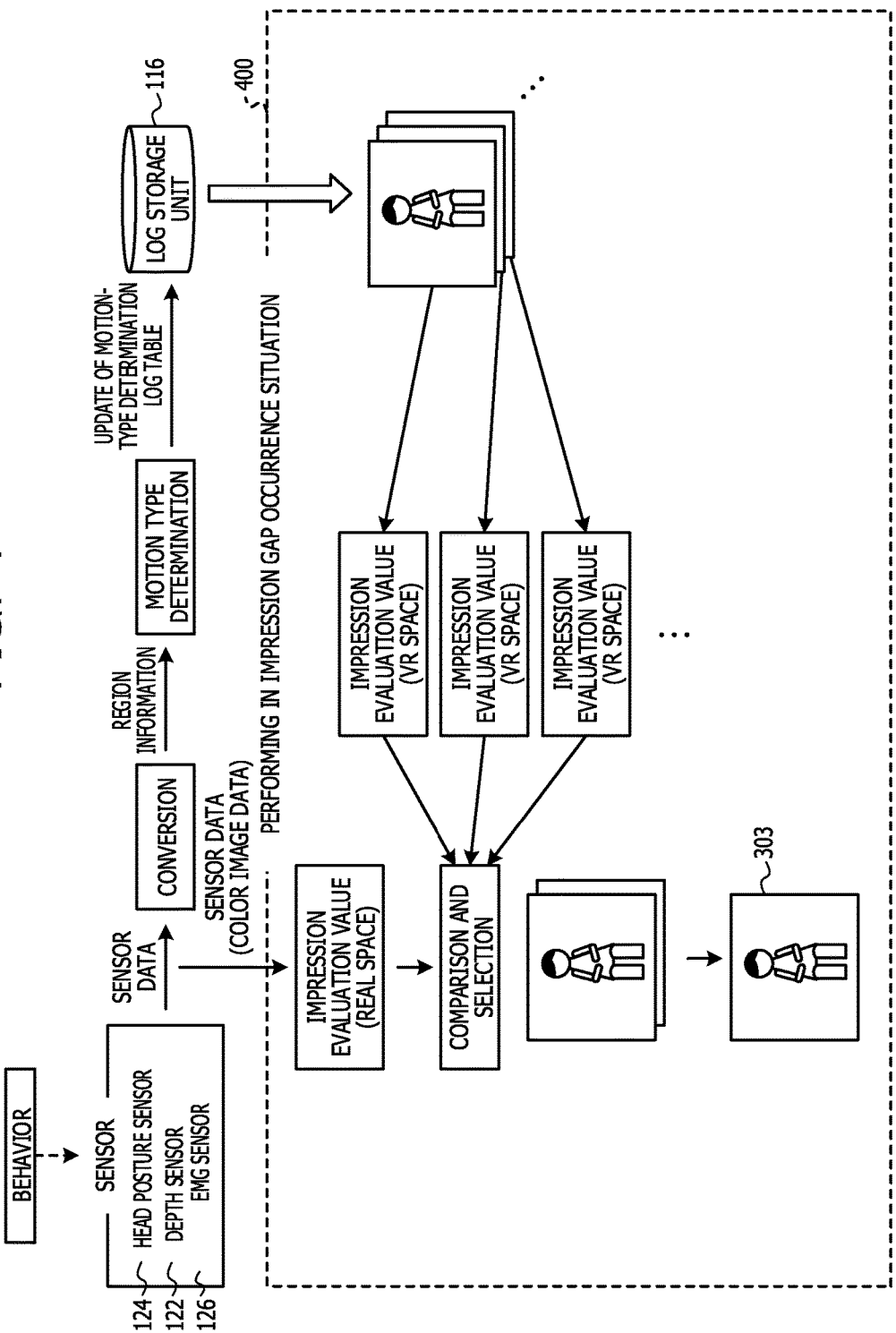

FIG. 11

| HEAD-POSTURE DATA TABLE | | | | |
|---|---|---|---|---|
| RECORDING TIME STAMP | DATA ACQUISITION TIME STAMP | USER NAME | CLIENT DEVICE ID (SENSOR ID) | HEAD POSTURE DATA (POSITION, ANGLE) |
| ⋮ | ⋮ | ⋮ | ⋮ | ⋮ |
| 2015/7/27 11:00:01.030 | 2015/7/27 11:00:00.000 | A | c1 (s1) | (0,18-10),(0,0,0) |
| 2015/7/27 11:00:03.025 | 2015/7/27 11:00:02.000 | A | c1 (s1) | (0,18-10),(0,0,1) |
| 2015/7/27 11:00:05.069 | 2015/7/27 11:00:04.000 | A | c1 (s1) | (0,18-10),(0,0,2.5) |
| ⋮ | ⋮ | ⋮ | ⋮ | ⋮ |

FIG. 12

HEAD-POSTURE DATA TABLE 1200

| RECORDING TIME STAMP | DATA-ACQUISITION START TIME STAMP | DATA-ACQUISITION END TIME STAMP | USER NAME | CLIENT DEVICE ID (SENSOR ID) | DEPTH DATA FILE URI |
|---|---|---|---|---|---|
| ... | ... | ... | ... | ... | ... |
| 2015/7/27 11:00:01.030 | 2015/7/27 11:00:00.000 | 2015/7/27 11:00:01.000 | A | c1 (s2) | 001.xef |
| 2015/7/27 11:00:03.025 | 2015/7/27 11:00:02.000 | 2015/7/27 11:00:03.000 | A | c1 (s2) | 002.xef |
| 2015/7/27 11:00:05.069 | 2015/7/27 11:00:04.000 | 2015/7/27 11:00:05.000 | A | c1 (s2) | 003.xef |
| ... | ... | ... | ... | ... | ... |

FIG. 13

| HEAD-POSTURE DATA TABLE | | | | | 1300 |
|---|---|---|---|---|
| RECORDING TIME STAMP | DATA ACQUISITION TIME STAMP | USER NAME | CLIENT DEVICE ID (SENSOR ID) | EMG DATA (EMG (V)) |
| ⋮ | ⋮ | ⋮ | ⋮ | ⋮ |
| 2015/7/27 11:00:01.035 | 2015/7/27 11:00:01.000 | A | c1 (s3_zygomaticus(cheek)) | 33.9 |
| 2015/7/27 11:00:01.040 | 2015/7/27 11:00:01.010 | A | c1 (s3_orbicularis(undereye)) | 52.0 |
| 2015/7/27 11:00:01.050 | 2015/7/27 11:00:01.040 | A | c1 (s3_corrugator(brow)) | 20.2 |
| ⋮ | ⋮ | ⋮ | ⋮ | ⋮ |

FIG. 15

DEFINITION INFORMATION (FOR BEHAVIOR) 1500

| TYPE OF MOTION | THRESHOLD VALUE | REGION TO BE MONITORED | SENSOR DATA | SENSOR ID |
|---|---|---|---|---|
| ... | ... | ... | ... | ... |
| LEAN FORWARD | (*,*,*),(+5,*,*) | Bone_Chest | DEPTH DATA | s2 |
| FACE DIRECTION CHANGE | ((*,*,*),(+5,*,*))‖((*,*,*),(*,+5,*))‖((*,*,*),(*,*,+5)) | Bone_Head | HEAD POSTURE DATA | s1 |
| MOUTH representION CHANGE | IsSmile(>0.5) | Shape_Mouth | EMG DATA | s3 |
| ... | ... | ... | ... | ... |

FIG. 16

MOTION-TYPE DETERMINATION LOG TABLE 1600

| RECORDING TIME STAMP | CHANGE OCCURRENCE TIME STAMP | USER NAME | CLIENT DEVICE ID | TYPE OF MOTION | REGION INFORMATION BEFORE CHANGE AND AFTER CHANGE |
|---|---|---|---|---|---|
| ... | ... | ... | ... | ... | ... 1601 |
| 2015/7/27 11:02:00.000 | 2015/7/27 11:00:01.000 | A | c1 | MOUTH representION CHANGE | Shape_Mouth IsSmile from (0.5) To (0.8) |
| 2015/7/27 11:02:01.050 | 2015/7/27 11:00:04.000 | A | c1 | FACE DIRECTION CHANGE | Bone_Head From ((0,18,-10),(0,1,0)) To ((0,18,-10),(0,30,0)) |
| 2015/7/27 11:02:02.000 | 2015/7/27 11:01:05.000 | A | c1 | FACE DIRECTION CHANGE | Bone_Chest From ((0,8,-10),(4,0,0)) To ((0,8,-10),(10.0,0)) |
| 2015/7/27 11:02:03.000 | 2015/7/27 11:02:02.040 | A | c1 | LEAN FORWARD | Bone_Chest From ((1,8,-10),(9,0,0)) To ((0,8,-10),(12.0,0)) |
| ... | ... | ... | ... | ... | ... |

AVATAR REGION CHANGING DATA (MODEL CANDIDATE)

<Human><Head><Bone>((0, 18, -10), (0, 1, 0))</Bone>
 <RightEye>...
</Head>
<Neck><Bone>...
<RightShoulder>...
</Neck>
<Spine>...</Spine>
<Chest>...</Chest>
<Hip><RightUppLeg>..</RightUppLeg>
<LeftUppLeg>..</LeftUppLeg>
...
            </Hip></Human>
```

| RECORDING TIME STAMP | DATA ACQUISITION TIME STAMP | USER NAME | CLIENT DEVICE ID | AVATAR-REGION CHANGING TYPE | AVATAR REGION CHANGING DATA |
|---|---|---|---|---|---|
| ... | ... | ... | ... | ... | ... |
| 2015/7/27 11:00:00:020 | 2015/7/27 11:00:00:000 | A | c1 | particle | HumanParticlesMatrix☐ |
| 2015/7/27 11:00:03:025 | 2015/7/27 11:00:02:000 | A | c1 | bone | \<Human\>\<Head\>\<Bone\>((0,19,-10),(0,1,0))\</Bone\><br>\<RightEye\>....<br>\</Head\><br>\<Neck\>\<Bone\>....<br>\<RightShoulder\>....<br>\</Neck\><br>\<Spine\>....\</Spine\><br>\<Chest\>....\</Chest\><br>\<Hip\>\<RightUppLeg\>..\</ReighUppLeg\><br>\<LeftUppLeg\>..\</LeftUppLeg\><br>...<br>\</Hip\>\</Human\> |
| 2015/7/27 11:01:05:069 | 2015/7/27 11:00:04:000 | A | c1 | mesh | \<Human\>\<Head\>\<Mesh\>HeadMeshesMatrix☐\</Mesh\><br>\<RightEye\>....<br>\</Head\><br>\<Neck\>\<Bone\>....<br>\<RightShoulder\>....<br>\</Neck\><br>\<Spine\>....\</Spine\><br>\<Chest\>....\</Chest\><br>\<Hip\>\<RightUppLeg\>..\</ReighUppLeg\><br>\<LeftUppLeg\>..\</LeftUppLeg\><br>...<br>\</Hip\>\</Human\> |
| ... | | | | | ... |

FIG. 22A

| DEFINITION INFORMATION (API) | | ~2201 |
|---|---|---|
| TYPE OF MOTION | API | |
| LEAN FORWARD | POSTURE ANALYSIS API | |
| FACE DIRECTION CHANGE | FACE DIRECTION ANALYSIS API | |
| MOUTH representION CHANGE | MOUTH representION ANALYSIS API | |
| ⋮ | ⋮ | |
| ⋮ | ⋮ | |

| DEFINITION INFORMATION (FOR SOCIAL BEHAVIOR) | | | |
|---|---|---|---|
| TYPE OF MOTION FOR ANOTHER AVATAR | API | SENSOR DATA | SENSOR ID |
| ⋮ | ⋮ | ⋮ | ⋮ |
| body-close-to | POSTURE ANALYSIS API | DEPTH DATA | s2 |
| body-far-to | POSTURE ANALYSIS API | DEPTH DATA | s2 |
| face-close-to | FACE DIRECTION ANALYSIS API | HEAD POSTURE DATA | s1 |
| ⋮ | ⋮ | ⋮ | ⋮ |

FIG. 23

| DEFINITION INFORMATION (TENDENCY OF CLOSENESS/TENDENCY OF AVERTING) | ~2300 |
|---|---|
| TYPE OF MOTION FOR ANOTHER AVATAR | TENDENCY OF CLOSENESS/ TENDENCY OF AVERTING |
| body-close-to | TENDENCY OF CLOSENESS |
| body-far-to | TENDENCY OF AVERTING |
| bodyparts-close-to | TENDENCY OF CLOSENESS |
| bodyparts-far-to | TENDENCY OF AVERTING |
| mutualattention-to | TENDENCY OF CLOSENESS |
| avertedatteition-to | TENDENCY OF AVERTING |
| jointattention-to | TENDENCY OF CLOSENESS |
| followingattention-to | TENDENCY OF CLOSENESS |
| sharedattention -to | TENDENCY OF CLOSENESS |
| face-close-to | TENDENCY OF CLOSENESS |
| face-far-to | TENDENCY OF AVERTING |
| upperbody-leanforward-to | TENDENCY OF CLOSENESS |
| upperbody-leanbackward-to | TENDENCY OF AVERTING |
| ⋮ | ⋮ |
| smile-to | TENDENCY OF CLOSENESS |
| nosmile-to | TENDENCY OF AVERTING |

FIG. 24

MOTION-TYPE DETERMINATION LOG TABLE FOR ANOTHER AVATAR  2400

| LOG ID | RECORDING TIME STAMP | DETERMINATION TIME STAMP (START) | DETERMINATION TIME STAMP (END) | USER NAME | CLIENT DEVICE ID | TYPE OF MOTION FOR ANOTHER AVATAR | USER NAME OF ANOTHER AVATAR | REGION INFORMATION AT STARTING TIME AND AT ENDING TIME |
|---|---|---|---|---|---|---|---|---|
| ... | ... | ... | ... | ... | ... | ... | ... | ... 2401 |
| 100 | 2015/7/27 11:02:03.020 | 2015/7/27 11:00:04.000 | 2015/7/27 11:01:05.000 | A | c1 | body-close-to | B | Bone_Chest From ((0,8,-10),(4,0,0)) To ((0,8,-10),(12,0,0)) |
| 101 | 2015/7/27 11:02:05.050 | 2015/7/27 11:00:00.000 | 2015/7/27 11:00:04.000 | A | c1 | face-close-to | B | Bone_Head From ((0,18,-10),(0,1,0)) To ((0,18,-10),(0,30,0)) |
| ... | ... | ... | ... | ... | ... | ... | ... | ... |

FIG. 28

ASSUMPTION RANGE INFORMATION 2800

| RECORDING TIME STAMP | AVATAR-REGION CHANGING ASSUMPTION RANGE DETERMINATION TIME STAMP (START) | AVATAR-REGION CHANGING ASSUMPTION RANGE DETERMINATION TIME STAMP (END) | USER NAME | CLIENT DEVICE ID | TARGET REGION | ASSUMPTION RANGE VALUE |
|---|---|---|---|---|---|---|
| ... | ... | ... | ... | ... | ... | ... |
| 2015/7/27 11:02:03.020 | 2015/7/27 11:00:04.000 | 2015/7/27 11:01:05.000 | A | c1 | Bone_Head | min(-10,17,-12),(-4,-5,-3)), max(2,18,-8),(15,31,10)) |
| 2015/7/27 11:02:05.050 | 2015/7/27 11:00:00.000 | 2015/7/27 11:00:04.000 | A | c1 | Shape_Mouth | min(IsSmile 0.2), max(IsSmile 0.9) |
| ... | ... | ... | ... | ... | ... | ... |

FIG. 31

MOTION TYPE DETERMINATION LOG (TIME-SERIES) TABLE ⌒3000

| RECORDING TIME STAMP | CHANGE OCCURRENCE TIME STAMP (FIRST) | CHANGE OCCURRENCE TIME STAMP (LAST) | USER NAME | CLIENT DEVICE ID | TYPE OF MOTION | REGION INFORMATION AT CHANGE OCCURRENCE TIME STAMP (START) AND REGION INFORMATION AT CHANGE OCCURRENCE TIME STAMP (END) |
|---|---|---|---|---|---|---|
| ... | ... | ... | ... | ... | ... | ... |
| 2015/7/27 11:02:03.020 | 2015/7/27 11:01:05.000 | 2015/7/27 11:01:05.000 | A | c1 | LEAN FORWARD | Bone_Chest From ((0,8,-10),(4,0,0)) To ((0,8,-10),(10,0,0)) |
| 2015/7/27 11:04:11.020 | 2015/7/27 11:02:10.000 | 2015/7/27 11:04:10.000 | A | c1 | FACE DIRECTION CHANGE | Bone_Head From ((0,18,-10),(0,1,1)) To ((0,18,-10),(0,30,3)) |
| ... | ... | ... | ... | ... | ... | ... |

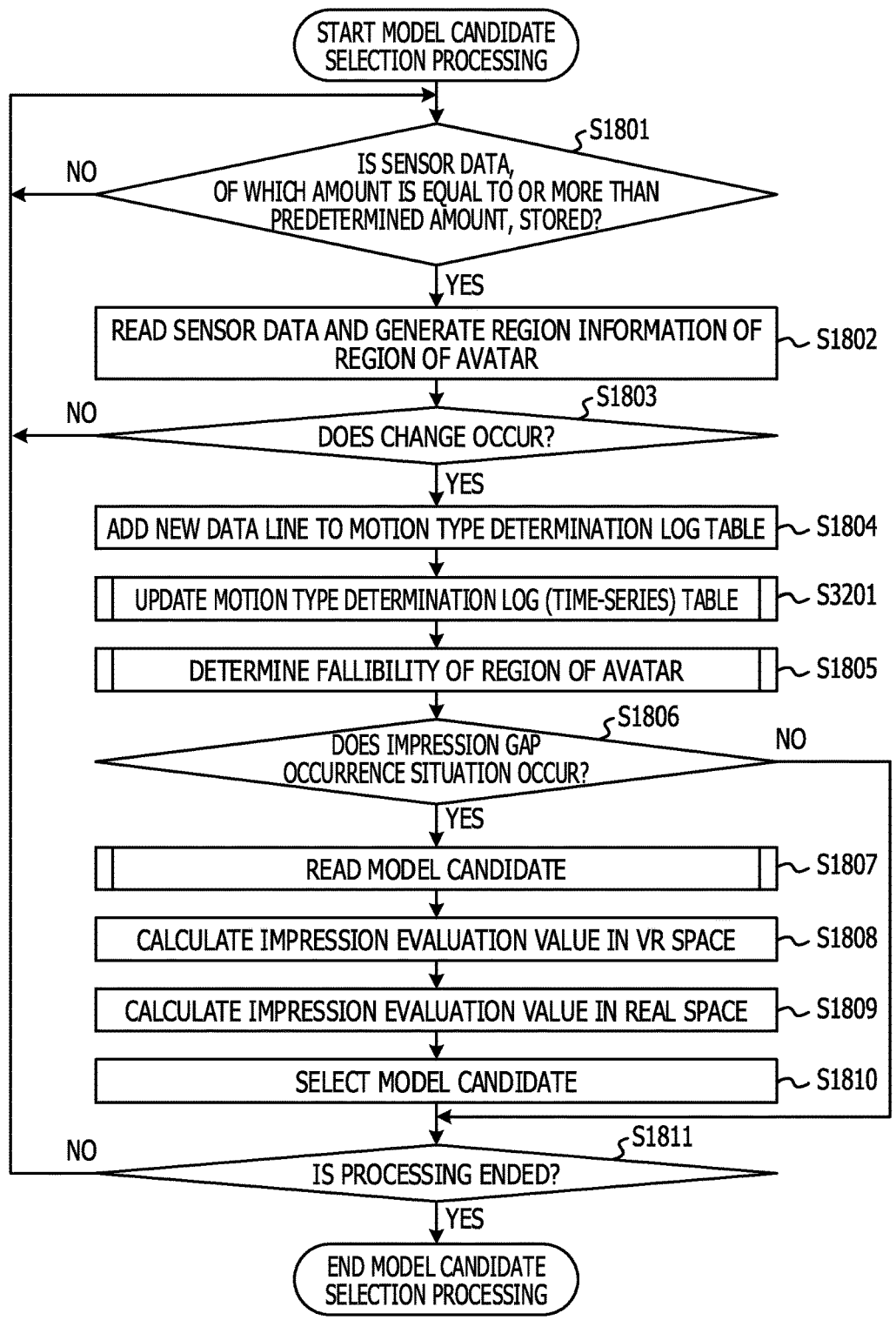

FIG. 41A
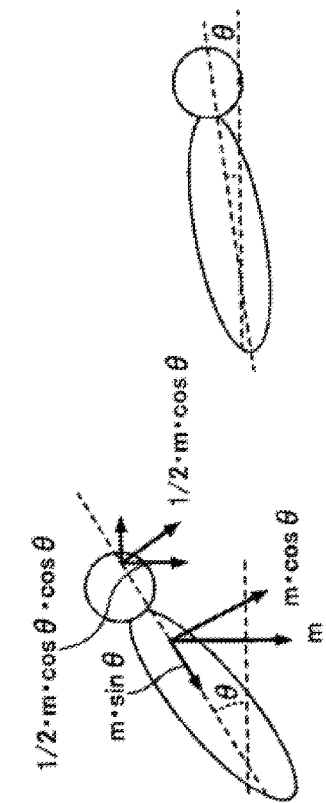
FIG. 41B
FIG. 41C
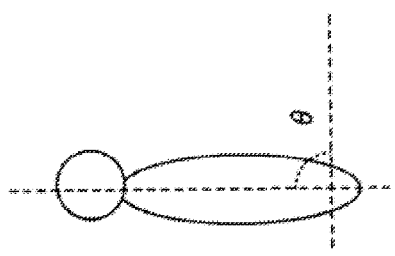
FIG. 41D
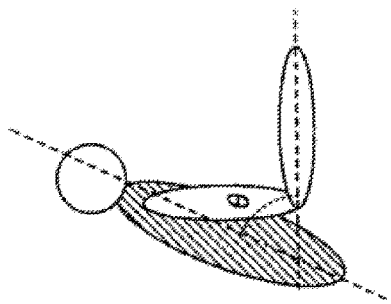
FIG. 41E
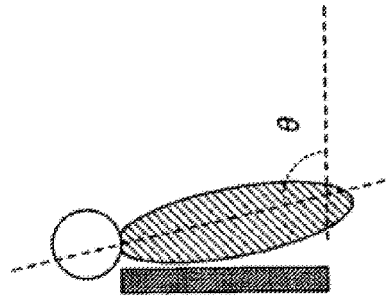
FIG. 41F
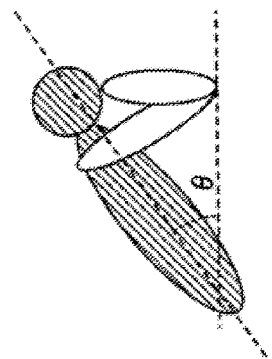

FIG. 47

| \_4700 | | |
|---|---|---|
| DEFINITION INFORMATION (TENDENCY OF CLOSENESS/TENDENCY OF AVERTING) | | |
| TYPE OF MOTION FOR ANOTHER AVATAR | TENDENCY OF CLOSENESS/ TENDENCY OF AVERTING | PRIORITY |
| body-close-to | TENDENCY OF CLOSENESS | 1 |
| body-far-to | TENDENCY OF AVERTING | 1 |
| bodyparts-close-to | TENDENCY OF CLOSENESS | 2 |
| bodyparts-far-to | TENDENCY OF AVERTING | 2 |
| mutualattention-to | TENDENCY OF CLOSENESS | 2 |
| avertedatteition-to | TENDENCY OF AVERTING | 2 |
| jointattention-to | TENDENCY OF CLOSENESS | 2 |
| followingattention-to | TENDENCY OF CLOSENESS | 2 |
| sharedattention -to | TENDENCY OF CLOSENESS | 2 |
| face-close-to | TENDENCY OF CLOSENESS | 3 |
| face-far-to | TENDENCY OF AVERTING | 3 |
| upperbody-leanforward-to | TENDENCY OF CLOSENESS | 3 |
| upperbody-leanbackward-to | TENDENCY OF AVERTING | 3 |
| ⋮ | ⋮ | 4 |
| smile-to | TENDENCY OF CLOSENESS | 5 |
| nosmile-to | TENDENCY OF AVERTING | 5 |

FIG. 49

| \[4900\] DEFINITION INFORMATION (TENDENCY OF CLOSENESS/TENDENCY OF AVERTING) |||
| --- | --- | --- |
| TYPE OF MOTION FOR ANOTHER AVATAR | TENDENCY OF CLOSENESS/ TENDENCY OF AVERTING | COMBINATION HAVING PROBABILITY OF CHANGING TENDENCY |
| body-close-to | TENDENCY OF CLOSENESS | avertedattention-to |
| body-far-to | TENDENCY OF AVERTING | mutualattention-to |
| bodyparts-close-to | TENDENCY OF CLOSENESS | avertedattention-to |
| bodyparts-far-to | TENDENCY OF AVERTING | mutualattention-to, smile-to |
| mutualattention-to | TENDENCY OF CLOSENESS | body-far-to, bodyparts-far-to, face-far-to, upperbody-leanbackwart-to |
| avertedatteition-to | TENDENCY OF AVERTING | |
| jointattention-to | TENDENCY OF CLOSENESS | |
| followingattention-to | TENDENCY OF CLOSENESS | |
| sharedattention -to | TENDENCY OF CLOSENESS | |
| face-close-to | TENDENCY OF CLOSENESS | |
| face-far-to | TENDENCY OF AVERTING | |
| upperbody-leanforward-to | TENDENCY OF CLOSENESS | |
| upperbody-leanbackward-to | TENDENCY OF AVERTING | |
| ⋮ | ⋮ | |
| smile-to | TENDENCY OF CLOSENESS | |
| nosmile-to | TENDENCY OF AVERTING | body-close-to, bodyparts-close-to, mutualattention-to, jointattention-to, sharedattention-to, face-close-to, upperbody-leanforward-to |

IMAGE GENERATING APPARATUS, IMAGE GENERATING SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2015-200553, filed on Oct. 8, 2015, the entire contents of which are incorporated herein by reference.

FIELD

The embodiments discussed herein are related to an image generating apparatus, an image generating system, a non-transitory computer-readable storage medium, and an image generating method.

BACKGROUND

In a real space, in a case where communication is performed between a plurality of persons, recognizing and analyzing a reaction of a person (for example, a person who is a communication partner) to behavior of another person is important in guessing a human relation between the above persons.

For example, it is analyzed whether a reaction of a person to behavior of the other person has a tendency of averting (compensatory) or a tendency of closeness (reciprocity), and thus it is possible to recognize whether or not a relationship (for example, intimacy and the like) with the other person is broken down.

In a virtual reality (VR) space in which communication is performed between a plurality of persons which are respectively positioned at separated locations, behavior of a person in the real space may be expressed through an image of an avatar. In such a case, in order to accurately recognize a relationship between the persons in the VR space, it is desirable that a guess similar to a guess of a relationship in the real space can be set to be applied in the VR space. Thus, it is desirable that information regarding "behavior" of a person in the real space is represented with "a motion of an avatar" in the VR space.

An example of the related art includes Japanese National Publication of International Patent Application No. 2014-522018.

SUMMARY

According to an aspect of the invention, an image generating apparatus, including a memory storing avatar data representing a motion of an avatar in a virtual space and a processor coupled to the memory and the processor configured to obtain sensor information that represents a motion of a person in a real space acquired from at least one sensor, determine a first value that indicates an impression of the person based on the obtained sensor information, determine a type of the motion based on the obtained sensor information, select at least one candidate data set corresponding to the type of the motion from the memory, determine a second value that indicates impression of the avatar for each of the selected at least one data set, select a representative data set based on the determined first value and the determined second value, and generate an avatar image based on the representative data set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of the overall configuration of an image generating system;

FIG. 3 is a diagram illustrating a relation between behavior of a person in a real space and a motion of an avatar in a VR space;

FIG. 4 is a diagram illustrating a selection method of a model candidate;

FIG. 11 is a diagram illustrating an example of a head-posture data table;

FIG. 12 is a diagram illustrating an example of a depth data-file table;

FIG. 13 is a diagram illustrating an example of a EMG data table;

FIG. 15 is a diagram illustrating definition information for determining the type of a motion of the avatar;

FIG. 16 is a diagram illustrating an example of a motion-type determination log table;

FIG. 17 is a diagram illustrating an example of a model candidate;

FIG. 20 is a diagram illustrating an example of an avatar-region displacement log table;

FIGS. 22A and 22B are diagrams illustrating definition information for determining the type of a motion for another avatar;

FIG. 23 is a diagram illustrating an example of definition information for defining a relation between the type and a tendency of a motion for another avatar;

FIG. 24 is a diagram illustrating an example of a motion-type determination log table for another avatar;

FIG. 28 is a diagram illustrating an example of assumption range information;

FIG. 31 is a diagram illustrating an example of a motion-type determination log (time-series) table;

FIG. 32 is a third flowchart illustrating the model candidate selection processing;

FIGS. 41A to 41F are diagrams illustrating cost which is calculated by a cost evaluation portion;

FIG. 47 is a diagram illustrating an example of definition information for defining a relation between the type, a tendency, and a priority of a motion for another avatar;

FIG. 49 is a diagram illustrating an example of definition information for defining a relation between the type, a tendency, and a combination (in which the tendency may be changed) of a motion for another avatar.

DESCRIPTION OF EMBODIMENTS

Figure 2A:
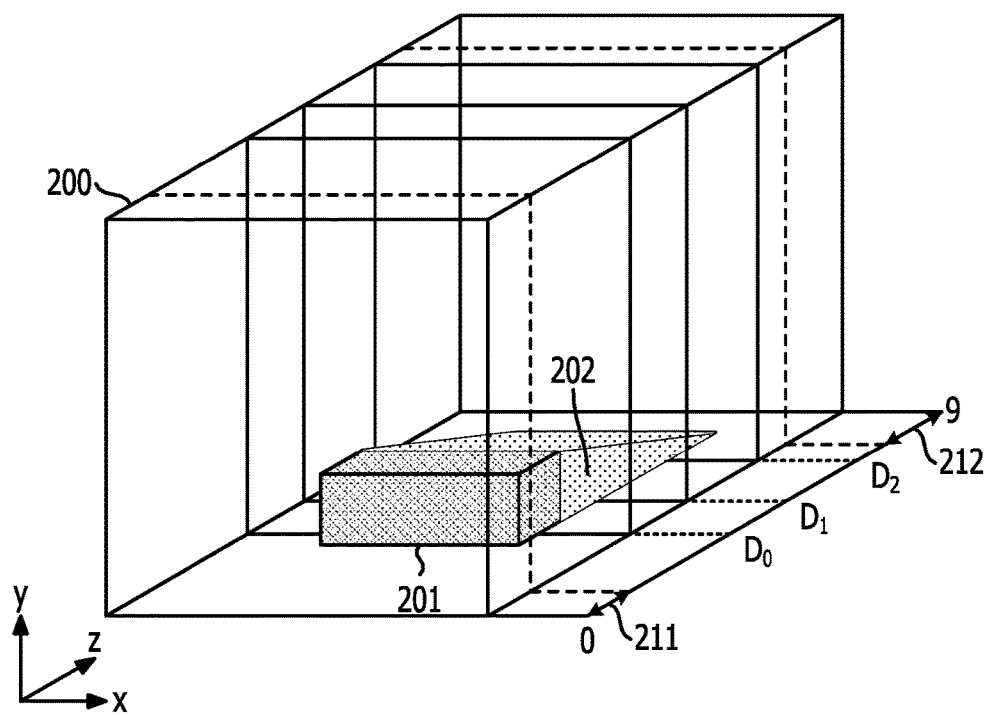
FIGS. 2A to 2C are diagrams illustrating a fallibility-threshold range map.

However, representing information regarding behavior of a person in the real space, with a motion of an avatar in the VR space may be not possible. For example, a case where it is difficult that a depth sensor that senses behavior of a person in the real space senses a certain region of a body of the person is detected. Specifically, a case where the hand of a person, which is viewed from the depth sensor is hidden under a desk is detected. In such a case, in a system in which behavior of a person in the real space is represented in the VR space, based on depth data of the depth sensor, a position or an rotation angle of the hidden region is estimated and output in order to represent an image of the entirety of the avatar.

For example, the position or the rotation angle of the hidden region is estimated and output based on the position of other region (in a case where the front of the wrist is hidden, elbow or shoulder which is connected to the wrist) to which the hidden region is to be connected.

However, in such an estimation method, even if the position of the other region is slightly changed, the changed position influences an estimation result. Thus, only a slight change of a posture (slight change of the position of the elbow or the shoulder) of a person in the real space occurs, and thus the estimated position or rotation angle of the wrist may be output so as to move unnaturally frequently. As a result, even though the person in the real space hardly moves the wrist on the thigh, the avatar in the VR space may be represented so as to frequently reverse the wrist or to frequently vertically shift the wrist.

That is, according to the above estimation method, even though a person in the real space is in a state of calmly listening to the counterpart, the avatar in the VR space may be represented so as to be in a state of being nervous and not being calm.

As described above, if a gap between behavior of a person in the real space, and a motion of an avatar which is represented through images of an avatar occurs as much as an impression to others is changed, recognizing a relationship between persons through the VR space is difficult.

According to one aspect, an object is to suppress a gap between an impression to others through an avatar, and an impression to others by real behavior of a person which functions as the source of the avatar.

Firstly, definitions of terms used for describing an image generating system in each embodiment will be simply described. The image generating system described in each of the following embodiments is a system which provides a VR space for performing communications between a plurality of persons which are positioned at separated locations.

In the image generating system, processing in which "behavior of a person" in the real space is converted into "a motion of an avatar" in the VR space is performed in order to provide the VR space for performing the communication. "The motion of an avatar" is represented by continuously displaying "images of the avatar" in each time frame. "The behavior of a person" referred herein includes also typical behavior, for example, raising the hand, or leaning the head, which is known as a gesture. However, "The behavior of a person" may be not necessarily recognized as a gesture by a person.

"The image of the avatar" is generated based on "region information" of each region (bodyelement part) of the avatar. "The region information" of each region of the avatar is obtained in such a manner that sensor data is obtained by sensing behavior of a person in the real space, and the obtained sensor data is converted into information indicating a state (position, rotation angle, and the like) of each region of an avatar in the VR space. "The region information" includes information indicating the type of a region, and a value (region value) indicating the state of the region.

That is, "the motion of an avatar" in the VR space is represented as a change of "images of the avatar" (change of the region value of each region of the avatar) with time. In the following embodiments, information regarding a motion of the avatar, which has an attached label in accordance with movement of each region of the avatar (information regarding behavior done by a person in the real space, which has an attached label) is referred to as "the type of a motion of an avatar".

In the real space, even when the same behavior is done, the behavior may have meanings opposite to each other, depending on a relation with other persons (may be determined to be a different social behavior). That is, the social behavior referred herein indicates behavior performed for social being of another person, among plural type of behavior.

For example, when behavior of a person is behavior of moving forward, in a case where other person is at a destination of the forward-moving, the behavior of the person can be referred to as social behavior of approaching the other person (social behavior indicating a tendency of closeness). Conversely, in a case where the person is moving forward in a state where the other person is near to the person, and as a result, the person is far from the other person, behavior of the person can be referred to as social behavior of becoming far from the other (social behavior indicating a tendency of averting). Similarly, for example, when behavior of a person is behavior of directing a direction of the face rightwardly, in a case where other person is on the right side, the behavior of the person can be referred to as social behavior of directing the face toward the other person (social behavior indicating a tendency of closeness). Conversely, in a case where behavior of directing the direction of the face rightwardly is done in a state where the other person is on the left side of the person, the behavior of the person can be referred to as social behavior of turning the face away from the other person (social behavior indicating a tendency of averting).

Thus, "the motion of an avatar" in the VR space may have meanings opposite to each other depending on a relation with other avatar. In the following embodiments, determination of which social behavior of a person in the real space corresponds to "a motion for other avatar" is referred to as determination of "the type of a motion for other avatar".

Next, an outline of processing of the image generating system in each of the embodiments will be described. In the image generating system in the following embodiments, in a case where a situation in which a gap between an impression to other person through a motion of an avatar, and an impression to the other person by real behavior of a person which functions as the source of the avatar becomes large occurs, an image of the avatar is generated based on model candidates. That is, in the image generating system, an image of the avatar is generated based on sensor data which has acquired at that time stamp, but the image of the avatar is generated based on predetermined model candidates.

The model is a set of pieces of region information desired for generating the image of the avatar, and is a set of pieces of region information of all regions of the avatar. However, the model may be a set of pieces of region information of some regions of the avatar, for example, a model of only a hand, a model of only a leg, a model of only a head. In the following embodiments, in a case of focusing on one model, an expression as "a model" is assumed. In a case of focusing on multiple models, an expression as "model candidates" is assumed.

In the image generating system in each of the embodiments, when an image of an avatar is generated based on the model candidate, model candidates are selected so as to suppress the gap between an impression to other person through a motion of the avatar, and an impression to the other person by real behavior of a person which functions as the source of the avatar. An avatar is generated based on one model which has been determined among the selected model candidates. That is, the selected model candidates can be referred to pieces of information used for generating an image of an avatar which reflects an impression of behavior of a person. In the following embodiments, model candidates which have been selected are used when an avatar is generated, and thus a gap between an impression to other person through the avatar and an impression to the other person by real behavior of a person which functions as the source of the avatar is suppressed.

Regarding processing up to selection of model candidates in the image generating system, various types of variations will be describe below with reference to the accompanying drawings.

In this specification and the drawings, components which have substantially the same functional configuration are denoted by the same reference signs, and descriptions thereof will be omitted.

First Embodiment

Overall Configuration of Image Generating System

Firstly, the image generating system will be described. FIG. 1 is a diagram illustrating an example of the overall configuration of the image generating system. As illustrated in FIG. 1, an image generating system 100 includes a server apparatus 110, and client devices 120 and 130. The server apparatus 110, and client devices 120 and 130 are connected to each other through a network 160 which is represented as the Internet, a local area network (LAN), and the like.

A user (user name="A") 140, a user (user name="B") 150 use the image generating system 100 at locations which are separated from each other. Thus, the user 140 and the user 150 can perform communication with each other in the same VR space.

A VR space information providing program which is an example of an image generation program is installed on the server apparatus 110. The server apparatus 110 executes the program so as to function as a first VR space information providing unit 111 and a second VR space information providing unit 112. The first VR space information providing unit 111 provides a VR space for causing the user 140 and the user 150 to perform communication with each other.

Specifically, the first VR space information providing unit 111 receives sensor data from the client device 120 or 130. The sensor data is obtained in such a manner that a sensor senses "behavior" of the user 140 and the user 150 in the real space. In the first embodiment, it is assumed that sensor data obtained by sensing "the behavior" includes sensor data obtained by, for example, sensing behavior of changing a posture of a body, behavior of changing a direction or an expression of a face, and utterance. The sensor data is not limited thereto, and may include sensor data obtained by sensing a conduct of a user, sensor data obtained by sensing an eye line of a user, and the like, in addition to the above-described behavior.

The first VR space information providing unit 111 stores the received sensor data in a sensor data storage unit 114.

The first VR space information providing unit 111 calculates region information of each region of an avatar in the VR space (avatar for expressing behavior of a person in the real space, in the VR space) based on the received sensor data, and generates an image of the avatar in the VR space.

The first VR space information providing unit 111 provides an image of the VR space which includes the generated image of the avatar, to the other client device. The image of the VR space is provided as VR space information, along with voice data which is included in the received sensor data.

The first VR space information providing unit 111 stores region information of each region of the avatar, which is included in the displayed image of the avatar, in an avatar-region displacement log table of a log storage unit 116. The region information is stored as avatar region displacement data (which will be described later in detail). The displayed image of the avatar includes an image of the avatar, which has been provided to the client device, and is displayed in the client device, and an image of the avatar which has been generated based on the sensor data and displayed in the client device. The avatar region displacement data which has been stored in the log storage unit 116 in this manner is used as a model candidate later.

The first VR space information providing unit 111 generates an image of the VR space by using an image which has been selected from images for a background. The images for a background are stored in a contents storage unit 113. The first VR space information providing unit 111 generates an image of an avatar by using the avatar which corresponds to each of the users 140 and 150, and has been selected from plural types of avatars which have been stored in the contents storage unit 113. The first VR space information providing unit 111 generates an image of the VR space by using the generated image of the avatar.

In this manner, the VR space information provided by the first VR space information providing unit 111 includes at least the followings.

Object Disposed at the Image of the VR Space

Properties of the object disposed at the image of the VR space (region information of a part constituting the object, voice data assigned to the object, and the like)

The image for the background is referred to as an object of which properties are not changed (object disposed as a background, and the like), among objects disposed at an image of the VR space. The image of an avatar is referred to as an object which has information regarding a bone or a basic structure of a skin or a mesh, and in which the attributes (at least one of parameters related to a bone or a mesh, such as position, rotation angle, display color, display form, and so on) of another object are changed, among objects disposed at an image of the VR space.

The second VR space information providing unit 112 calculates a region value of a region to be monitored in the avatar, based on sensor data which has been stored in the sensor data storage unit 114. The second VR space information providing unit 112 determines whether the region value of a region to be monitored is changed by a predetermined amount or more (region to be monitored moves by the predetermined amount or more). In a case where the second VR space information providing unit 112 determines that the region value of the region to be monitored is changed by the predetermined amount, the second VR space information providing unit 112 determines the type of a motion of the avatar, and stores the determined type of the motion of the avatar in "a motion-type determination log table" of the log storage unit 116.

The second VR space information providing unit 112 determines whether or not a situation in which a gap in impression to other person occurs between behavior of the person in the real space, and a motion of the avatar expressed through images of the avatar occurs (whether or not "an impression gap occurrence situation" occurs). The second VR space information providing unit 112 determines, for example, whether or not a position in the real space corresponding to a position of a region of the avatar in the VR space is in a region (referred to as "a fallibility-threshold range") of a position, in which sensing for sensor data having high reliability is not possible when measurement by using a sensor is performed. As a result, in a case where the second VR space information providing unit 112 determines that the position in the real space is in the fallibility-threshold range, the second VR space information providing unit 112 determines that the impression gap occurrence situation occurs. In a case where it is determined that the impression gap occurrence situation occurs, the second VR space information providing unit 112 reads plural pieces of avatar region displacement data which corresponds to region information of a region of the avatar, which has been previously generated, as "model candidates". The second VR space information providing unit 112 performs selection for a plurality of model candidates which have been read, and notifies the first VR space information providing unit 111 of the selected model candidate.

The second VR space information providing unit 112 selects the model candidate so as to cause a gap between an impression to other person through the avatar and an impression to the other person by real behavior of a person which functions as the source of the avatar to be small and/or minimized.

An information processing program is installed on the client device 120. The client device 120 executes the program so as to function as an information processing unit 121.

A depth sensor 122 is connected to the client device 120. The depth sensor 122 is disposed on the front of the user 140. The depth sensor 122 measures a three-dimensional position of the user 140, and thus outputs depth data. The depth data changes depending on behavior (behavior of changing a posture of the body, behavior of moving the legs and the arms, and the like) of the user 140 in the real space.

The client device 120 performs wireless communication with a wearable type display device or a wearable type sensor which has been mounted on the user 140. In the first embodiment, the wearable type display device includes a head-mounted display (HMD) 123, and displays an image of the VR space to the user 140. In the first embodiment, the wearable type sensor includes a head posture sensor 124, a voice sensor 125, and an electromyography (EMG) sensor 126.

The head posture sensor 124 outputs head posture data which is data depending on "a direction of the head" which is included in behavior of the user 140 in the real space. The voice sensor 125 outputs voice data which is data depending on "utterance" which is included in the behavior of the user 140 in the real space. The EMG sensor 126 outputs EMG data which is data depending on "a change of a facial expression" which is included in the behavior of the user 140 in the real space.

The HMD 123, the head posture sensor 124, the voice sensor 125, and the EMG sensor 126 are mounted on the head of the user 140. The head posture sensor 124, the voice sensor 125, and the EMG sensor 126 may be built in the HMD 123. The wearable type sensor may include a sensor which outputs data depending on a conduct of the user 140 in addition to the above-described behavior. The wearable type sensor may include a sensor which outputs data depending on an eye line of the user 140.

The client device 120 acquires sensor data such as depth data, head posture data, voice data, and EMG data, and transmits the acquired sensor data to the server apparatus 110. The client device 120 receives VR space information which has been transmitted from the server apparatus 110. The client device 120 generates an image of the VR space when viewed from the user 140 (below referred to as "a visual field image"), based on the received VR space information and the acquired sensor data. The client device 120 transmits the generated visual field image, and voice data included in the VR space information, to the HMD 123. The user 140 can visually recognize the image of the VR space and can listen to voice uttered by another user 150 in the real space, through the VR space.

Functions provided in the client device 130, a display and a sensor which are connected to the client device 130, and the like are similar to those in the client device 120. Thus, descriptions thereof will be omitted here.

Relation Between Position in Real Space and Position in VR Space

Next, a relation between a position in the real space and a position in the VR space will be described. Coordinates indicating a position in the real space and coordinates indicating a position in the VR space are respectively managed by coordinate systems which are different from each other, and are mutually transformed by using a predefined coordinate transformation function.

In order to correlate a position of each region of the image of an avatar in the VR space with a position in the real space, in the image generating system 100, for example, one representative point (position of the waist joint and the like) of the image of the avatar in the VR space, and one representative point of a user in the real space are correlated with each other.

Thus, a position in the real space, to which each region of the avatar corresponds can be calculated based on a relative distance from the correlated one point.

Descriptions for Fallibility-Threshold Range Map

Next, a map which indicates a fallibility-threshold range, and is used when the second VR space information providing unit 112 determines whether or not the impression gap occurrence situation occurs will be described. The fallibility-threshold range is predefined for each environment in which a sensor is installed, and for each type of the sensor. Here, for simple descriptions, a map indicating a fallibility-threshold range of the depth sensor 122 which is installed and sets the user 140 as a measurement target. Firstly, data acquired by the depth sensor 122 will be simply described.

As data acquired by the depth sensor, plural types of data (depth image data, color image data, infrared image data, and the like) are generally provided. The type of acquired data varies depending on the type of the depth sensor. Information of each pixel in a xy plane which is two-dimensional varies depending on the type of acquired data. In a case of a depth image data, information of each pixel indicates a value of a distance from the depth sensor. In a case of color image data, information of each pixel indicates an RGB value. In a case of infrared image data, information of each pixel indicates a gray-scale value.

The data acquired by the depth sensor is not limited thereto. The data acquired by the depth sensor may be information which is acquired by processing information of each pixel in the two-dimensional xy plane, and indicates a pixel position in the two-dimensional xy plane at which the user 140 exists. In addition, the data acquired by the depth sensor may be information indicating a pixel position at which the head of the user 140 is positioned. In the first embodiment, a case where the depth data includes at least depth image data and color image data will be described.

Figure 2B:
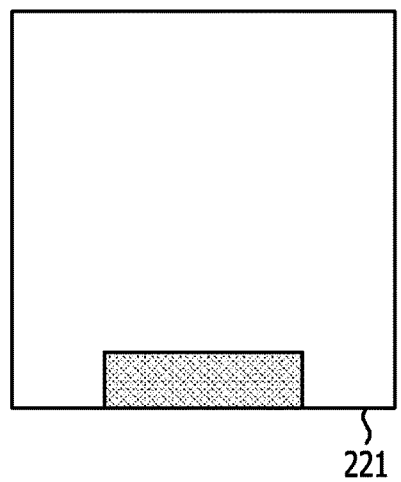
Figure 2C:
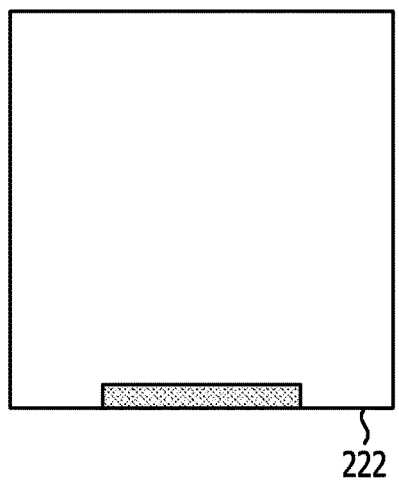

FIGS. 2A to 2C are diagrams illustrating a map which indicates the fallibility-threshold range of the depth sensor. In FIG. 2A, the depth sensor 122 that captures an image of the user 140 is disposed in a real space 200 (not illustrated in FIG. 2A), and it is assumed that capturing is performed from the front of a surface of paper toward the rear of the surface of the paper.

Thus, a range which is indicated by an arrow 211 in a depth direction (z-axis direction) when viewed from an installation position of the depth sensor 122 is set to be a region in which sensing data having high reliability is not possible when the depth sensor 122 performs measurement. That is, fallibility exceeds a threshold value in the entire region of the two-dimensional xy plane included in the range indicated by the arrow 211. Thus, in a case of this two-dimensional xy plane, the entire region thereof is set as the fallibility-threshold range.

A range which is indicated by an arrow 212 in the depth direction (z-axis direction) when viewed from the installation position of the depth sensor 122 is set to be a region in which data having high reliability can be sensed when the depth sensor 122 performs measurement. That is, the entire region of the two-dimensional xy plane included in the range indicated by the arrow 212 is set as the fallibility-threshold range.

Ranges D0 to D2 in the depth direction (z-axis direction) when viewed from the installation position of the depth sensor 122 is a range in which a desk 201 which blocks a portion of a capturing range of the depth sensor 122 blocks a portion of a region on an opposite side of the desk 201. That is, in a case of each of two-dimensional xy planes at the positions D0, D1, and D2 in the z-axis direction, a portion of the region is set as the fallibility-threshold range.

FIG. 2B illustrates an example of the fallibility-threshold range map at the position (D1) in the depth direction (z-axis direction). FIG. 2C illustrates an example of the fallibility-threshold range map at the position (D2) in the depth direction (z-axis direction). A hatched region in each of the fallibility-threshold range maps 221 and 222 indicates the fallibility-threshold range in which fallibility exceeds the threshold value in the two-dimensional xy plane at each of the positions D1 and D2 in the depth direction.

The second VR space information providing unit 112 determines whether or not a position in the real space 200, which corresponds to a position of each region of the image of the avatar in the VR space is included in the fallibility-threshold range which has been hatched in the fallibility-threshold range map. In a case where the second VR space information providing unit 112 determines that the position is included in the fallibility-threshold range, the second VR space information providing unit 112 determines that the impression gap occurrence situation occurs.

Here, the map indicating the fallibility-threshold range of the depth sensor 122 is described. However, the above descriptions are also similarly applied to, for example, a map indicating a fallibility-threshold range of the EMG sensor 126 or the head posture sensor 124.

The fallibility-threshold range map may be updated in accordance with the sensor data. The update of the fallibility-threshold range map is referred to as a case where a region in which fallibility exceeds the threshold value is changed depending on a situation.

For example, in a case of EMG data sensed by the EMG sensor 126, a range in which fallibility exceeds the threshold value may be changed in accordance with the data characteristic and the like of the user 140. In a case of head posture data acquired by the head posture sensor 124, a range in which fallibility exceeds the threshold value may be changed based on a movable range of the head of the user 140.

Relation Between Behavior of Person in Real Space and Motion of Avatar in VR Space Next, a relation between behavior of a person (user 140 or 150) in the real space, and a motion of an avatar in the VR space will be described. FIG. 3 is a diagram illustrating the relation between behavior of a person in the real space, and a motion of an avatar in the VR space.

As illustrated in FIG. 3, a visual field image 301 is displayed on the HMD 123 mounted by the user 140. It is displayed in the visual field image 301 that an avatar 350 of the user 150 acts in the VR space 300. In the example of FIG. 3, the user 150 maintains an erected state in the real space. Thus, the avatar 350 is also set to maintain an erected state in the VR space 300. A portion (hand and the like) of an avatar of the user 140 is not displayed in the visual field image which is displayed on the HMD 123 of the user 140. However, the portion (hand and the like) of the avatar of the user 140 may be displayed.

A visual field image 302 is displayed on the HMD 133 mounted by the user 150. It is displayed in the visual field image 302 that the avatar 340 of the user 140 acts in the VR space 300. As illustrated in FIG. 3, the user 140 maintains a state of sitting on a chair in the real space, and thus the avatar 340 is also set to maintain the sitting state in the VR space 300. A portion (hand and the like) of the avatar of the user 150 is not displayed in the visual field image which is displayed on the HMD 133 of the user 150. However, the portion (hand and the like) of the avatar of the user 150 may be displayed.

Here, the avatar 340 in the visual field image 302 corresponds to pieces of region information of regions, which have been calculated by the first VR space information providing unit 111, based on sensor data which has been obtained by sensing behavior of the user 140. In a case of the avatar 340 of the visual field image 302, only a slight change of a posture of the user 140 or only a slight change of the position of the elbow or the shoulder thereof occurs, and thus the tip of the elbow is displayed so as to move unnaturally frequently or the tip of the elbow is displayed at a position which is different from the actual position of the elbow. Thus, even though the user 140 actually is in a state of calmly sitting, the avatar 340 in the visual field image 302 is expressed, for example, so as to sit in a state of being irritated and not being calm.

On the contrary, the avatar 340 in a visual field image 303 corresponds to pieces of region information of regions, obtained in such a manner that the second VR space information providing unit 112 determines model candidates and calculates pieces of region information of regions based on sensor data which has been obtained by sensing behavior of the user 140. In a case of the second VR space information providing unit 112, the model candidates are selected so as to cause a gap in impression to other person between behavior of the user 140 in the real space, and a motion of the avatar 340 not to be large. Then, the second VR space information providing unit 112 generates an image of the avatar 340. Thus, the avatar 340 in the visual field image 303 is expressed so as to be in a state of calmly sitting, similar to the behavior of the user 140 in the real space.

Selection Method of Model Candidate

Next, a selection method in which a model candidate is selected so as to cause an impression to other person between behavior of the user 140 in the real space and a motion of the avatar 340 not to be changed in a case where the impression gap occurrence situation occurs will be described. FIG. 4 is a diagram illustrating the selection method of a model candidate.

As illustrated in FIG. 4, if the second VR space information providing unit 112 acquires sensor data (depth data, head posture data, and EMG data), the second VR space information providing unit 112 calculates region information of a region of the avatar, which is a monitoring target. The second VR space information providing unit 112 determines whether the region to be monitored moves by a predetermined amount or more, based on the region information of the region to be monitored. In a case where the second VR space information providing unit 112 determines that the region to be monitored moves by the predetermined amount or more, the second VR space information providing unit 112 determines the type of a motion, and updates "the motion-type determination log table".

If the second VR space information providing unit 112 updates the motion-type determination log table, the second VR space information providing unit 112 determines whether or not the impression gap occurrence situation occurs. In a case where it is determined that the impression gap occurrence situation occurs, the second VR space information providing unit 112 performs processing indicated by a dot line 400 in FIG. 4.

As indicated by the dot line 400 in FIG. 4, the second VR space information providing unit 112 calculates an impression evaluation value in the real space, based on color image data which has been acquired from the depth sensor 122. The impression evaluation value is a value obtained by evaluating an impression of a person. As one of methods which are generally used in a case where a state of a person is expressed by using a numerical value, an expression method which performs expressing by using three axes and is referred to as VAD is provided. Axes in the VAD indicate valence, arousal, and dominance. In the first embodiment, it is assumed that an expression is performed by using only two axes of valence and arousal (biaxial plane in which a positive side of the valence is set to be "positive", and a negative side thereof is set to be "negative", a positive side of the arousal is set to be "active", and a negative side thereof is set to be "passive").

Any calculation method for the impression evaluation value may be used. For example, an Arousal value/Valence value may be calculated based on an amount of changed head posture data. Specifically, the calculation may be performed by using an application programming interface (API) in which the Arousal value/Valence value becomes high as the changed amount is increased and becomes approximate to lean forward, and the Arousal value/Valence value becomes low as the changed amount is decreased and becomes approximate to lean backward.

In addition, the Arousal value/Valence value may be calculated by using color image data which is included in depth data. Specifically, the calculation may be performed by using an API in which the Arousal value/Valence value becomes high as a facial expression has an active and bright impression, and the Arousal value/Valence value becomes low as the facial expression has a quiet and dark impression.

The second VR space information providing unit 112 reads avatar region displacement data in accordance with the type of a motion, which has been determined this time, among pieces of avatar region displacement data, which have been stored in the log storage unit 116. The avatar region displacement data is read as a model candidate. The avatar region displacement data which has been stored in the log storage unit 116 is region information of a region of the avatar, which has been previously generated based on sensor data by the first VR space information providing unit 111 of the server apparatus 110.

The second VR space information providing unit 112 calculates an impression evaluation value in the VR space, for each of model candidates which have been read.

The second VR space information providing unit 112 compares the impression evaluation value in the real space and the impression evaluation value in the VR space to each other. The second VR space information providing unit 112 selects a model candidate in which an impression evaluation value in the VR space, which is close to an impression evaluation value in the real space is calculated. The model candidate is selected as a model candidate used when an image of the avatar is generated. In the server apparatus 110, finally one model is determined and an image of the avatar is generated.

As described above, in the image generating system 100, when an image of an avatar, which reflects behavior of a person in the real space is generated, in a case where the impression gap occurrence situation has occurred, the second VR space information providing unit 112 selects a model candidate based on the impression evaluation value. As a result, according to the image generating system 100, even when the impression gap occurrence situation occurs, it is possible to suppress a gap between an impression to other person through a motion of the avatar, and an impression to the other person by behavior of a person which is the source of the avatar.

Hardware Configuration of Server Apparatus

Figure 5:
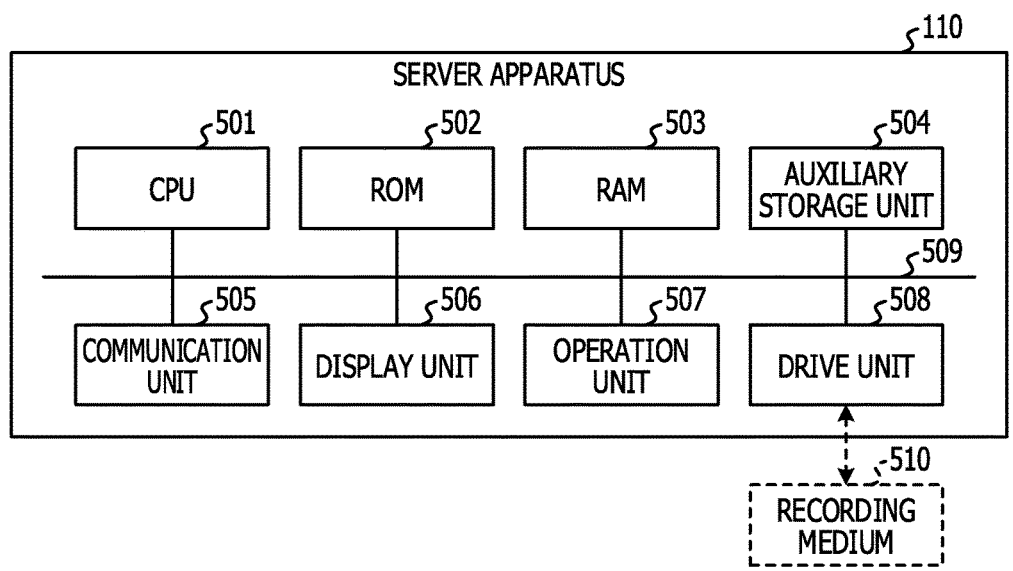
FIG. 5 is a diagram illustrating an example of a hardware configuration of a server apparatus.

Next, a hardware configuration of the server apparatus 110 will be described. FIG. 5 is a diagram illustrating an example of the hardware configuration of the server apparatus 110. As illustrated in FIG. 5, the server apparatus 110 includes a CPU 501, a read only memory (ROM) 502, and a random access memory (RAM) 503. The server apparatus 110 includes an auxiliary storage unit 504, a communication unit 505, a display unit 506, an operation unit 507, and a drive unit 508. The units of the server apparatus 110 are connected to each other through a bus 509.

The CPU 501 is a computer which executes various programs (for example, VR space information providing program) which have been installed on the auxiliary storage unit 504. The ROM 502 is a non-volatile memory. The ROM 502 functions as a main storage unit. In the ROM 502, various programs, various types of data, and the like which are desired for the CPU 501 executing various programs which have been stored in the auxiliary storage unit 504 are stored. Specifically, the ROM 502 stores a basic input/output system (BIOS), a boot program such as an extensible firmware interface (EFI), and the like.

The RAM 503 is a volatile memory such as a dynamic random access memory (DRAM) or a static random access memory (SRAM), and functions as the main storage unit. The RAM 503 provides a work area obtained by development when the CPU 501 executes various programs which have been stored in the auxiliary storage unit 504.

The auxiliary storage unit 504 stores various programs which have been installed on the server apparatus 110, or information (image (image of a background, image of an avatar) used for generating an image of the VR space) used when the various programs are executed. The auxiliary storage unit 504 stores information (sensor data, various log tables, and the like) acquired by executing various programs.

The communication unit 505 is a device for communicating with the client devices 120 and 130 which are connected to the server apparatus 110. The display unit 506 displays a processing result or a processing status of the server apparatus 110. The operation unit 507 is used when various instructions are input to the server apparatus 110.

The drive unit 508 is a device for setting a recording medium 510. The recording medium 510 referred herein includes a medium such as a CD-ROM, a flexible disk, and a magneto-optical disk, in which information is optically, electrically, or magnetically recorded. The recording medium 510 also includes, for example, a semiconductor memory such as a ROM, and a flash memory, in which information is electrically recorded.

The various programs stored in the auxiliary storage unit 504 means, for example, that the distributed recording medium 510 is set in the drive unit 508, and various programs recorded in the recording medium 510 are read by the drive unit 508, and thus are stored. In addition, the various programs may be stored by receiving the programs from the network 160 through the communication unit 505.

Hardware Configuration of Client Device

Figure 6:
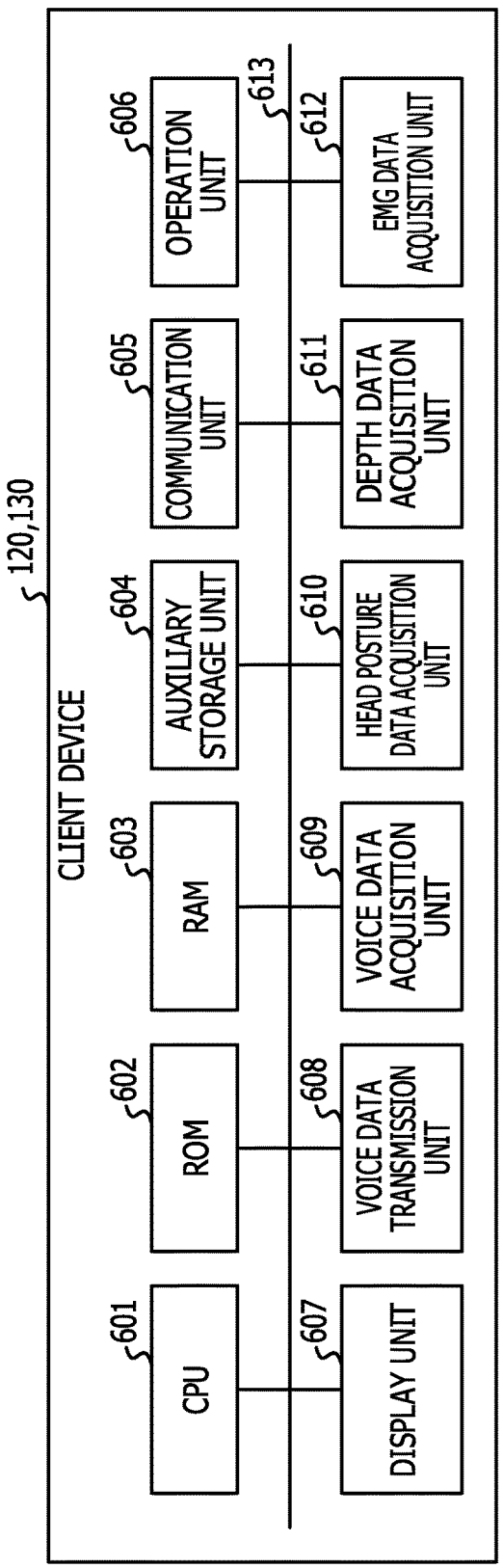
FIG. 6 is a diagram illustrating an example of a hardware configuration of a client device.

Next, a hardware configuration of the client devices 120 and 130 will be described. FIG. 6 is a diagram illustrating an example of the hardware configuration of the client device. As illustrated in FIG. 6, each of the client devices 120 and 130 includes a CPU 601, a read only memory (ROM) 602, and a random access memory (RAM) 603. Each of the client devices 120 and 130 includes am auxiliary storage unit 604, a communication unit 605, an operation unit 606, a display unit 607, a voice data transmission unit 608, and a voice data acquisition unit 609. Further, each of the client devices 120 and 130 includes a head posture data acquisition unit 610, a depth data acquisition unit 611, and a EMG data acquisition unit 612. The units are connected to each other through a bus 613.

The CPU 601 is a computer which executes various programs (for example, information processing program) which have been installed on the auxiliary storage unit 604. The ROM 602 is a non-volatile memory. The ROM 602 functions as a main storage unit. In the ROM 602, various programs, various types of data, and the like which are desired for the CPU 601 executing various programs which have been stored in the auxiliary storage unit 604 are stored. Specifically, the ROM 602 stores a basic input/output system (BIOS), a boot program such as an extensible firmware interface (EFI), and the like.

The RAM 603 is a volatile memory such as a dynamic random access memory (DRAM) or a static random access memory (SRAM), and functions as the main storage unit. The RAM 603 provides a work area obtained by development when the CPU 601 executes various programs which have been stored in the auxiliary storage unit 604.

The auxiliary storage unit 604 stores installed various programs or information used when the various programs are executed.

The communication unit 605 is a device for communicating with the server apparatus 110 to which the client devices 120 and 130 are connected. The operation unit 606 is used when various instructions are input to the client devices 120 and 130. The display unit 607 displays a processing result or a processing status of each of the client devices 120 and 130.

The voice data transmission unit 608 extracts voice data included in VR space information which is transmitted by the server apparatus 110. The voice data transmission unit 608 transmits the extracted voice data to the HMD 123 (or HMD 133). Thus, the voice data is output through a speaker which is provided in the HMD 123 (or HMD 133).

The voice data acquisition unit 609 acquires voice data which has been transmitted by the voice sensor 125 (or voice sensor 135). The head posture data acquisition unit 610 acquires head posture data which has been transmitted by the head posture sensor 124 (or head posture sensor 134). The depth data acquisition unit 611 acquires depth data which has been transmitted by the depth sensor 122 (or depth sensor 132). The EMG data acquisition unit 612 acquires EMG data which has been transmitted by the EMG sensor 126 (or EMG sensor 136).

The sensor data such as the voice data, the head posture data, the depth data, and the EMG data which have been acquired is transmitted to the server apparatus 110 through the communication unit 605.

Functional Configuration of Client Device

Figure 7:
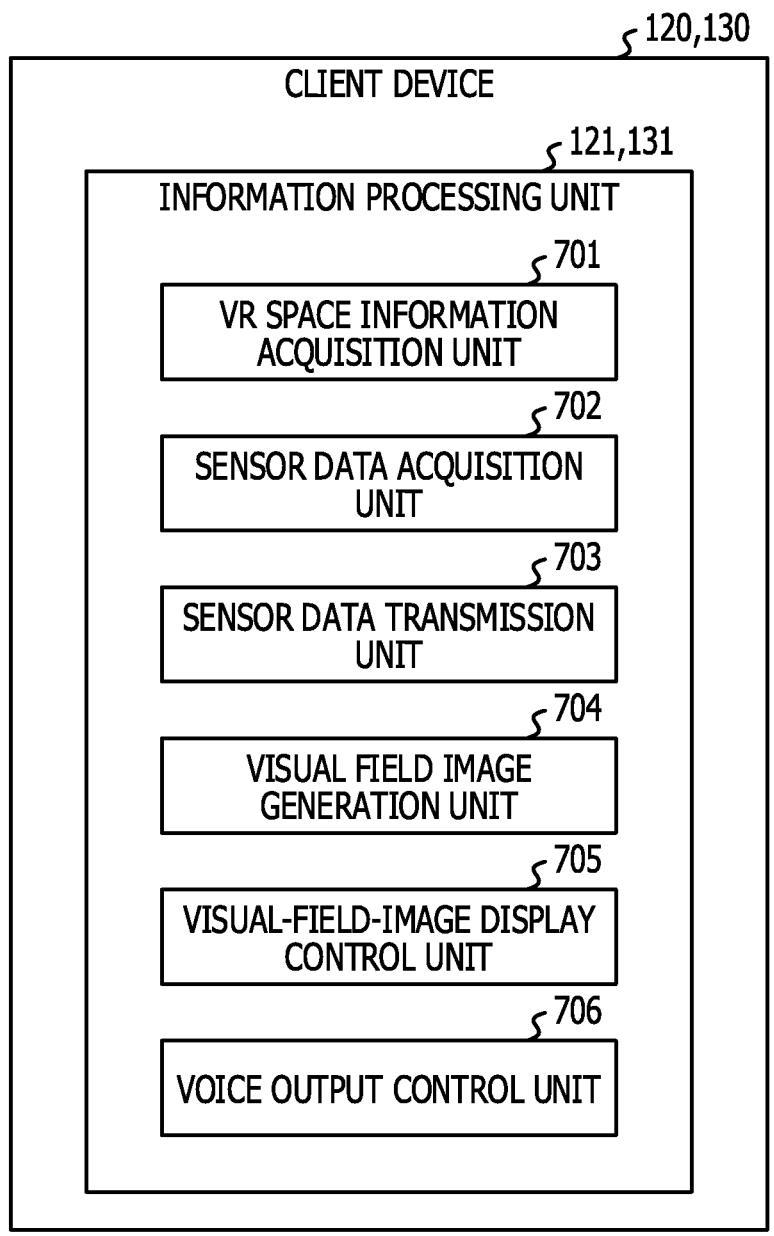
FIG. 7 is a diagram illustrating an example of a functional configuration of the client device.

Next, a functional configuration of the information processing units 121 and 131 of the client devices 120 and 130. FIG. 7 is a diagram illustrating an example of the functional configuration of the client device. As illustrated in FIG. 7, each of the information processing units 121 and 131 in the client devices 120 and 130 includes a VR space information acquisition unit 701, a sensor data acquisition unit 702, a sensor data transmission unit 703, a visual field image generation unit 704, a visual-field-image display control unit 705, and a voice output control unit 706.

The VR space information acquisition unit 701 acquires VR space information which is transmitted by the server apparatus 110, and notifies the visual field image generation unit 704 and the voice output control unit 706.

The sensor data acquisition unit 702 acquires the head posture data which has been acquired by the head posture data acquisition unit 610, in correlation with time information. The sensor data acquisition unit 702 acquires the depth data which has been acquired by the depth data acquisition unit 611, in correlation with the time information. The sensor data acquisition unit 702 acquires the EMG data which has been acquired by the EMG data acquisition unit 612, in correlation with the time information, and acquires the voice data which has been acquired by the voice data acquisition unit 609, in correlation with the time information.

The sensor data acquisition unit 702 notifies the visual field image generation unit 704 of the head posture data and the depth data which have been acquired. The sensor data acquisition unit 702 correlates each of the head posture data, the depth data, the EMG data, and the voice data which have been acquired, with the time information, and notifies the sensor data transmission unit 703 of a resultant of the correlation as the sensor data.

The sensor data transmission unit 703 transmits the sensor data of which a notification is performed by the sensor data acquisition unit 702, to the server apparatus 110. The sensor data transmission unit 703 correlates a user name of a user, which has been acquired from the sensor data, or an identifier (client device ID) for identifying a client device which has acquired the sensor data, with the sensor data. The sensor data transmission unit 703 transmits a resultant of the correlation to the server apparatus 110.

The visual field image generation unit 704 generates a visual field image of the user 140 (or user 150) based on the head posture data and the depth data of which a notification is performed by the sensor data acquisition unit 702. The visual field image of the user 140 (or user 150) is used for an image of the VR space, which is included in the VR space information.

The visual-field-image display control unit 705 performs a control so as to cause the visual field image generated by the visual field image generation unit 704 to be displayed in the HMD 123 (or HMD 133).

The voice output control unit 706 performs a control so as to extract voice data included in the VR space information, and to output the extracted voice data through the speaker which is provided in the HMD 123 (or HMD 133).

Sensor Data Transmission Processing Performed by Client Device

Figure 8:
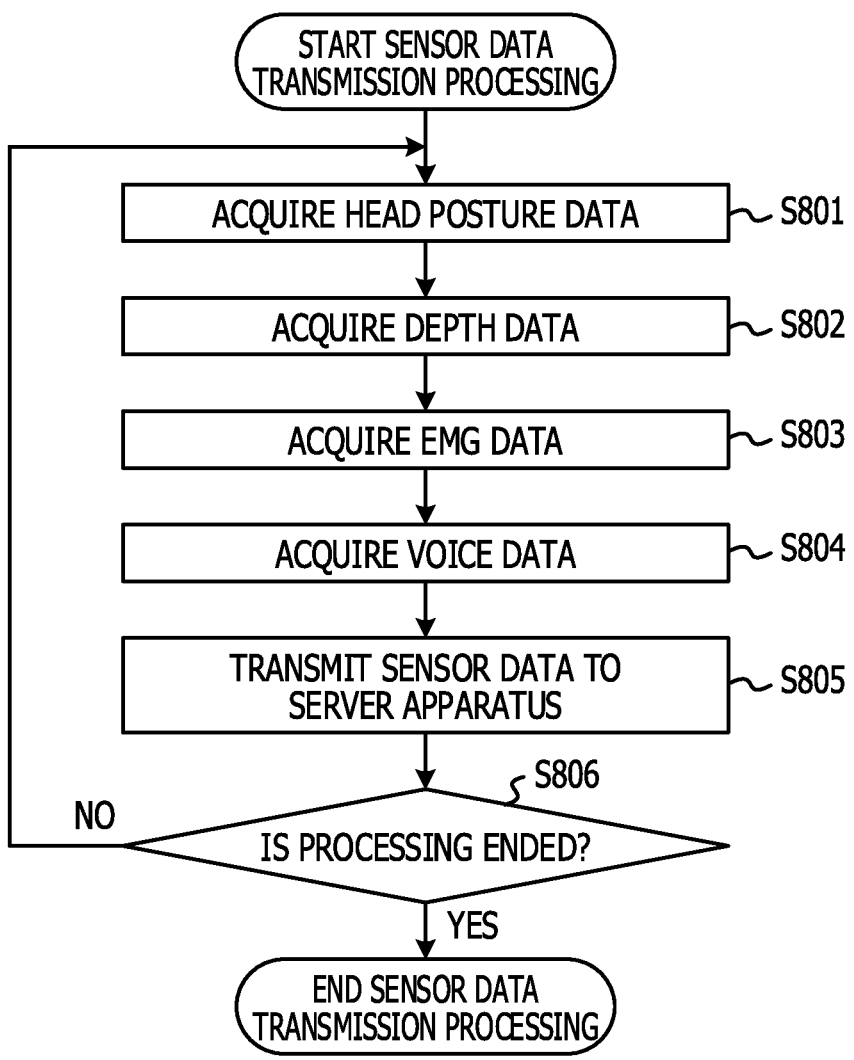
FIG. 8 is a flowchart illustrating sensor data transmission processing which is performed by the client device.

Next, a flow of sensor data transmission processing performed by the client device 120 will be described. FIG. 8 is a flowchart illustrating the sensor data transmission processing performed by the client device.

In Step S801, the sensor data acquisition unit 702 acquires the head posture data which has been acquired by the head posture data acquisition unit 610, and notifies the sensor data transmission unit 703 of the acquired head posture data in correlation with the time information.

In Step S802, the sensor data acquisition unit 702 acquires the depth data which has been acquired by the depth data acquisition unit 611, and notifies the sensor data transmission unit 703 of the acquired depth data in correlation with the time information.

In Step S803, the sensor data acquisition unit 702 acquires the EMG data which has been acquired by the EMG data acquisition unit 612, and notifies the sensor data transmission unit 703 of the acquired EMG data in correlation with the time information.

In Step S804, the sensor data acquisition unit 702 acquires the voice data which has been acquired by the voice data acquisition unit 609, and notifies the sensor data transmission unit 703 of the acquired voice data in correlation with the time information. An order of the processes of Steps S801 to S804 is not limited thereto. The processes may be performed in another order, may be performed in parallel with each other, or may be started and ended at a different timing.

In Step S805, the sensor data transmission unit 703 correlates the sensor data of which a notification is performed by the sensor data acquisition unit 702, with a user name, a client device ID, and the like. The sensor data transmission unit 703 transmits a resultant of the correlation as sensor data, to the server apparatus 110.

In Step S806, the sensor data acquisition unit 702 determines whether or not the sensor data transmission processing is ended. In a case where it is determined that the sensor data transmission processing is not ended (No in Step S806), the process returns to Step S801, and the sensor data transmission processing continues. In a case where it is determined that the sensor data transmission processing is ended (Yes in Step S806), the sensor data transmission processing is ended.

VR Space Displaying Processing Performed by Client Device

Figure 9:
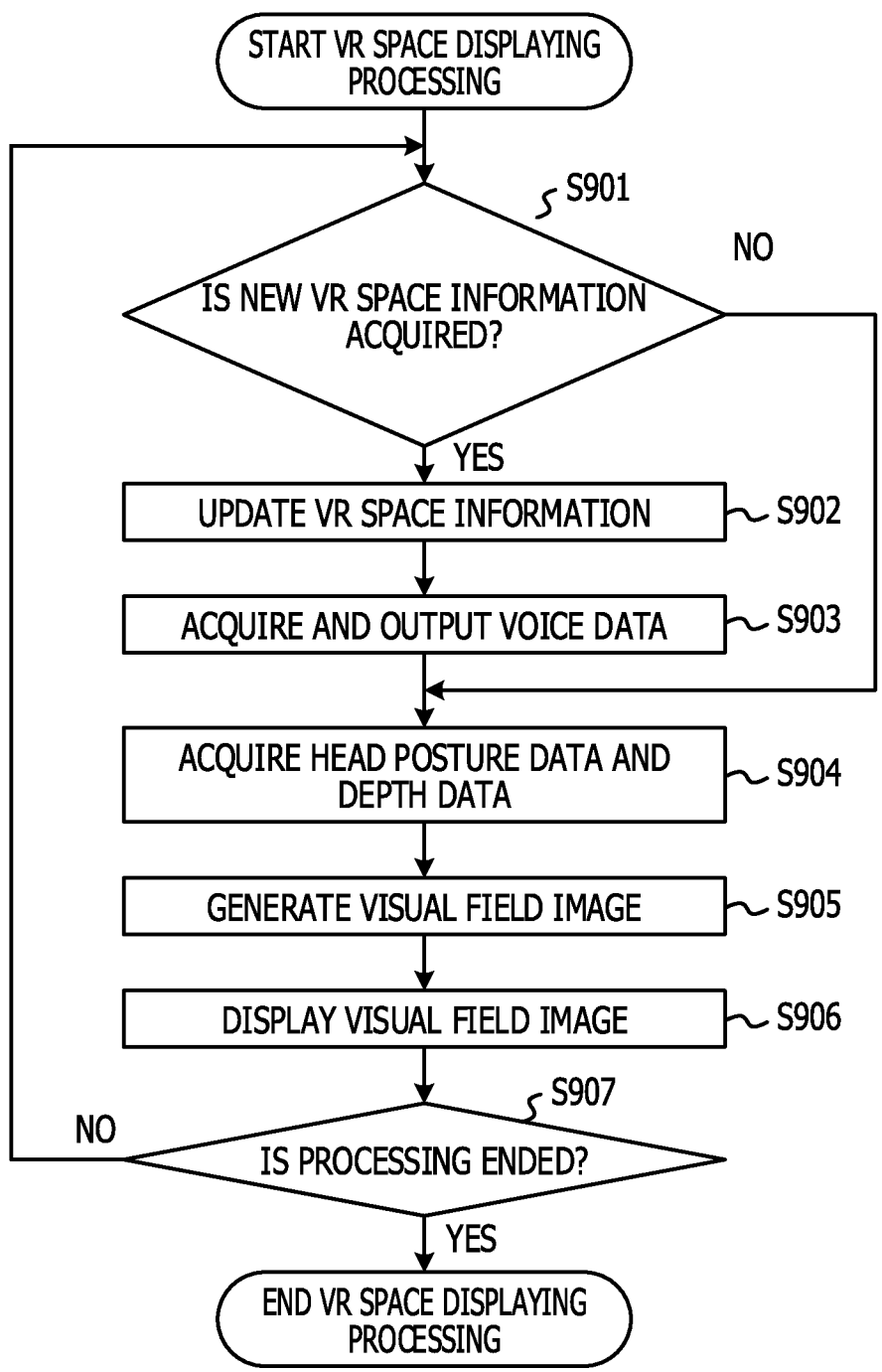
FIG. 9 is a flowchart illustrating VR space displaying processing which is performed by the client device.

Next, a flow of VR space displaying processing performed by the client device will be described. The entirety of the VR space displaying processing performed by the client devices 120 and 130 is similar to other VR space displaying processing. Thus, the VR space displaying processing performed by the client device 120 will be described. FIG. 9 is a flowchart of the VR space displaying processing performed by the client device.

In Step S901, the VR space information acquisition unit 701 determines whether or not the VR space information transmitted by the server apparatus 110 is newly acquired. In Step S901, in a case where it is determined that the VR space information is not newly acquired, the process proceeds to Step S904. In Step S901, in a case where it is determined that the VR space information is newly acquired, the process proceeds to Step S902.

In Step S902, the VR space information acquisition unit 701 updates VR space information which has been currently held, by using the VR space information which has been newly acquired.

In Step S903, the voice output control unit 706 acquires voice data included in the updated VR space information, and outputs the acquired voice data to the HMD 123 through the voice data transmission unit 608.

In Step S904, the sensor data acquisition unit 702 acquires the head posture data which has been acquired by the head posture data acquisition unit 610, and acquires the depth data which has been acquired by the depth data acquisition unit 611.

In Step S905, the visual field image generation unit 704 generates a visual field image of the user 140 for an image of the VR space, which is included in the updated VR space information, based on the head posture data and the depth data which have been acquired in Step S904.

In Step S906, the visual-field-image display control unit 705 performs a control so as to the visual field image generated in Step S905 to be displayed in the HMD 123.

In Step S907, the VR space information acquisition unit 701 determines whether or not an instruction of ending the VR space displaying processing is received. In Step S907, in a case where it is determined that the instruction of ending the VR space displaying processing is not received (No in Step S907), the process returns to Step S901. In Step S907, in a case where it is determined that the instruction of ending the VR space displaying processing is input (Yes in Step S907), the VR space displaying processing is ended.

Functional Configuration of Server Apparatus

Figure 10:
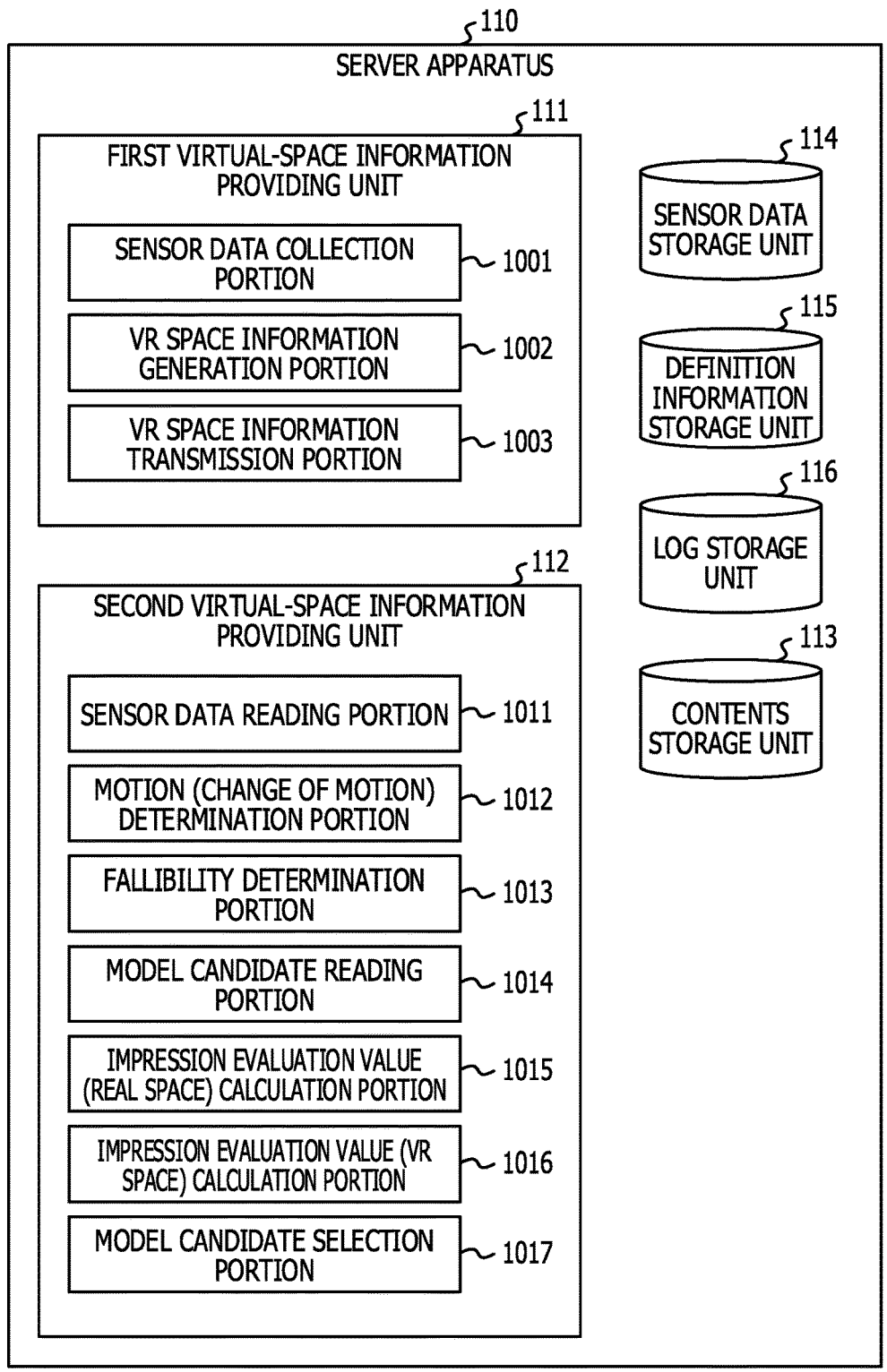
FIG. 10 is a first diagram illustrating an example of a functional configuration of the server apparatus.

Next, a functional configuration (first VR space information providing unit 111 and second VR space information providing unit 112) of the server apparatus 110 will be described. FIG. 10 is a first diagram illustrating an example of the functional configuration of the server apparatus.

As illustrated in FIG. 10, the first VR space information providing unit 111 of the server apparatus 110 includes a sensor data collection portion 1001, a VR space information generation portion 1002, and a VR space information transmission portion 1003.

The sensor data collection portion 1001 collects pieces of sensor data transmitted by each of the client devices 120 and 130, and stores the collected pieces of sensor data in the sensor data storage unit 114.

The VR space information generation portion 1002 calculates region information of each of the regions of the avatar, based on the pieces of sensor data which have been collected by the sensor data collection portion 1001, and the VR space information generation portion 1002 generates an image of the avatar. The VR space information generation portion 1002 generates VR space information which includes the generated image of the avatar. The VR space information generation portion 1002 stores avatar region displacement data which has been calculated when the image of the avatar is generated, and is region information of each of the regions of the avatar. The VR space information generation portion 1002 stores the avatar region displacement data as a model candidate in the log storage unit 116.

The VR space information transmission portion 1003 transmits the VR space information generated by the VR space information generation portion 1002, to a client device except for the client device which is the transmission source and has transmitted the sensor data used for updating the VR space information. In a case where the image of the avatar is generated based on the sensor data which has been transmitted by the client device 120, and the VR space information is updated, the VR space information transmission portion 1003 transmits the updated VR space information to the client device 130. In a case where the image of the avatar is generated based on the sensor data which has been transmitted by the client device 130, and the VR space information is updated, the VR space information transmission portion 1003 transmits the updated VR space information to the client device 120.

As illustrated in FIG. 10, the second VR space information providing unit 112 in the server apparatus 110 includes a sensor data reading portion 1011, a motion (change of motion) determination portion 1012, and a fallibility determination portion 1013. Further, the second VR space information providing unit 112 includes a model candidate reading portion 1014, an impression evaluation value (real space) calculation portion 1015, an impression evaluation value (VR space) calculation portion 1016, and a model candidate selection portion 1017.

The sensor data reading portion 1011 reads pieces of sensor data which correspond to a predetermined amount, in a case where the pieces of sensor data which correspond to the predetermined amount are accumulated in the sensor data storage unit 114. In addition, the sensor data reading portion 1011 reads pieces of sensor data which are accumulated in the sensor data storage unit 114 and correspond to a predetermined time period, for each predetermined time period.

The motion (change of motion) determination portion 1012 calculates region information of a region of the avatar, which is set as a monitoring target in the VR space, based on the pieces of sensor data which have been read by the sensor data reading portion 1011. The motion (change of motion) determination portion 1012 determines whether or not the region value included in the region information of the region as the monitoring target is changed by a predetermined amount or more. In a case where it is determined to be changed by the predetermined amount or more, the motion (change of motion) determination portion 1012 determines the type of a motion of the region as the monitoring target. The motion (change of motion) determination portion 1012 stores the determined type of the motion in "the motion-type determination log table" in the log storage unit 116.

In a case where the motion (change of motion) determination portion 1012 determines the type of the motion, the fallibility determination portion 1013 determines whether or not the impression gap occurrence situation occurs, with reference to the fallibility-threshold range map. For example, the fallibility determination portion 1013 specifies a position of each region of the avatar in the VR space by using the region information of each region of the avatar, which has been calculated by the motion (change of motion) determination portion 1012. The fallibility determination portion 1013 determines whether or not a position in the real space, which corresponds to the specified position is included in the fallibility-threshold range in the fallibility-threshold range map. In a case where it is determined to be included, the fallibility determination portion 1013 determines that the impression gap occurrence situation occurs. In a case where it is determined not to be included, the fallibility determination portion 1013 determines that the impression gap occurrence situation does not occur. In a case where it is determined that the impression gap occurrence situation occurs, the fallibility determination portion 1013 notifies the model candidate reading portion 1014 that the impression gap occurrence situation occurs.

If the model candidate reading portion 1014 receives a notification indicating that the impression gap occurrence situation occurs, from the fallibility determination portion 1013, the model candidate reading portion 1014 reads avatar region displacement data which is stored as the model candidate in the log storage unit 116. Model candidate reading processing will be described later in detail with reference to FIG. 26.

The impression evaluation value (real space) calculation portion 1015 inputs the sensor data which has been read by the sensor data reading portion 1011, to an API for calculating an impression evaluation value. Thus, the impression evaluation value (real space) calculation portion 1015 calculates the impression evaluation value, and notifies the model candidate selection portion 1017 of the calculated impression evaluation value.

As the sensor data input to the API for calculating an impression evaluation value, sensor data acquired in a time period when the sensor data used for determining the type of the motion has been acquired is used among pieces of sensor data which have been read by the sensor data reading portion 1011. The time period when the sensor data used for determining the type of the motion has been acquired means a time period which includes a time stamp at which the sensor data used for determining the type of the motion has been acquired, and includes a time stamp close to the data acquisition time stamp. The sensor data acquired in the time period when the sensor data used for determining the type of the motion has been acquired may be all pieces of sensor data acquired in this time period. In addition, the sensor data may be sensor data used for determining the type of the motion, among pieces of sensor data which have been acquired in this time period.

The impression evaluation value (VR space) calculation portion 1016 inputs avatar region displacement data which has been read as the model candidate by the model candidate reading portion 1014, to the API for calculating the impression evaluation value. Thus, the impression evaluation value (VR space) calculation portion 1016 calculates the impression evaluation value, and notifies the model candidate selection portion 1017 of the calculated impression evaluation value.

The model candidate selection portion 1017 compares the impression evaluation value of which a notification is performed by the impression evaluation value (real space) calculation portion 1015, to the impression evaluation value of which a notification is performed by the impression evaluation value (VR space) calculation portion 1016. The model candidate selection portion 1017 selects a model candidate in which the impression evaluation value close to the impression evaluation value of which a notification is performed by the impression evaluation value (real space) calculation portion 1015 is calculated. The model candidate selection portion 1017 notifies the VR space information generation portion 1002 of the selected model candidate.

In a case where the VR space information generation portion 1002 receives a notification of the model candidate from the model candidate selection portion 1017, the VR space information generation portion 1002 generates an image of the avatar by using the model candidate of which the notification is performed. At this time, the VR space information generation portion 1002 determines one model candidate from selected model candidates, and generates the image of the avatar. The one model candidate may be randomly determined, or may be determined in an order of high priority. The priority is assigned to each model candidate when the model candidate is generated. As the one model candidate, a model candidate in which a difference of a motion with an image of the avatar right before an avatar to be set to be displayed is smallest may be determined.

In the above descriptions, the VR space information generation portion 1002 generates VR space information which includes an image of the avatar, which has been updated, and an image of the avatar of which a motion is not updated. In addition, the VR space information transmission portion 1003 transmits the generated VR space information to the client device 120. However, after the VR space information transmission portion 1003 transmits the VR space information once, the VR space information transmission portion 1003 may transmit only update information (updated image of the avatar, attribute information (position, rotation angle, display color, display form, and the like of a bone or a mesh) of an object in the VR space). In this case, in the client device 120, an image of the avatar in the VR space is updated based on the update information.

In the VR space displaying processing in the client device, an image of the avatar may be updated based on sensor data which is provided in the client device when the visual field image is generated (Step S905), and then the model candidate may be selected.

That is, sensor data which is the same as the sensor data used for updating the image of the avatar in the client device may be processed in the server apparatus, and the model candidate may be selected. Then, the image of the avatar may be transmitted as the VR space information by the server apparatus.

For example, discrepancy between generation processing of an image of the avatar based on the sensor data in the client device, and generation processing of an image of the avatar in the server apparatus may occur due to a problem such as a delay of a communication between the client device and the server apparatus. In such a case, for example, a form in which two types of the generation processing for the image of the avatar are respectively applied to different regions of the avatar may be made.

For example, an image of the avatar which has been generated based on the sensor data in the client device may be reflected to a region of the avatar, which is expressed as the shadow of the avatar. An image of the avatar, which has been generated in the server apparatus may be reflected to a region of the avatar, which is expressed as the main body of the avatar.

Only in a case where an image of the avatar is not generated as a result obtained by the server apparatus processing the acquired sensor data, the image of the avatar may be generated in the client device. Thus, it is possible to avoid twice generation of an image of the avatar in the client device based on the same sensor data.

Descriptions for Sensor Data

Next, sensor data (head posture data, depth data, and EMG data) except for voice data, among pieces of sensor data stored in the sensor data storage unit 114 will be described with reference to FIGS. 11 to 13. In the following descriptions, descriptions for the voice data will be omitted, and a case where the sensor data includes head posture data, depth data, and EMG data will be described.

In the following descriptions, regarding a position and a rotation angle, it is assumed that a position is uniquely determined in the VR space, and a rotation angle indicates a rotation against XYZ axes in the VR space.

Descriptions for Head-Posture Data Table

FIG. 11 is a diagram illustrating an example of a head-posture data table. As illustrated in FIG. 11, a head-posture data table 1100 includes a "recording time stamp", a "data acquisition time stamp", a "user name", a "client device ID", and a "head posture data (position, rotation angle)", as items of information.

A time stamp when head posture data is stored in the sensor data storage unit 114 is recorded in the "recording time stamp". A time stamp when the head posture data is acquired by the sensor data acquisition unit 702 is recorded in the "data acquisition time stamp".

A user name of a user who uses the head posture sensor is recorded in the "user name". When the sensor data transmission unit 703 transmits head posture data as the sensor data, the sensor data transmission unit 703 transmits a user name of a user who uses the head posture sensor, together.

An identifier for identifying a client device which transmits the sensor data including the head posture data is recorded in the "client device ID". When the sensor data transmission unit 703 transmits the sensor data to the server apparatus 110, the sensor data transmission unit 703 transmits an identifier for identifying the client device, in correlation with the sensor data. The sensor data transmission unit 703 may transmit an identifier for identifying the head posture sensor, in addition to the identifier for identifying the client device. In this case, the identifier for identifying the head posture sensor is recorded in the "client device ID" together with the identifier for identifying the client device.

Position data and rotation angle data which correspond to the head posture data are recorded in the head posture data (position, rotation angle)". Specifically, data obtained by calculating the head posture data as a position of a vector on the VR space and a rotation angle to each of the XYZ axes is recorded in time series.

The example of FIG. 11 illustrates that the sensor data acquisition unit 702 acquires ((position), (rotation angle)) ="((0, 18, −18), (0, 0, 0)) as head posture data of the user 140 of which a user name is "A", at "11:00:00:000 July 27, 2015". In addition, the example illustrates that the head posture data is transmitted by the client device 120 of which a client device ID is "c1", and is stored in the sensor data storage unit 114 by the sensor data collection portion 1001 at "11:00:01:030 July 27, 2015".

Descriptions for Depth Data-File Table

FIG. 12 is a diagram illustrating an example of a depth data-file table. As illustrated in FIG. 12, a depth data-file table 1200 includes a "recording time stamp", a "data-acquisition start time stamp", and a "data-acquisition end time stamp", as items of information. Further, the depth data-file table 1200 includes a "user name", a "client device ID", and a "depth data file uniform resource identifier (URI)", as items of the information.

A time stamp when a depth data file is stored in the sensor data storage unit 114 is recorded in the "recording time stamp". A time stamp (for example, start time stamp of a predetermined time period) when the first data among pieces of data acquired from the depth sensor during the predetermined time period has been acquired is recorded in the "data-acquisition start time stamp". A time stamp (for example, end time stamp of the predetermined time period) when the last data among the pieces of data acquired from the depth sensor during the predetermined time period has been acquired is recorded in the "data-acquisition end time stamp". The pieces of data acquired from the depth sensor are recorded as depth sensor data files. Details of the depth data files vary depending on the type of the depth sensor. As an example, data such as depth image data, color image data, and infrared image data, which has different information for each pixel in the two-dimensional xy plane is detected. The information for each pixel corresponds to a distance value from the depth sensor if the data is depth image data, corresponds to an RGB value if the data is color image data, and corresponds to a gray-scale value if the data is an infrared image. As another example, image data such as depth image data, color image data, and infrared image data is processed, and as a result, data which has information, for example, indicating a pixel position at which a user exists in the image, or indicating a pixel position at which a face part of the user exists in the image is detected. In the first embodiment, descriptions will be made on the assumption that a depth data file includes at least depth image data and color image data. However, it is not limited thereto.

A user name of a user who uses the depth sensor 122 is recorded in the "user name". When the sensor data transmission unit 703 transmits a depth data file as the sensor data, the sensor data transmission unit 703 transmits the user name of a user who uses the depth sensor 122, together.

An identifier for identifying a client device which transmits sensor data including a depth data file is recorded in the "client device ID". When the sensor data transmission unit 703 transmits the sensor data to the server apparatus 110, the sensor data transmission unit 703 transmits an identifier for identifying the client device, in correlation with the sensor data. The sensor data transmission unit 703 may transmit an identifier for identifying the depth sensor, in addition to the identifier for identifying the client device. In this case, the identifier for identifying the depth sensor is recorded in the "client device ID" together with the identifier for identifying the client device.

A reference address of a folder which is a storing destination of the depth data file, and a file name of the depth data file are recorded in the "depth data file URI" in a defined format. Among the reference address and the file name, FIG. 12 illustrates only the file name.

The example of FIG. 12 illustrates that a depth data file of which a file name is "001.xef" is stored as a depth data file, in the sensor data storage unit 114. The example of FIG. 12 illustrates that the depth data file (001.xef) includes pieces of data acquired from "11:00:00:000 July 27, 2015" until "11:00:01:000 July 27, 2015". The example illustrates that the depth data file (001.xef) is data acquired by a depth sensor (s1) which is connected to a client device (client device ID="c1") used by a user 140 of which a user name is "A". In addition, the example illustrates that the depth data file (001.xef) is transmitted by the client device 120 having a client device ID of "c1", and is stored in the sensor data storage unit 114 at "11:00:01:030 July 27, 2015".

Descriptions for EMG Data Table

FIG. 13 is a diagram illustrating an example of a EMG data table. As illustrated in FIG. 13, a EMG data table 1300 includes a "recording time stamp", a "data acquisition time stamp", a "user name", a "client device ID", and "EMG data (EMG (μV))", as items of the information.

A time stamp when EMG data is stored in the sensor data storage unit 114 is recorded in the "recording time stamp". A time stamp when the EMG data is acquired by the sensor data acquisition unit 702 is recorded in the "data acquisition time stamp".

A user name of a user who uses the EMG sensor is recorded in the "user name". When the sensor data transmission unit 703 transmits EMG data as the sensor data, the sensor data transmission unit 703 transmits the user name of a user who uses the EMG sensor, together.

An identifier for identifying a client device which transmits the sensor data including the EMG data is recorded in the "client device ID". When the sensor data transmission unit 703 transmits the sensor data to the server apparatus 110, the sensor data transmission unit 703 transmits an identifier for identifying the client device, in correlation with the sensor data. A value of the EMG data is recorded in the "EMG data (EMG (μV))". The sensor data transmission unit 703 may transmit an identifier for identifying the EMG sensor, in addition to the identifier for identifying the client device. In this case, the identifier for identifying the EMG sensor is recorded in the "client device ID" together with the identifier for identifying the client device. Further, in a case where plural types of EMG sensors are mounted for one user, an identifier for identifying the type of the EMG sensor is also recorded together.

The example of FIG. 13 illustrates that EMG data of the user 140 of which an user name is "A" is sensed by a EMG sensor having a type which is specified by "zygomaticus (cheek)", at "11:00:01:000 July 27, 2015". The example illustrates that the sensed EMG data has EMG (μV) of "33.9". In addition, the example illustrates that the sensed EMG data is transmitted by the client device 120 of which a client device ID is "c1", and is stored in the sensor data storage unit 114 at "11:00:01:035 July 27, 2015".

Descriptions for Motion of Avatar

Next, a motion of a region of an avatar, which is set as a monitoring target by the motion (change of motion) determination portion 1012 will be described. The motion (change of motion) determination portion 1012 monitors a region value of a predetermined region of an avatar, which is calculated based on the sensor data, and determines whether or not the region value of the predetermined region of the avatar is changed by a predetermined amount or more.

A motion of the predetermined region of the avatar, which is set as the monitoring target by the motion (change of motion) determination portion 1012 includes a motion of the entirety of the body of the avatar, a motion of a portion of the body of the avatar, and a motion in which a facial expression is changed at a portion (face) of the body of the avatar.

The motion of the entirety of the body of the avatar includes, for example, a motion in which the avatar moves forward or backward or moves leftward or rightward, a motion in which the avatar changes a direction of the entirety of the body thereof, and the like. The motion in which the moves forward or backward or moves leftward or rightward can be indicated by, for example, a change of a position of a bone which is disposed at the central position of the avatar. Not a motion in which the position is moved as in a case where the avatar changes the traveling direction, but the motion in which the direction of the entirety of the body thereof is changed to the right or the left can be indicated by a change of an rotation angle around an axis against the axis which is extended in a direction perpendicular to the floor surface.

The motion of a portion of the body of the avatar includes, for example, a motion in which the upper body of the avatar moves so as to be leaned forward or backward, a motion in which the direction of the upper body is changed so as to cause the avatar to look around right and left, a motion in which the entirety of the upper body swings right and left, and the like. The motion of a portion of the body of the avatar includes, for example, a motion in which the avatar moves to cause the face to be directed upwardly or downwardly, a motion in which the avatar moves to cause the face to be directed rightwardly or leftwardly, and the like.

Among the above motions, the motion in which the upper body of the avatar moves so as to be leaned forward or backward, the motion in which the direction of the upper body is changed so as to cause the avatar to look around right and left, or the motion in which the entirety of the upper body swings right and left, and the like is indicated by, for example, a change of an rotation angle around an axis in a triaxial direction, which is obtained by using a position of the waist joint of the avatar as the origin point (change of "Bone_Chest"). Similarly, the motion in which the avatar moves to cause the face to be directed upwardly or downwardly, or the motion in which the avatar moves to cause the face to be directed rightwardly or leftwardly is indicated by, for example, a change of an rotation angle around the axis in the triaxial direction, which is obtained by using a position of the bone disposed at the position of the head of the avatar, as the origin point (change of "Bone_Head").

In addition, the motion in which the facial expression is changed at the portion (face) of the body of the avatar includes, for example, a motion in which the avatar directs an eye line thereof upwardly or downwardly, or directs the eye line thereof leftwardly or rightwardly, a motion in which a corner of the mouth of the avatar turns up or down, a motion in which an rotation angle of the eyebrow of a user is changed, and the like. The above motions are indicated by, for example, a score which relates to a change of a state of positions of a plurality of point groups on the face of the avatar, and a plane surrounded by the plurality of point groups (the positions of a plurality of point groups and the plane correspond to a skin of the lip, for example). Specifically, the motion is indicated by a score which is referred to as "IsSmile" relating to transition from a predetermined state of "Shape_Mouth" to another state thereof.

Figure 14:
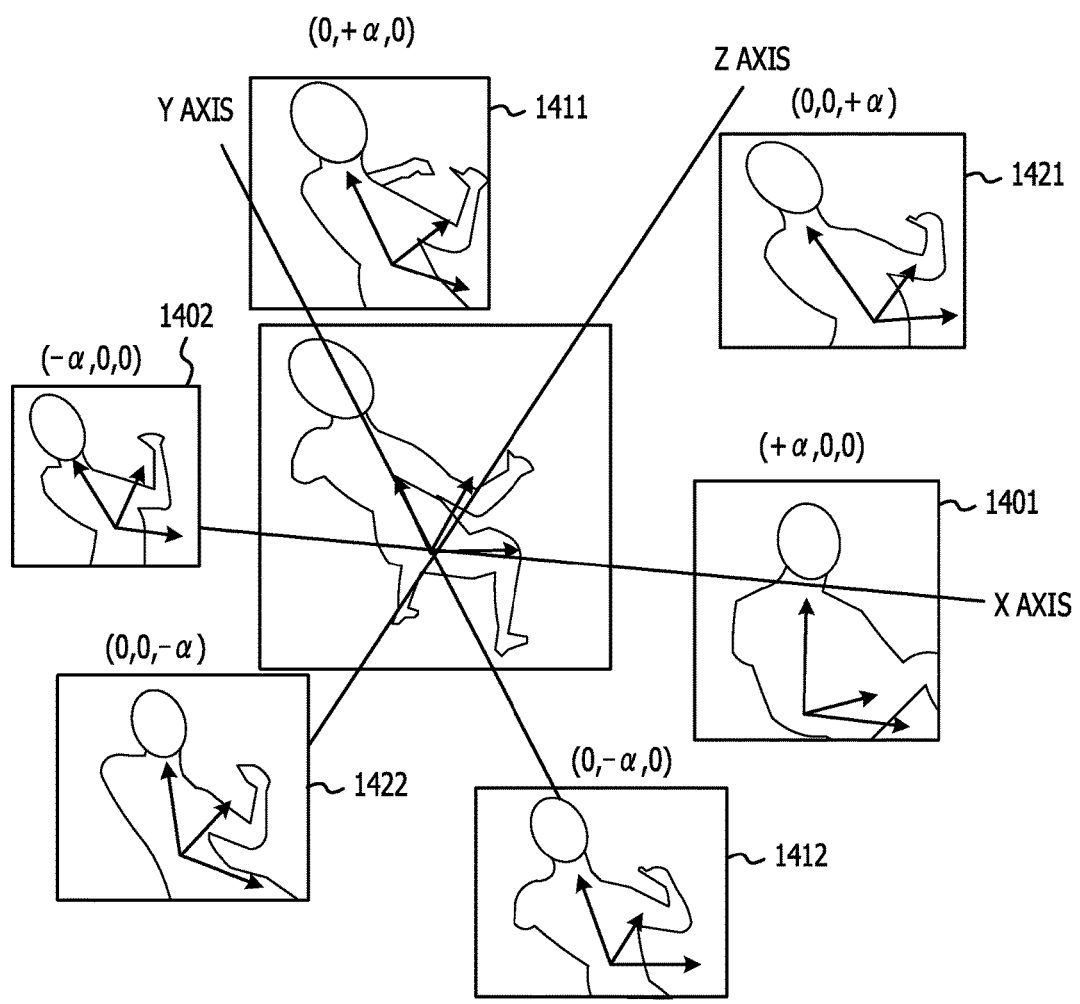
FIG. 14 is a diagram illustrating an example of a motion of an avatar.

The above-described expression method for a motion of the avatar is just an example. The motion of the avatar may be indicated by other expression methods. FIG. 14 is a diagram illustrating an example of the expression method for a motion of the avatar. FIG. 14 illustrates the motion in which the upper body of the avatar moves so as to be leaned forward or backward, the motion in which the direction of the upper body is changed so as to cause the avatar to look around right and left, and the motion in which the entirety of the upper body swings toward the right side or the left side. More specifically, the above motions are indicated by a change of a rotation angle around the axis in the triaxial direction, which is obtained by using the position of the waist of the avatar, as the origin point (change of "Bone_Chest").

In FIG. 14, the X axis, the Y axis, and the Z axis of the coordinate system, which are unique in the VR space respectively correspond to a right-and-left direction, an up-and-down direction, and a front-and-rear direction. The bone disposed at the position of the waist of the avatar is set as the center of rotation.

In FIG. 14, an image 1401 indicates a posture of the avatar in a case where the avatar rotates in the X axis by +α degrees. An image 1402 indicates a posture of the avatar in a case where the avatar rotates in the X axis by −α degrees.

An image 1411 indicates a posture of the avatar in a case where the avatar rotates in the Y axis by +α degrees. An image 1412 indicates a posture of the avatar in a case where the avatar rotates in the Y axis by −α degrees.

An image 1421 indicates a posture of the avatar in a case where the avatar rotates in the Z axis by +α degrees. An image 1422 indicates a posture of the avatar in a case where the avatar rotates in the Z axis by −α degrees.

Definition Information for Determining Type of Motion of Avatar

Next, definition information for determining the type of a motion of the avatar will be described. FIG. 15 is a diagram illustrating definition information for determining the type of a motion of the avatar, among pieces of definition information stored in a definition information storage unit.

As illustrated in FIG. 15, "sensor data" used for determining the type of a motion, and an identifier ("sensor ID") of a sensor for acquiring the sensor data are defined in definition information (for behavior) 1500. A region as a "monitoring target" among regions of the avatar, and a "threshold value" are defined in the definition information (for behavior) 1500. The "threshold value" is used for determining whether or not the region to be monitored moves by a predetermined amount or more. A "type of a motion" is further defined in the definition information (for behavior) 1500. The "type of a motion" is specified in a case where it is determined that the region to be monitored moves by the predetermined amount or more.

For example, the motion (change of motion) determination portion 1012 monitors a change of a rotation angle (change of "Bone_Chest") around the axis in the triaxial direction by using the position of the waist of the avatar as the origin point. The motion (change of motion) determination portion 1012 performs the monitoring based on depth data which has been acquired by a depth sensor having a sensor ID of "s2". If "Bone_Chest" is detected to be rotated around the X axis by +5 degrees or more, the motion (change of motion) determination portion 1012 determines that lean forward occurs.

The motion (change of motion) determination portion 1012 monitors a change of an rotation angle around the axis in the triaxial direction, which is obtained by using a position of the bone disposed at the position of the head of the avatar, as the origin point (change of "Bone_Head"). The motion (change of motion) determination portion 1012 performs the monitoring based on head posture data which has been acquired by a head posture sensor having a sensor ID of "s1". If "Bone_Head" is detected to be rotated around the X axis by +5 degrees or more, the motion (change of motion) determination portion 1012 determines that the direction of the face is changed.

The motion (change of motion) determination portion 1012 monitors a change of a point group around the mouth, which includes the corner of the mouth of the avatar (change of "Shape_Mouth"). The change of "Shape_Mouth" relates to the parameter (IsSmile) which indicates a degree of a change of a mouth expression. The value of IsSmile is assigned such that, if "IsSmile"=0, the value thereof indicates the position of the point group in a state where the mouth is closed, and if "IsSmile"=1, the value thereof indicates the position of the point group in a state where the mouth is largely opened.

The motion (change of motion) determination portion 1012 performs the monitoring of "IsSmile" based on EMG data which has been acquired by an EMG sensor having a sensor ID of "s3". If it is detected that "IsSmile" is more than 0.5, the motion (change of motion) determination portion 1012 determines that the mouth expression is changed.

Descriptions for Motion-Type Determination Log Table

Next, the motion-type determination log table will be described. If the region value of a region of the avatar, which is set as a monitoring target is changed by a predetermined amount or more, in accordance with behavior of a user, and the type of a motion is determined by the motion (change of motion) determination portion 1012, the determined type of the motion and the like are stored in the motion-type determination log table of the log storage unit 116.

FIG. 16 is a diagram illustrating an example of the motion-type determination log table. As illustrated in FIG. 16, the motion-type determination log table 1600 includes a "recording time stamp", a "change occurrence time stamp", a "user name", a "client device ID", and a "region information before a change and after the change", as items of information.

A time stamp when a new data line is added to the log storage unit 116, and the type of a motion is stored is recorded in the "recording time stamp". A time stamp when sensor data used for determining the type of a motion is acquired is recorded in the "change occurrence time stamp".

A user name of a user which functions as the source of the avatar is recorded in the "user name". An identifier for identifying a client device which transmits sensor data used for determining the type of a motion is recorded in the "client device ID".

Region information before a change and region information after the change when the type of the motion has been determined are recorded in the "region information before a change and after the change".

The example (data line 1601) of FIG. 16 illustrates that the data line 1601 has been added to the motion-type determination log table 1600 in the log storage unit 116, at "11:02:00:000 July 27, 2015". The example (data line 1601) in FIG. 16 illustrates that the mouth expression change has occurred in accordance with behavior of the user 140 having a user name of "A". The example (data line 1601) in FIG. 16 illustrates that it is determined that the mouth expression change has occurred, based on sensor data which has been acquired at "11:00:01:000 July 27, 2015". The example (data line 1601) in FIG. 16 illustrates that the sensor data is sensor data transmitted by the client device 120 having a client device ID of "c1". The example (data line 1601) in FIG. 16 illustrates that the parameter "IsSmile" relating to the "Shape_Mouth" which is region information of the avatar is changed from "0.5" to "0.8".

Descriptions for Model Candidate

Next, a model candidate which is stored in the log storage unit 116 by the VR space information generation portion 1002 will be described. FIG. 17 is a diagram illustrating an example of the model candidate.

As illustrated in FIG. 17, the model candidate includes region information of each region of the avatar. FIG. 17 illustrates that a model candidate 1700 in FIG. 17 is avatar region displacement data in which "HeadBone" is included as information for specifying the type of a region, and a position of (0, 18, −10), and an rotation angle of (0, 1, 0) are included as a region value.

Figure 18:
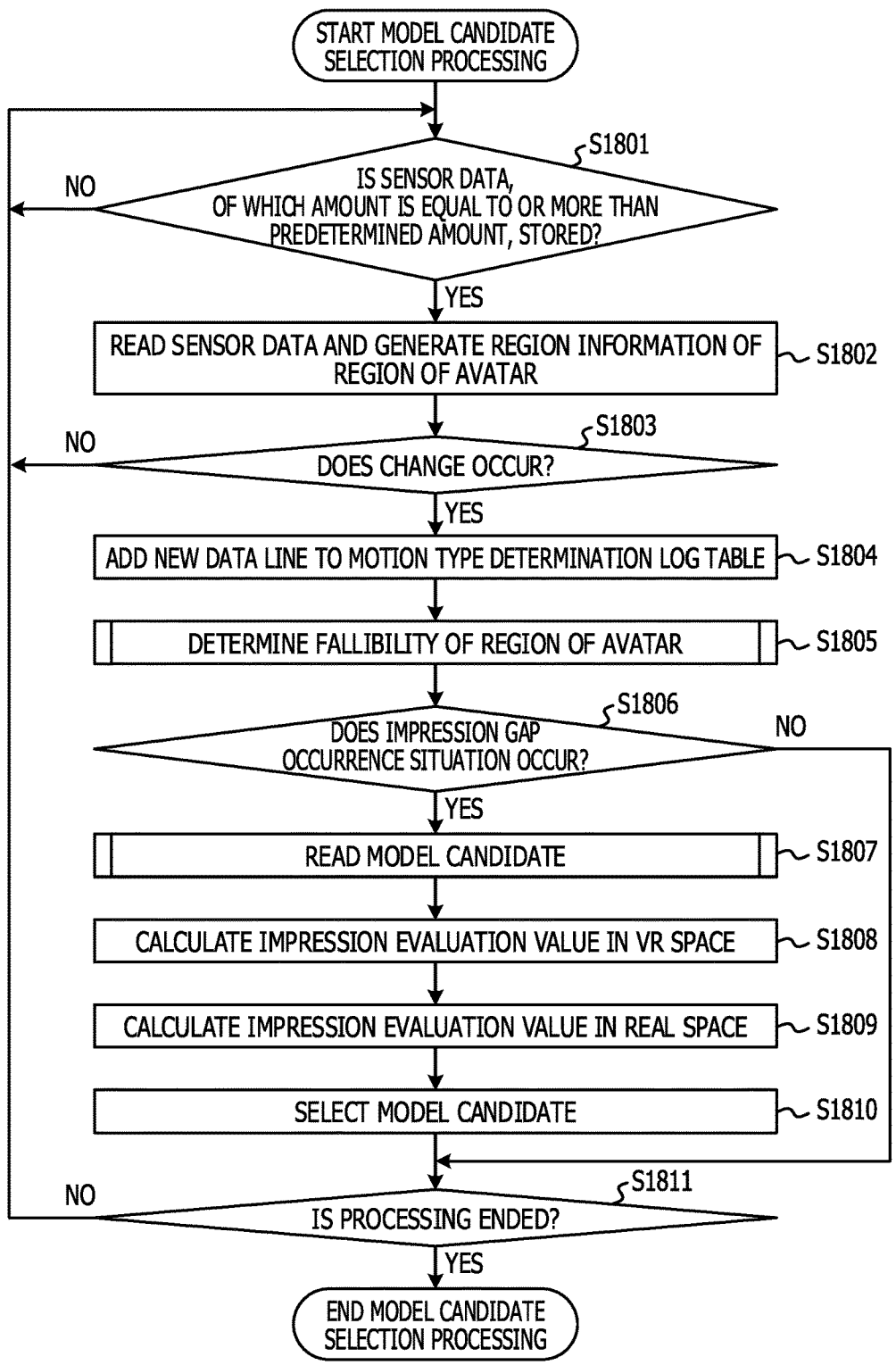
FIG. 18 is a first flowchart illustrating model candidate selection processing.

Model Candidate Selection Processing Performed by Second VR Space Information Providing Unit of Server Apparatus Next, a flow of model candidate selection processing which is performed by the second VR space information providing unit 112 of the server apparatus 110 will be described. FIG. 18 is a flowchart of the model candidate selection processing.

In Step S1801, the sensor data reading portion 1011 determines whether or not an amount of sensor data accumulated in the sensor data storage unit 114 is equal to or more than a predetermined amount. In Step S1801, in a case where it is determined that the amount of the accumulated sensor data is not equal to or more than the predetermined amount (No in Step S1801), the sensor data reading portion 1011 waits until the amount of the accumulated sensor data is equal to or more than the predetermined amount.

In Step S1801, in a case where it is determined that the amount of the accumulated sensor data is equal to or more than the predetermined amount (Yes in Step S1801), the process proceeds to Step S1802. In Step S1802, the sensor data reading portion 1011 reads pieces of sensor data corresponding to the predetermined amount. The motion (change of motion) determination portion 1012 generates region information of each region (region to be monitored) of the avatar in the VR space, based on the pieces of sensor data which have been read.

In Step S1803, the motion (change of motion) determination portion 1012 compares the "threshold value" which has been defined in the definition information (for behavior) 1500, to the region information. The motion (change of motion) determination portion 1012 determines whether or not the region value of the region of the avatar, which is set as a monitoring target is changed by a predetermined amount or more. In Step S1803, in a case where it is determined that the change by the predetermined amount or more does not occur (No in S1803), the process returns to Step S1801. In Step S1803, in a case where it is determined that the change by the predetermined amount or more occurs (Yes in S1803), the process proceeds to Step S1804.

In Step S1804, the motion (change of motion) determination portion 1012 adds a new data line to the motion-type determination log table 1600, and stores the determined type of the motion, and the like.

In Step S1805, the fallibility determination portion 1013 performs "fallibility determination processing of each region of an avatar" with reference to the fallibility-threshold range map, so as to determine whether or not the impression gap occurrence situation occurs. The fallibility determination processing of each region of an avatar will be described later in detail with reference to FIG. 19A.

As a result of the determination processing in Step S1805, in a case where it is determined that the impression gap occurrence situation does not occur, the process proceeds to Step S1811 from Step S1806. In a case where it is determined that the impression gap occurrence situation occurs, the process proceeds to Step S1807 from Step S1806.

In Step S1807, the model candidate reading portion 1014 performs processing ("model candidate reading processing") in which avatar region displacement data is read in accordance with the type of the motion determined in Step S1803, among pieces of avatar region displacement data stored in the log storage unit 116. The model candidate reading processing will be described later in detail with reference to FIG. 19B.

In Step S1808, the impression evaluation value (VR space) calculation portion 1016 calculates an impression evaluation value in the VR space, for each of model candidates which have been read in Step S1807.

In Step S1809, the impression evaluation value (real space) calculation portion 1015 calculates an impression evaluation value in the real space, based on the sensor data which has been read in Step S1802.

In Step S1810, the model candidate selection portion 1017 compares the impression evaluation of each model candidate in the VR space, which has been calculated in Step S1808, to the impression evaluation value of a user in the real space, which has been calculated in Step S1809. The model candidate selection portion 1017 extracts an impression evaluation value of a model candidate in the VR space, which is close to the impression evaluation value of the user in the real space, as a result of the comparison. The model candidate selection portion 1017 selects a model candidate corresponding to the extracted impression evaluation value, as a model used for generating an image of the avatar. The model candidate selection portion 1017 notifies the VR space information generation portion 1002 of the selected model candidate.

In Step S1811, the sensor data reading portion 1011 determines whether or not the model candidate selection processing is ended. In a case where it is determined to not be ended in Step S1811 (No in Step S1811), the process returns to Step S1801, and the model candidate selection processing continues. In a case where it is determined to be ended (Yes in Step S1811), the model candidate selection processing is ended.

Flow of Fallibility Determination Processing of Each Region of Avatar

Figure 19A:
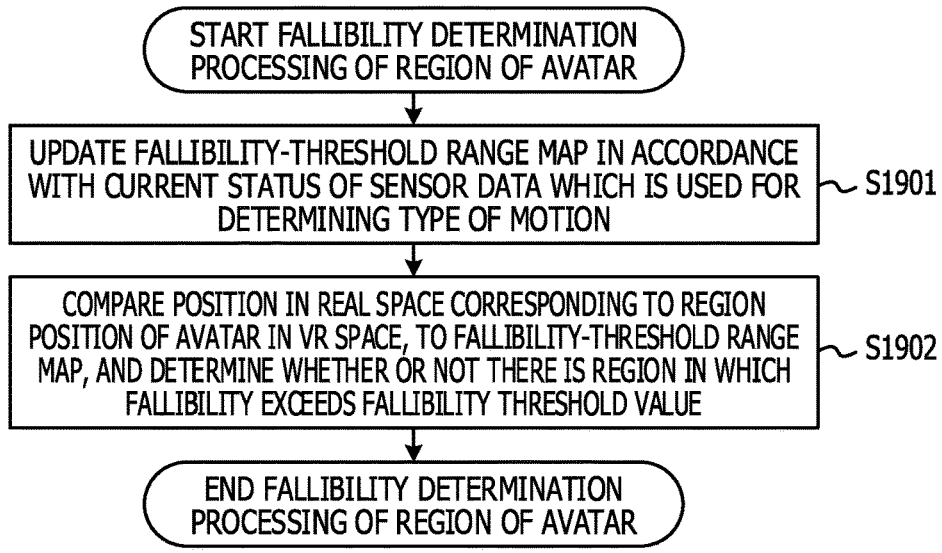
FIGS. 19A and 19B are flowcharts illustrating fallibility determination processing and model candidate reading processing for each region of an avatar.

Next, the fallibility determination processing (Step S1805 in FIG. 18) of each region of an avatar will be described in detail. FIG. 19A is a flowchart illustrating the fallibility determination processing of each region of an avatar.

In Step S1901, the fallibility determination portion 1013 updates the fallibility-threshold range map in accordance with the current status of the sensor data which is used for determining the type of a motion, in Step S1803 of FIG. 18.

In Step S1902, the fallibility determination portion 1013 determines whether or not a position in the real space, which corresponds to a position of a region of the avatar in the VR space is included in a fallibility-threshold range of the updated fallibility-threshold range map. In a case where the position is included in the fallibility-threshold range, the fallibility determination portion 1013 determines that the impression gap occurrence situation occurs. In a case where the position is not included in the fallibility-threshold range, the fallibility determination portion 1013 determines that the impression gap occurrence situation does not occur. In a case where it is determined that the position in the real space, which corresponds to a position of a certain region among positions of regions of the avatar is included in the fallibility-threshold range, the fallibility determination portion 1013 determines that the impression gap occurrence situation occurs. The determination method is not limited thereto. Determination of whether or not fallibility exceeds a threshold value may be comprehensively performed, and thus it may be determined whether or not the impression gap occurrence situation occurs.

In a case where the position in the real space, which corresponds to the position of a predetermined region of the avatar is included in the fallibility-threshold range, the region of the avatar is referred below to as "a region in which the fallibility exceeds the threshold value".

Flow of Model Candidate Reading Processing

Figure 19B:
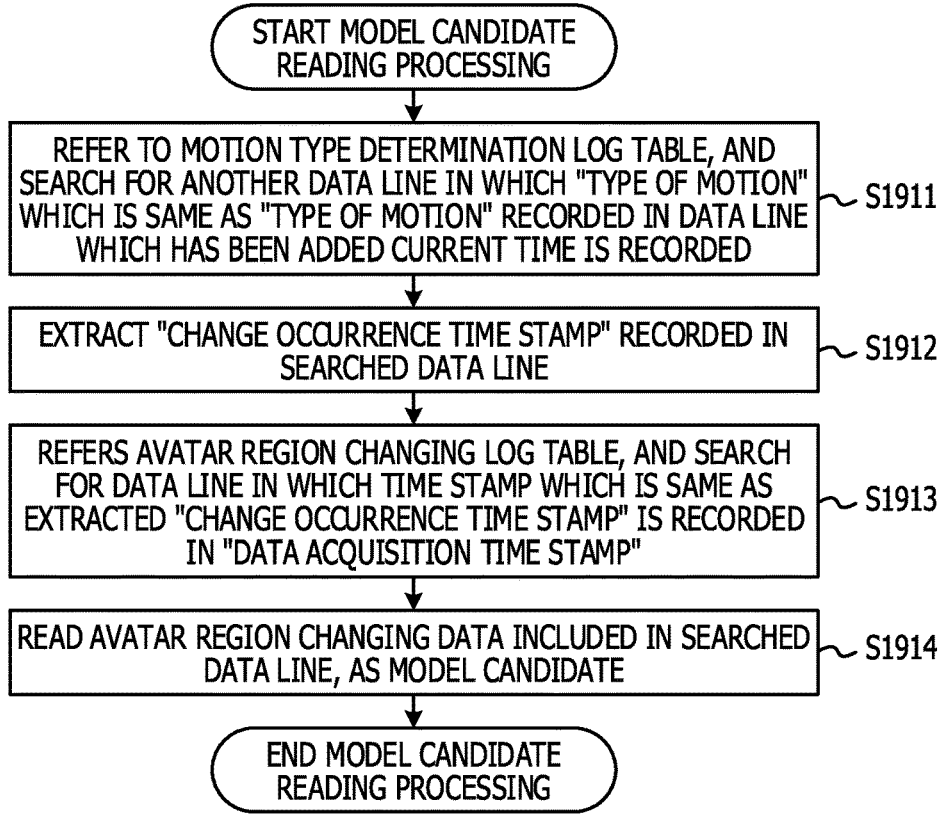

Next, the model candidate reading processing (Step S1807 in FIG. 18) will be described in detail. FIG. 19B is a flowchart illustrating the model candidate reading processing.

In Step S1911, the model candidate reading portion 1014 searches for another data line in which "the type of a motion" which is the same as "the type of a motion" recorded in the data line which has been added in Step S1804 is recorded, with reference to the motion-type determination log table 1600.

In Step S1912, the model candidate reading portion 1014 extracts the "change occurrence time stamp" recorded in each of data lines searched for in Step S1911.

In Step S1913, the model candidate reading portion 1014 searches for a data line in which a time stamp which is the same as that in the "change occurrence time stamp" extracted in Step S1912 is recorded in the "data acquisition time stamp", with reference to an avatar-region displacement log table 2000.

In Step S1914, the model candidate reading portion 1014 reads avatar region displacement data included in the data line which has been searched for in Step S1013, as a model candidate, with reference to the avatar-region displacement log table 2000. Thus, the model candidate reading portion 1014 can read a model candidate in accordance with the type of a motion.

Descriptions for Avatar-Region Displacement Log Table

Next, the avatar-region displacement log table in which avatar region displacement data is stored will be described. FIG. 20 is a diagram illustrating an example of the avatar-region displacement log table.

As illustrated in FIG. 20, the avatar-region displacement log table 2000 includes a "recording time stamp", a "data acquisition time stamp", a "user name", a "client device ID", an "avatar-region displacement type", and "avatar region displacement data", as items of information.

A time stamp when an image of the avatar is generated, and region information of a region of the avatar, which is used for generating the image of the avatar is stored as avatar region displacement data in the avatar-region displacement log table 2000 of the log storage unit 116 is recorded in the "recording time stamp".

A time stamp when the sensor data used for generating region information which is included in the avatar region displacement data is acquired is recorded in the "data acquisition time stamp".

A user name of a user which functions as the source of the avatar is recorded in the "user name". An identifier for identifying a client device which is used by a user functioning as the source of the avatar is recorded in the "client device ID".

The type of region information of a region in an image of the avatar is recorded in the "avatar-region displacement type". The avatar-region displacement type of "particle" means that the type of region information indicates data in which a surface structure or an internal structure of the avatar is expressed by a set of countless point groups. The avatar-region displacement type of "bone" means that the type of region information indicates data in which the structure is expressed by a determined bone structure of the avatar. The avatar-region displacement type of "mesh" means that the type of region information indicates data in which the skin, clothes, or the like on a surface layer of the avatar is expressed by a set of a plurality of points or surfaces.

In a case where the avatar-region displacement type is "particle" or "mesh", region information of a region of the avatar is indicated by a matrix (value in the xyz coordinates in the VR space). In a case where the avatar-region displacement type is "bone", the region information of a region of the avatar is indicated by a position and a rotation angle of each bone.

Region information of a region in the generated image of the avatar is recorded in the "avatar region displacement data". The region information recorded in the "avatar region displacement data" is used as a model candidate.

In the above descriptions, processing in a case where an image of the avatar is generated is described. However, the above descriptions are similarly applied to a case where voice of an avatar or a tactile sense of an avatar (feel provided when an avatar is touched from another avatar) is generated. That is, "utterance" or "touch" is stored in the "avatar-region displacement type" of the avatar-region displacement log table 2000. When voice data or tactile data is stored as the "avatar region displacement data", similar processing can be also performed.

As apparent from the above descriptions, in a case where it is determined that the impression gap occurrence situation occurs, the image generating system 100 in the first embodiment generates an image of an avatar by using a model which has been determined among a plurality of model candidates. At this time, the image generating system 100 selects a model candidate having an impression evaluation value close to the impression evaluation value in the real space, which has been calculated based on behavior of a person in the real space, among model candidates which have been read based on the type of a motion of an avatar.

Thus, according to the first embodiment, it is possible to determine a model such that there is no gap between an impression to other person through a motion of an avatar and an impression to the other person by behavior of the person in the real space. That is, it is possible to suppress a gap between an impression to other person through a motion of an avatar, and an impression to the other person by real behavior of a person which functions as the source of the avatar.

Second Embodiment

In the first embodiment, in a case where a new data line is added to the motion-type determination log table 1600, the previous data line which has the type of a motion which is the same as the type of a motion, and is included in the added data line is searched for. Thus, in the first embodiment, the avatar region displacement data in accordance with the type of a motion of an avatar is read as a model candidate.

On the contrary, in a second embodiment, in a case where a new data line is added to the motion-type determination log table 1600, "the type of a motion for another avatar" is determined based on sensor data. "A tendency" corresponding to the determined type of a motion for another avatar is determined, and avatar region displacement data depending on the determined "tendency" is read as a model candidate. Thus, according to the second embodiment, avatar region displacement data depending on tendency (corresponding to tendency of social behavior referred in the real space) for another avatar can be read as a model candidate. The second embodiment will be described below, focused on a difference from the first embodiment.

Functional Configuration of Server Apparatus

Figure 21:
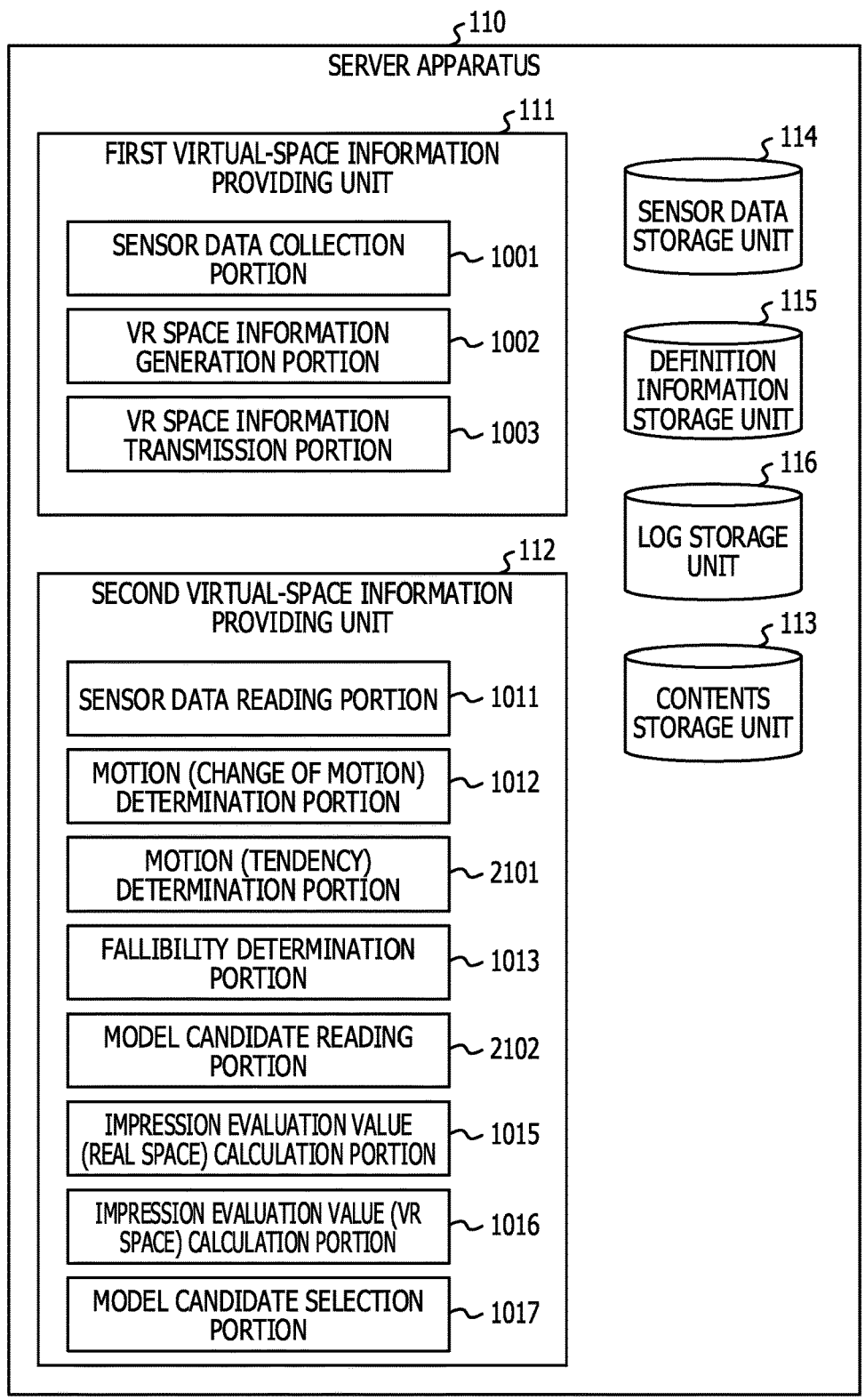
FIG. 21 is a second diagram illustrating an example of the functional configuration of the server apparatus.

Firstly, a functional configuration of the server apparatus 110 in the second embodiment will be described. FIG. 21 is a second diagram illustrating an example of the functional configuration of the server apparatus.

A motion (tendency) determination portion 2101 is a difference between the functional configuration illustrated in FIG. 21, and the functional configuration illustrated in FIG. 10. That is, a function of a model candidate reading portion 2102 is different from a function of the model candidate reading portion 1014 in FIG. 10. In addition, the functional configuration illustrated in FIG. 21 is different from the functional configuration illustrated in FIG. 10, in that the definition information storage unit 115 stores "definition information regarding the type of a motion for another avatar" and "definition information in which a relation between the type of a motion for another avatar and tendency thereof is defined.

In a case where a new data line is added to the motion-type determination log table 1600, the motion (tendency) determination portion 2101 determines the type of a motion for another avatar, based on sensor data which has been read by the sensor data reading portion 1011. Specifically, the motion (tendency) determination portion 2101 reads an API which is stored in the definition information storage unit 115 and is used for determining the type of a motion for another avatar. The motion (tendency) determination portion 2101 inputs sensor data to the read API, and thus determines the type of a motion for another avatar. A start time stamp is referred below to as "a determination time stamp (start)", and an end time stamp is referred to as "a determination time stamp (end)". The start time stamp is used for defining duration of sensor data which has been input to the API among pieces of sensor data read by the sensor data reading portion 1011.

The motion (tendency) determination portion 2101 adds and stores the determined type of a motion for another avatar in a "motion-type determination log table for another avatar" of the log storage unit 116. The determined type of a motion for another avatar is added and stored as a new data line.

The model candidate reading portion 2102 determines tendency of a motion for another avatar. "Definition information in which a relation between the type of a motion for another avatar, and tendency thereof is defined" is stored in the definition information storage unit 115. The model candidate reading portion 2102 refers to the definition information storage unit 115, and thus determines tendency of a motion for another avatar.

The model candidate reading portion 2102 reads avatar region displacement data in accordance with the determined tendency, among pieces of avatar region displacement data which have been stored as model candidates in the log storage unit 116.

For example, tendency of a motion for another avatar, which has been determined by the motion (tendency) determination portion 2101 is set to be "tendency of closeness". In this case, the model candidate reading portion 2102 reads avatar region displacement data in accordance with the "tendency of closeness", as a model candidate, among the pieces of avatar region displacement data, which have been stored as model candidates in the log storage unit 116.

Definition Information for Determining Type of Motion for Another Avatar

Next, the definition information which is stored in the definition information storage unit 115, and is used when the motion (tendency) determination portion 2101 determines the type of a motion for another avatar will be described. FIG. 21 is a diagram illustrating definition information for determining the type of a motion for another avatar.

As illustrated in FIG. 22A, an API used when the type of a motion for another avatar is determined is defined in definition information (API) 2201, for each "type of a motion". If the motion (change of motion) determination portion 1012 determines the type of a motion, the motion (tendency) determination portion 2101 performs the corresponding API. In the example of FIG. 22A, in a case where the type of a motion is "lean forward", a posture analysis API is performed, and the type of a motion for another avatar is determined.

As illustrated in FIG. 22B, an "API", "sensor data" input to the corresponding API, and "the type of a motion for another avatar" which is determined by inputting the sensor data are defined in definition information (for social behavior) 2202. Further, "a sensor ID" of a sensor which outputs the corresponding sensor data is defined in the definition information (for social behavior) 2202.

For example, depth data transmitted from the depth sensor 132 having a sensor ID of "s2" is input to the posture analysis API. Thus, the motion (tendency) determination portion 2101 determines whether or not a motion for other avatar is a motion ("body-close-to") close to the other avatar.

The motion (tendency) determination portion 2101 determines whether or not a motion for other avatar is a motion ("body-far-to") far from the other avatar. The determination is performed by using the posture analysis API.

Head posture data transmitted from the head posture sensor 124 having a sensor ID of "s1" is input to a face direction analysis API. Thus, the motion (tendency) determination portion 2101 determines whether or not a motion for other avatar is a motion ("face-close-to") of directing the face to the other avatar.

In the example of FIG. 22B, a case in which one type of sensor data is used when one type is determined as the type of a motion for another avatar is described. However, when one type is determined as the type of a motion for another avatar, plural types of sensor data may be used.

Definition Information in which Relation Between Type of Motion for Another Avatar and Tendency is Defined Next, definition information in which a relation between the type of a motion for another avatar, and tendency thereof is defined will be described. The definition information is stored in the definition information storage unit 115. FIG. 23 is a diagram illustrating an example of definition information in which a relation between the type of a motion for another avatar, and tendency thereof is defined.

As illustrated in FIG. 23, definition information 2300 includes "the type of a motion for another avatar" and "tendency of closeness/tendency of averting", as items of information. The type of a motion for another avatar which may be determined by the motion (tendency) determination portion 2101 is stored in the "type of a motion for another avatar". Either of tendency of closeness and tendency of averting is stored in the "tendency of closeness/tendency of averting", for each type of a motion for another avatar.

Motion-Type Determination Log Table for Another Avatar

Next, a "motion-type determination log table for another avatar" of the log storage unit 116 in which the type of a motion for another avatar determined by the motion (tendency) determination portion 2101 is stored will be described. FIG. 24 is a diagram illustrating an example of the motion-type determination log table for another avatar. As illustrated in FIG. 24, a motion-type determination log table for another avatar 2400 includes a "log ID", a "recording time stamp", a "determination time stamp (start)", and a "determination time stamp (end)", as items of information. Further, the motion-type determination log table for another avatar 2400 includes a "user name", a "client device ID", the "type of a motion for another avatar", a "user name of another avatar", and "region information at a starting time and at an ending time", as items of information.

An identifier for identifying a data line in the motion-type determination log table for another avatar 2400 is recorded in the "log ID".

A time stamp when a new data line is added to the motion-type determination log table for another avatar 2400 in the log storage unit 116 is recorded in the "recording time stamp". A starting time stamp is recorded in the "determination time stamp (start)" regarding pieces of sensor data (sensor data input to an API) during predetermined duration, which are used for determining the type of a motion for another avatar. An ending time stamp is recorded in the "determination time stamp (end)" regarding the pieces of sensor data (sensor data input to an API) during predetermined duration, which are used for determining the type of a motion for another avatar.

A user name of a user which functions as the source of the avatar is recorded in the "user name". An identifier for identifying a client device which transmits sensor data used for determining the type of a motion for another avatar is recorded in the "client device ID".

The type of a motion for another avatar is recorded in the "type of a motion for another avatar". The type of a motion for another avatar is determined by inputting sensor data to an API depending on the type of the motion. A user name of a user which functions as the source of another avatar is recorded in the "user name of another avatar".

Region information at the "determination time stamp (start)" and region information at the "determination time stamp (end)" are recorded in the "region information at a starting time and at an ending time". Thus, if the motion-type determination log table for another avatar 2400 is used as a reference, it is possible to recognize details of a motion of an avatar when the type of the motion for another avatar is determined.

The example of a data line 2401 in FIG. 24 indicates that a new data line is added to the motion-type determination log table for another avatar 2400 in the log storage unit 116 at "11:02:03:020 Jul. 27, 2015", and a log ID of "100" is attached to the added data line. The example of the data line 2401 indicates that the type of a motion for another avatar (user name="B") is determined by an avatar of the user 140 having a user name of "A", and sensor data used in the determination is transmitted from the client device having a client device ID of "c1".

The example of the data line 2401 indicates that the sensor data used for determining the type of a motion for another avatar is acquired in a time period of "11:00:04:000 Jul. 27, 2015" to "11:01:05:000 Jul. 27, 2015". The example of the data line 2401 indicates that region information (region information having a changed region value) which functions as a trigger for determining the type of a motion for another avatar is "Bone_Chest". The example of the data line 2401 indicates that the bone of the waist of the avatar has a position of (0, 8, −10) which is not changed, and moves so as to be inclined from 4 degrees to 12 degrees in the X axis, in the time period. The example of the data line 2401 indicates that the type of a motion for another avatar is determined to be "body-close-to".

Figure 25:
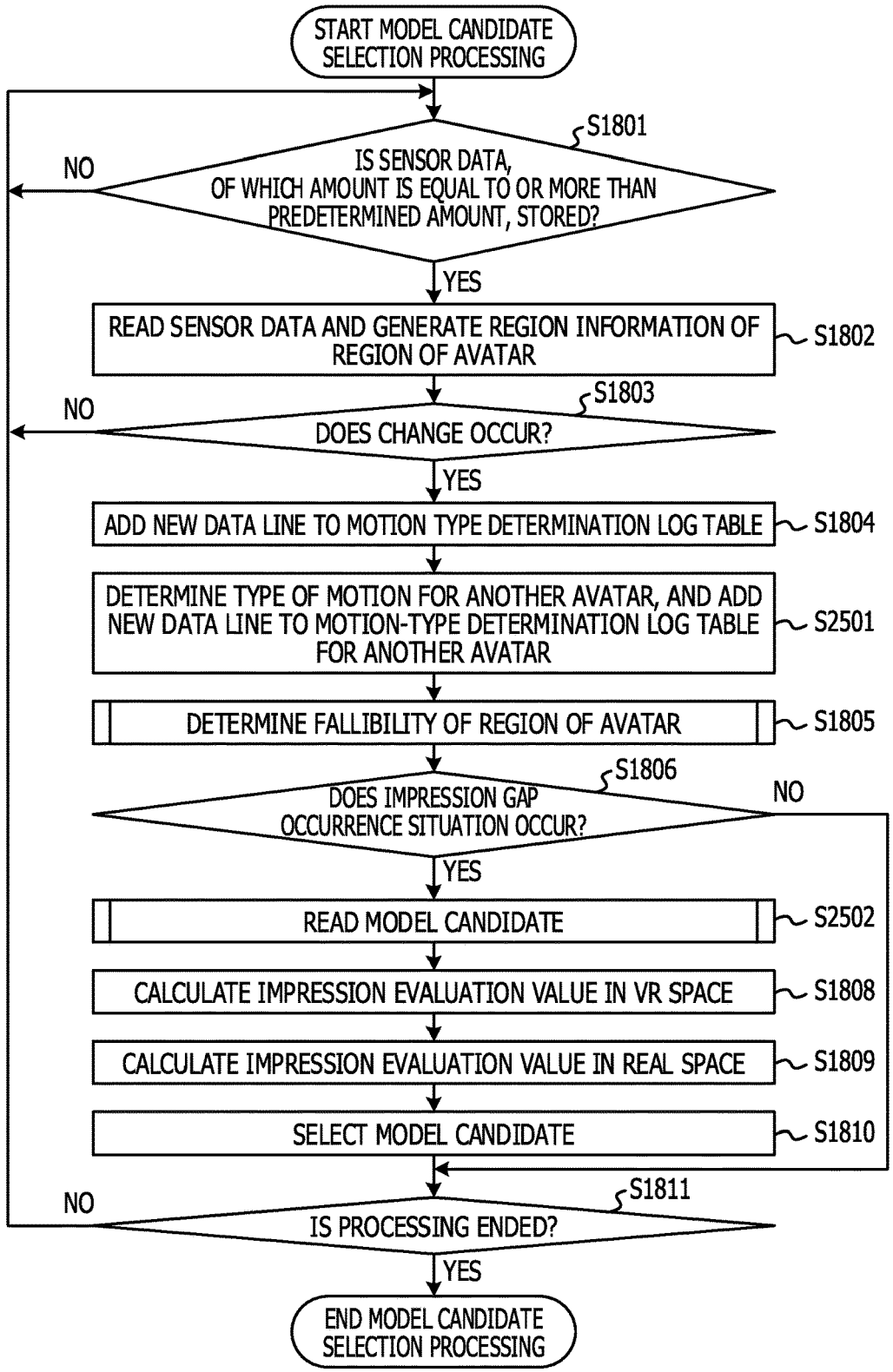
FIG. 25 is a second flowchart illustrating the model candidate selection processing.

Model Candidate Selection Processing Performed by Second VR Space Information Providing Unit in Server Apparatus Next, a flow of the model candidate selection processing performed by the second VR space information providing unit 112 of the server apparatus 110 will be described. FIG. 25 is a flowchart illustrating the model candidate selection processing. Processes which are the same as those in the flowchart described by using FIG. 18 are denoted by the same reference signs, and descriptions thereof will be omitted. Steps S2501 and S2502 are different from those in FIG. 18.

In Step S2501, the motion (tendency) determination portion 2101 identifies the type of a motion included in a data line which has been newly added to the motion-type determination log table 1600, and determines an API corresponding to the identified type of the motion. The motion (tendency) determination portion 2101 inputs sensor data defined in the definition information (for social behavior) 2202 to the determined API, and determines the type of a motion for another avatar. Duration of the sensor data input to the API may be, for example, duration which has a predetermined period from a data acquisition time stamp included in the data line which has been newly added to the motion-type determination log table 1600, until a predetermined period elapses. In addition, a determination time stamp (start) in the duration of the sensor data input to the API may be the "data acquisition time stamp" included in a data line which has been recorded in the motion-type determination log table 1600, based on a motion of the avatar, which has been done right before. The determination time stamp (start) in the duration of the sensor data input to the API may be the "determination time stamp (end)" included in a data line which has been recorded in the motion-type determination log table for another avatar 2400, based on a motion of the avatar, which has been done right before. The motion (tendency) determination portion 2101 adds a data line including the determined type of a motion for another avatar and the like, to the motion-type determination log table for another avatar 2400 in the log storage unit 116.

In Step S2502, the model candidate reading portion 2102 performs reading processing of a model candidate, based on tendency of a motion for another avatar (details of the reading processing of a model candidate will be described later).

Reading Processing of Model Candidate

Figure 26:
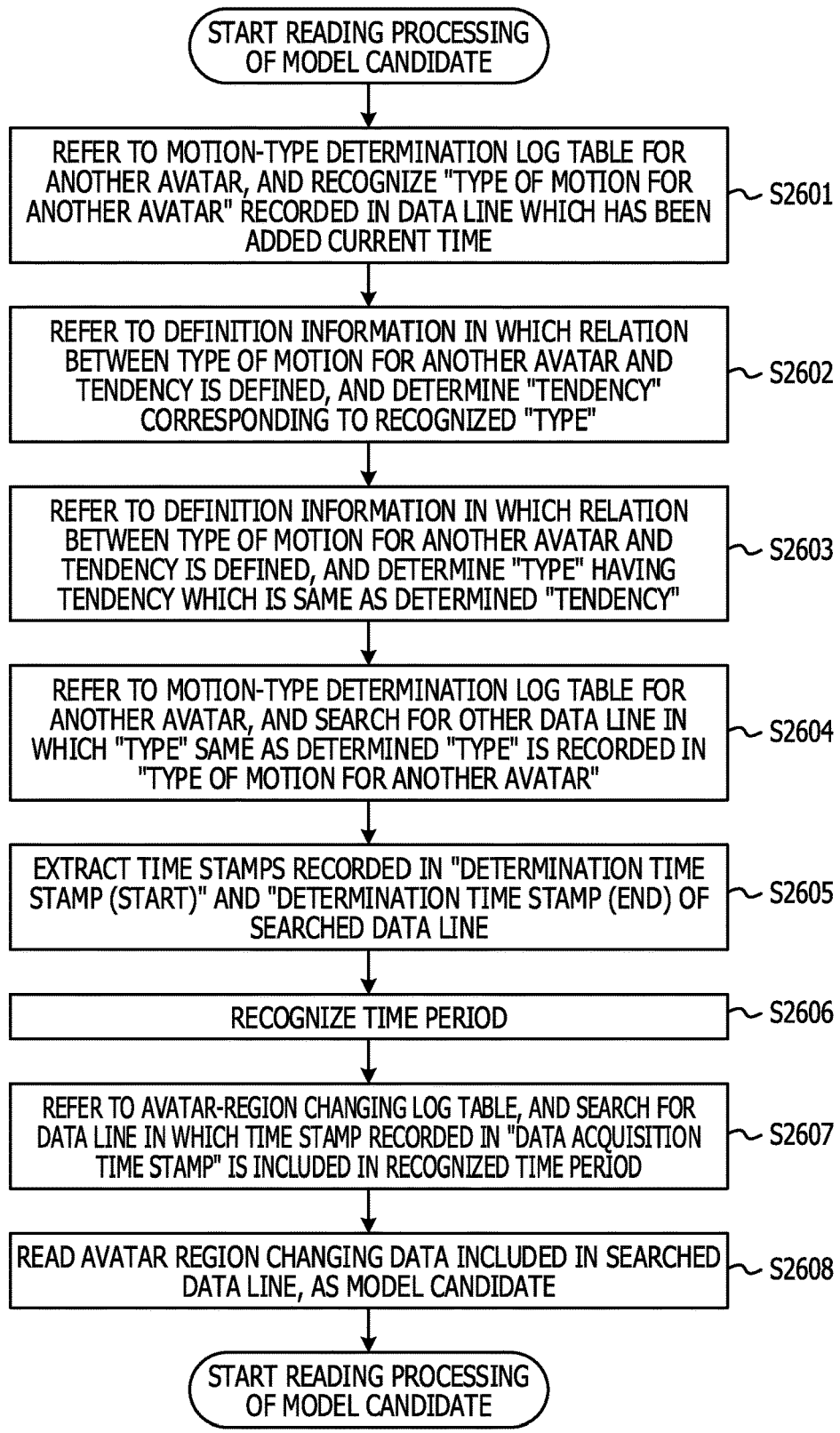
FIG. 26 is a second flowchart illustrating the model candidate reading processing.

FIG. 26 is a flowchart illustrating the reading processing of a model candidate. In Step S2601, the model candidate reading portion 2102 refers to the motion-type determination log table for another avatar 2400, and identifies "the type of a motion for another avatar" recorded in the data line which has been added in Step S2501 in FIG. 25.

In Step S2602, the model candidate reading portion 2102 refers to the definition information 2300, and determines "tendency" corresponding to "the type of a motion for another avatar" which has been identified in Step S2601.

In Step S2603, the model candidate reading portion 2102 refers to the definition information 2300, and extracts "the type of a motion for another avatar" which has the same tendency as "the tendency" determined in Step S2602.

In Step S2604, the model candidate reading portion 2102 refers to the motion-type determination log table for another avatar 2400, and searches for a data line in which a type which is the same as "the type of a motion for another avatar" extracted in Step S2603 is recorded.

In Step S2605, the model candidate reading portion 2102 refers to the motion-type determination log table for another avatar 2400, and extracts the "determination time stamp (start)" and the "determination time stamp (end)" of the data line which has been searched for in Step S2604.

In Step S2606, the model candidate reading portion 2102 identifies a time period of the data line searched for in Step S2604, based on the time stamp which has been extracted in Step S2605.

In Step S2607, the model candidate reading portion 2102 refers to the avatar-region displacement log table 2000, and searches for a data line in which a time stamp recorded in the "data acquisition time stamp" is included in the time period identified in Step S2606.

In Step S2608, the model candidate reading portion 2102 refers to the avatar-region displacement log table 2000, and reads avatar region displacement data included in the data line which has been searched for in Step S2607, as a model candidate.

In this manner, the image generating system 100 according to the second embodiment reads a model candidate depending on tendency of a motion for another avatar.

Thus, according to the second embodiment, a model candidate having a close impression evaluation value can be selected from model candidates different from model candidates which have been read in the first embodiment (model candidates which has the same tendency of a motion for another avatar, not the same type of a motion).

Third Embodiment

In the first and the second embodiments, a case where a model candidate to be read is narrowed based on the type of a motion or the type of a motion for another avatar is described. On the contrary, in a third embodiment, regarding model candidates which have been read based on the type of a motion or tendency of the motion for another avatar, the model candidate is narrowed based on region information specified by the model candidate. This is because a model candidate corresponding to behavior which is seldom done by a user may be included in the model candidates which have been read based on the type of a motion or tendency of the motion for another avatar. Thus, in the third embodiment, a model candidate corresponding to such behavior is excluded, and further narrowing of the model candidate is performed. In the third embodiment, processing of excluding a model candidate which corresponds to behavior which is seldom done by the user, from the model candidates which have been read based on the type of a motion will be described. However, the third embodiment may be similarly applied to a case of the model candidates which have been read based on tendency of a motion for another avatar. The third embodiment will be described below focused on a difference from the first embodiment.

Functional Configuration of Server Apparatus

Figure 27:
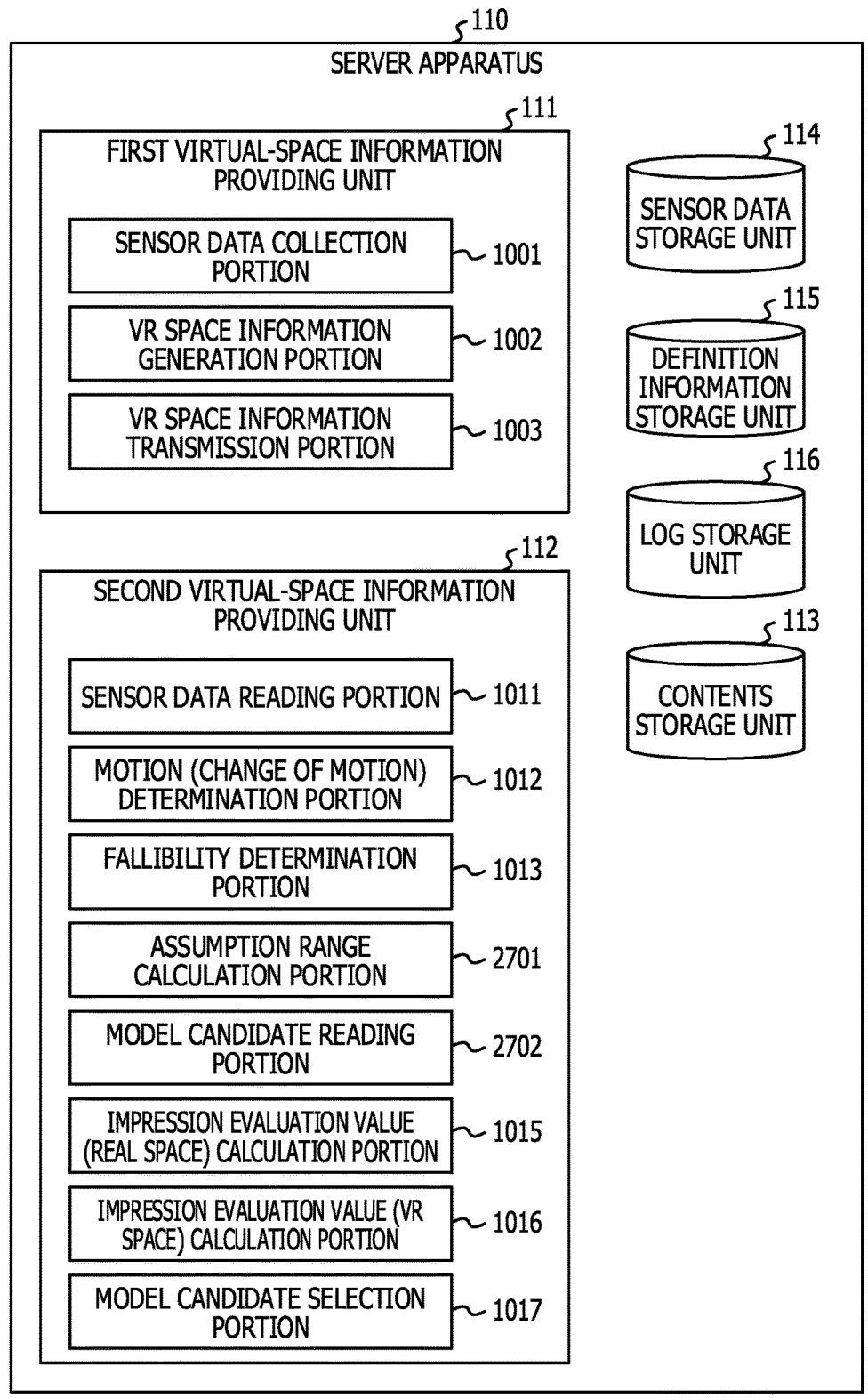
FIG. 27 is a third diagram illustrating an example of the functional configuration of the server apparatus.

Firstly, a functional configuration of the server apparatus 110 according to a third embodiment will be described. FIG. 27 is a third diagram illustrating an example of the functional configuration of the server apparatus. The functional configuration illustrated in FIG. 27 is different from the functional configuration illustrated in FIG. 10 in that an assumption range calculation portion 2701 is provided, and a function of a model candidate reading portion 2702 is different from the function of the model candidate reading portion 1014.

The assumption range calculation portion 2701 calculates an assumption range (range including a high value of an occurrence frequency) based on the avatar-region displacement log table 2000 of the log storage unit 116. The assumption range is assumed by using region values of regions of the avatar. The assumption range calculation portion 2701 sets a data line in which "bone" or "mesh" is stored as the avatar-region displacement type among data lines of the avatar-region displacement log table 2000, as a target, and calculates an assumption range value for the data line set as the target. The assumption range calculation portion 2701 is set to calculate the assumption range value at a predetermined time interval. The calculation timing of the assumption range value is not limited thereto. In a case where data lines of which the amount is equal to or more than a predetermined amount are stored in the avatar-region displacement log table 2000, the assumption range calculation portion 2701 may calculate the assumption range value.

The model candidate reading portion 2702 reads avatar region displacement data which corresponds to the "type of a motion" included in a data line which has been newly stored in the motion-type determination log table 1600, among pieces of avatar region displacement data stored in the avatar-region displacement log table 2000. The model candidate reading portion 2702 extracts avatar region displacement data which includes a region value in the assumption range calculated by the assumption range calculation portion 2701, from pieces of avatar region displacement data which have been read.

The model candidate reading portion 2702 notifies the impression evaluation value (VR space) calculation portion 1016 of the extracted avatar region displacement data as a model candidate.

Descriptions for Assumption Range Information

Next, assumption range information will be described. In the assumption range information, the assumption range value calculated by the assumption range calculation portion 2701 is recorded. FIG. 28 is a diagram illustrating an example of the assumption range information. As illustrated in FIG. 28, assumption range information 2800 includes a "recording time stamp", an "avatar-region range-and-assumption range determination time stamp (start)", an "avatar-region displacement assumption range determination time stamp (end)", a "user name", a "client device ID", a "target region", and an "assumption range value", as items of information.

A time stamp when the assumption range value is calculated by the assumption range calculation portion 2701, and the calculated assumption range value is stored in the log storage unit 116 is recorded in the "recording time stamp".

A time stamp which is the oldest recording time stamp into the avatar-region displacement log table 2000 in a group of pieces of avatar region displacement data which have been set as a calculation target for an assumption range value by the assumption range calculation portion 2701 is recorded in the "avatar-region displacement assumption range determination time stamp (start)". A time stamp which is the newest recording time stamp into the avatar-region displacement log table 2000 in the group of pieces of avatar region displacement data which have been set as a calculation target for an assumption range value by the assumption range calculation portion 2701 is recorded in the "avatar-region displacement assumption range determination time stamp (end)".

A user name correlated with avatar region displacement data which has been used for calculating the assumption range value is recorded in the "user name". A client device ID of a client device used by a user of which the name is recorded in the "user name" is recorded in the "client device".

A region of the avatar, of which the assumption range value is calculated, is recorded in the "target region". An assumption range value for the target region, which has been calculated by the assumption range calculation portion 2701 is recorded in the "assumption range value".

Model Candidate Reading Processing

Figure 29:
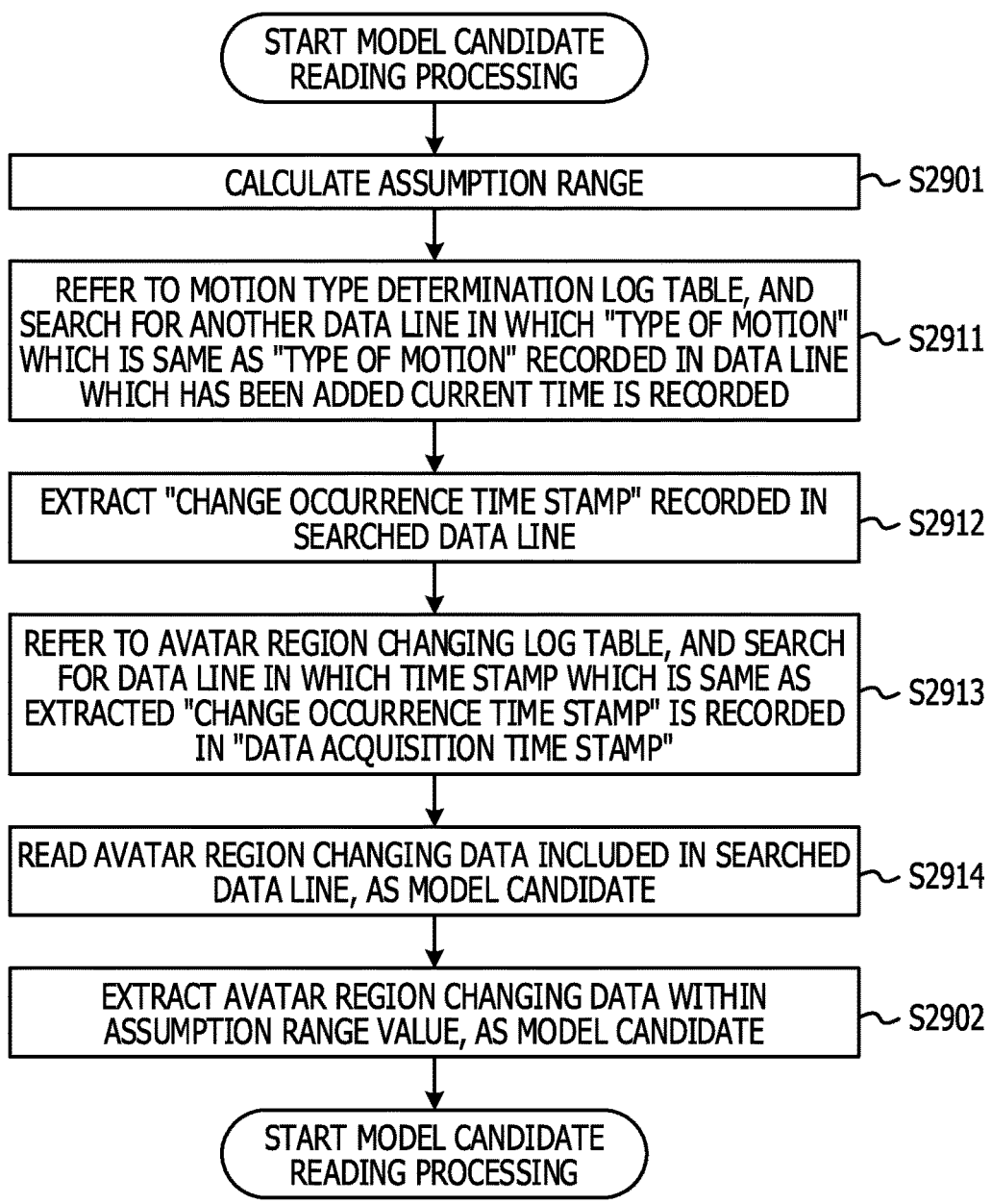
FIG. 29 is a third flowchart illustrating the model candidate reading processing.

Next, details of the model candidate reading processing (Step S1807 in FIG. 18) (details of the processing in a case of the third embodiment) will be described. FIG. 29 is a flowchart illustrating the model candidate reading processing.

In Step S2901, the assumption range calculation portion 2701 calculates an assumption range value which is assumed as a region value for each region of the avatar, based on the avatar-region displacement log table 2000 which is stored in the log storage unit 116.

The processes of Step S1901 to Step S1914 are already described by using FIG. 19B. Thus, descriptions thereof will be omitted.

In Step S2902, the model candidate reading portion 2702 extracts avatar region displacement data within the assumption range value which has been calculated in Step S2901, from pieces of avatar region displacement data which have been read in Step S1914.

Thus, in Step S1808 of the model candidate selection processing (FIG. 18), the impression evaluation value (VR space) calculation portion 1016 can calculate an impression evaluation value in the VR space by using the avatar region displacement data within the assumption range value, as a model candidate.

In this manner, the image generating system 100 in the third embodiment extracts avatar region displacement data having a region value within the assumption range value, from pieces of avatar region displacement data which have been read as model candidates, based on the type of a motion or tendency of a motion for another avatar.

Thus, according to the third embodiment, a model candidate having a value close to an impression evaluation value can be selected from model candidates which have been narrowed more than in the first or the second embodiment.

Fourth Embodiment

In the first to the third embodiments, the motion (change of motion) determination portion 1012 determines the type of a motion, and thus adds a new data line to the motion-type determination log table 1600, and performs management so as to cause a region of the avatar to move by the predetermined amount or more. On the contrary, the motion (change of motion) determination portion 1012 according to a fourth embodiment adds a new data line to the motion-type determination log table 1600, and determines whether or not combining the added data line with other data lines is possible. In a case where it is determined that combining with other data lines is possible, the added data line is combined with other data lines, and is managed in a "motion type determination log (time-series) table". This is because a motion for the added data line can be determined to be a linked motion in a case where the "data acquisition time stamp" when the sensor data used for determining the type of a motion is acquired is sufficiently close to the current time stamp.

According to the fourth embodiment, time-series avatar region displacement data can be read as a model candidate, an impression evaluation value in the VR space can be calculated, and the VR space information generation portion 1002 can be notified of the selected time-series avatar region displacement data. The fourth embodiment will be described below in detail, focused on a difference from the first embodiment.

Functional Configuration of Server Apparatus

Figure 30:
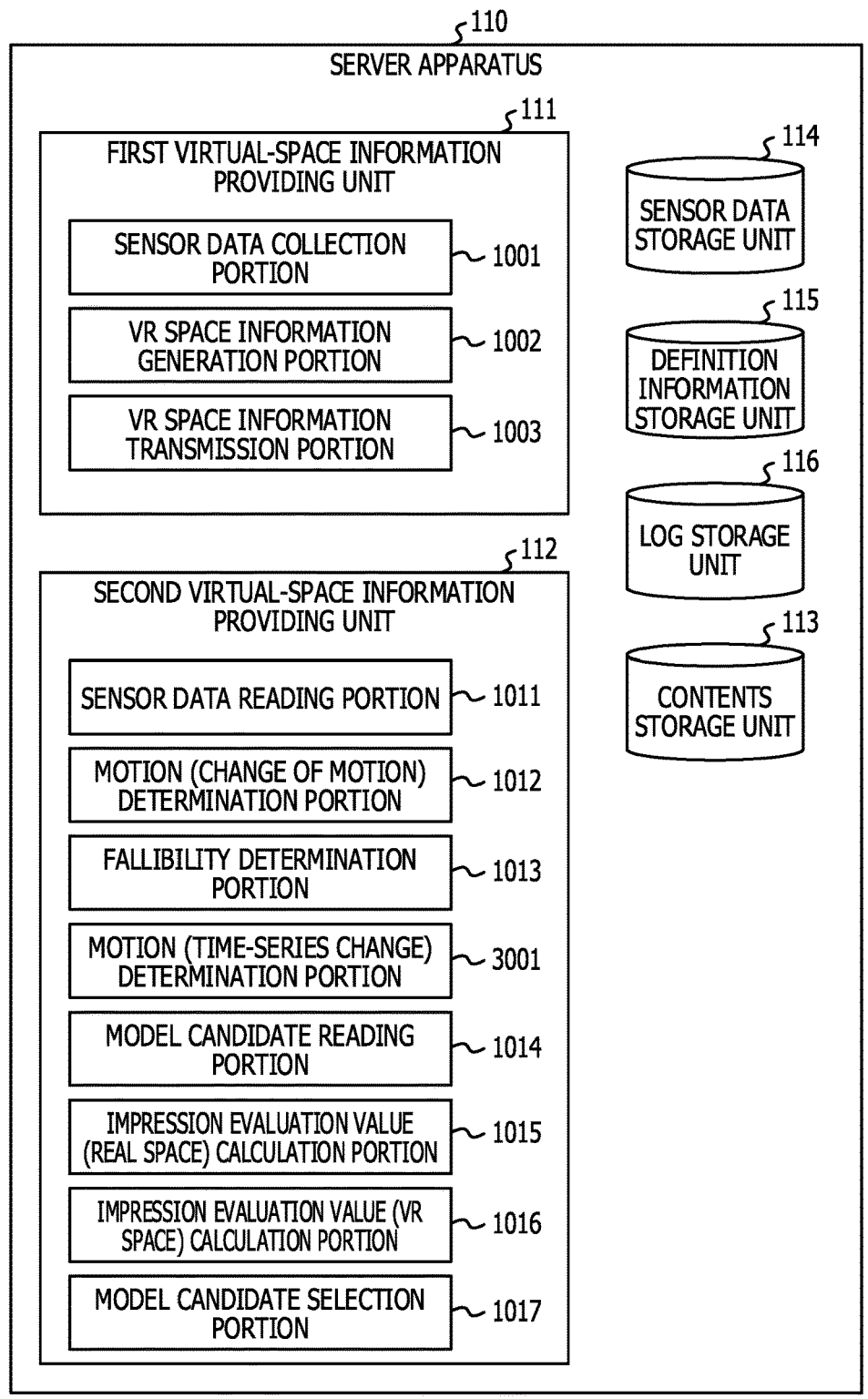
FIG. 30 is a fourth diagram illustrating an example of the functional configuration of the server apparatus.

Firstly, a functional configuration of the server apparatus 110 according to the fourth embodiment will be described. FIG. 30 is a fourth diagram illustrating an example of the functional configuration of the server apparatus. The functional configuration illustrated in FIG. 30 is different from the functional configuration illustrated in FIG. 10, in that a motion (time-series change) determination portion 3001 is provided, and the "motion type determination log (time-series) table" is stored in the log storage unit 116.

The motion (time-series change) determination portion 3001 acquires a data line which has been newly added to the motion-type determination log table 1600 of the log storage unit 116 by the motion (change of motion) determination portion 1012. The motion (time-series change) determination portion 1012 adds the acquired data line to the "motion type determination log (time-series) table" of the log storage unit 116. Details of the motion type determination log (time-series) table will be described later with reference to FIG. 31.

When the new data line is added to the "motion type determination log (time-series) table", the motion (time-series change) determination portion 3001 determines whether or not combining with other data lines in the motion type determination log (time-series) table is possible. In a case where it is determined that combining is possible, the motion (time-series change) determination portion 3001 combines the acquired data line with other data lines, and stores a resultant of the combination in the motion type determination log (time-series) table.

Descriptions for Motion Type Determination Log (Time-Series) Table Next, the motion type determination log (time-series) table will be described. FIG. 31 is a diagram illustrating an example of the motion type determination log (time-series) table. The motion type determination log (time-series) table illustrated in FIG. 31 is different from the motion-type determination log table 1600 illustrated in FIG. 16, in that the motion-type determination log table in FIG. 31 includes a "change occurrence time stamp (first)" and a "change occurrence time stamp (last)" instead of the "change occurrence time stamp", as the item of the information.

When the type of a motion is determined, and thus a data line added to the motion-type determination log table 1600 is added to a motion type determination log (time-series) table 3100, the motion (time-series change) determination portion 3001 performs processing of combining with another data line. Thus, each data line in the motion type determination log (time-series) table 3100 includes a plurality of data lines in the motion-type determination log table 1600.

The "change occurrence time stamp" of a data line which has been added firstly among the plurality of data lines in the motion-type determination log table 1600 is recorded in a "change occurrence time stamp (start)". The "change occurrence time stamp" of a data line which has been added lastly among the plurality of data lines in the motion-type determination log table 1600 is recorded in a "change occurrence time stamp (end)".

Model Candidate Selection Processing Performed by Second VR Space Information Providing Unit in Server Apparatus Next, a flow of the model candidate selection processing performed by the second VR space information providing unit 112 of the server apparatus 110 will be described. FIG. 32 is a flowchart illustrating the model candidate selection processing. Processes which are the same as those in the flowchart described by using FIG. 18 are denoted by the same reference signs, and descriptions thereof will be omitted. Step S3201 is different from that in FIG. 18.

In Step S3201, the motion (time-series change) determination portion 3001 acquires a data line which has been newly added to the motion-type determination log table 1600 in Step S1804, and updates the motion type determination log (time-series) table 3100. Update processing of the motion type determination log (time-series) table 3100 will be described later in detail, with reference to FIG. 33.

In a case where the motion type determination log (time-series) table 3100 is updated in Step S3201, in Step S1805, the fallibility determination portion 1013 performs determination based on time-series region information as region information of a region of the avatar.

Specifically, the fallibility determination portion 1013 recognizes the change occurrence time stamp (first) and the change occurrence time stamp (last) which are included in the data line which has been newly stored in the motion type determination log (time-series) table 3100. The fallibility determination portion 1013 determines whether or not the region of an image for the avatar is a region in which fallibility exceeds the fallibility threshold value. The determination is performed for each of one time frame between the change occurrence time stamp (first) and the change occurrence time stamp (last) which have been identified. The determination method is not limited thereto. For example, pieces of data of all time frames between the change occurrence time stamp (first) and the change occurrence time stamp (last) may be collected, and it may be determined whether or not the region is a region in which fallibility exceeds the fallibility threshold value. That is, the determination of whether or not the region in which fallibility exceeds the fallibility threshold value is provided may be performed for each of one time frame or may be collectively performed.

In a case where the motion type determination log (time-series) table 3100 is updated in Step S3201, in Step S1807, the model candidate reading portion 1014 uses the motion type determination log (time-series) table 3100 when a model candidate is read. At this time, the model candidate reading portion 1014 reads time-series avatar region displacement data as a model candidate, based on a time period identified by the change occurrence time stamp (first) and the change occurrence time stamp (last) of the motion type determination log (time-series) table 3100.

The impression evaluation value (VR space) calculation portion 1016 calculates an impression evaluation value for the time-series avatar region displacement data in Step S1809 (for example, calculates an average value of impression evaluation values which have been calculated for pieces of time-series avatar region displacement data).

Motion Type Determination Log (Time-Series) Table Update Processing

Figure 33:
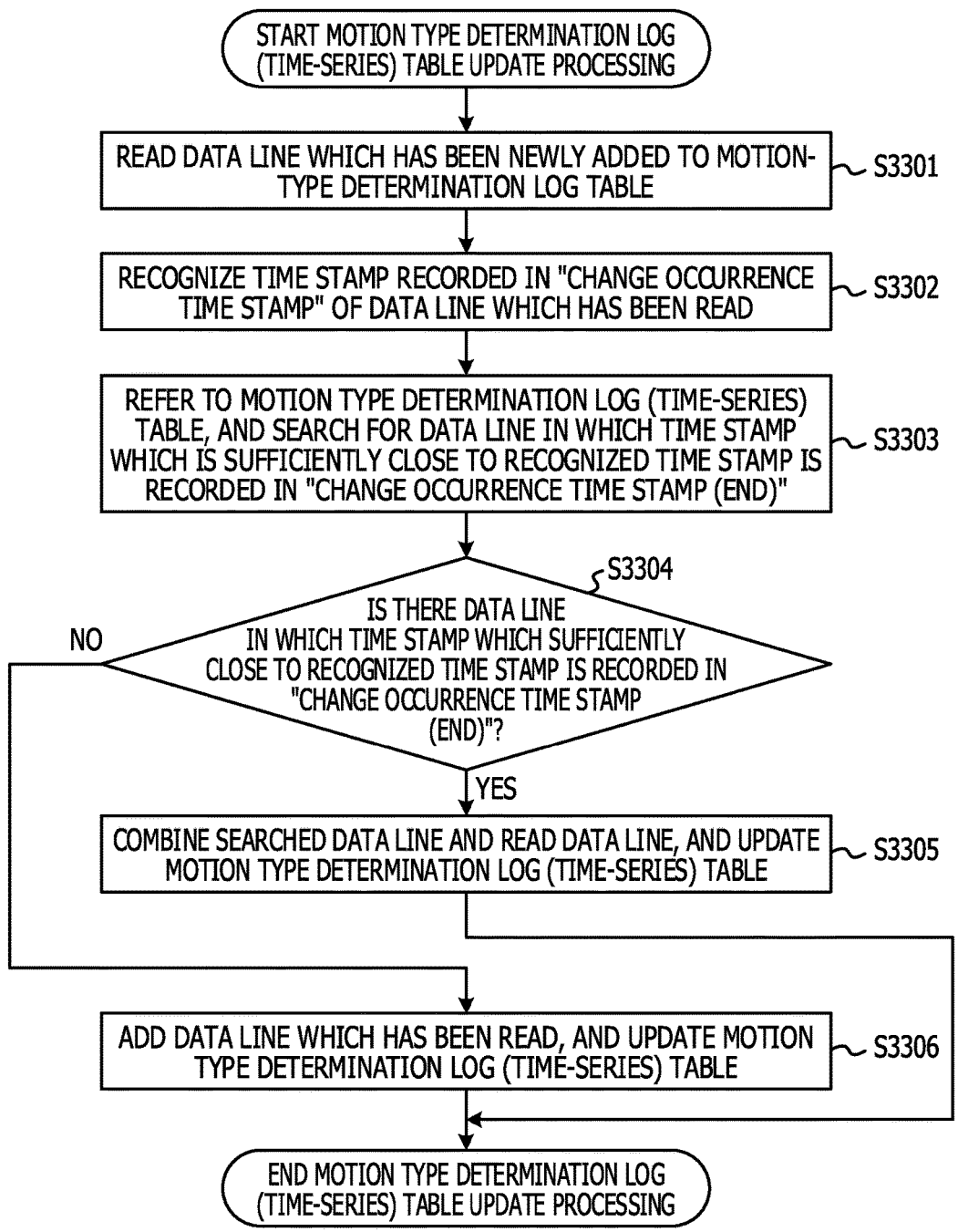
FIG. 33 is a flowchart illustrating motion-type determination log (time-series) table update processing.

Next, details of motion type determination log (time-series) table update processing (Step S3201) will be described. FIG. 33 is a flowchart illustrating the motion type determination log (time-series) table update processing.

In Step S3301, the motion (time-series change) determination portion 3001 reads a data line which has been newly added to the motion-type determination log table 1600.

In Step S3302, the motion (time-series change) determination portion 3001 recognizes a time stamp recorded in the "change occurrence time stamp" of the data line which has been read in Step S3301.

In Step S3303, the motion (time-series change) determination portion 3001 refers to the motion type determination log (time-series) table 3100, and searches for a data line in which a time stamp which is sufficiently close to the time stamp recognized in Step S3302 is recorded in the "change occurrence time stamp (end)".

In Step S3304, the motion (time-series change) determination portion 3001 determines whether or not searching another data line is possible, after searching in Step S3303. In Step S3304, in a case where it is determined that searching another data line is possible (Yes in Step S3304), the process proceeds to Step S3305.

In Step S3305, the motion (time-series change) determination portion 3001 links the searched data line and the read data line to each other. Thus, the motion type determination log (time-series) table is updated.

In Step S3304, in a case where searching another data line is not possible (No in Step S3304), the process proceeds to Step S3306. In Step S3306, the motion (time-series change) determination portion 3001 adds the data line which has been read in Step S3301, to the motion type determination log (time-series) table 3100 as a new data line. Thus, the motion type determination log (time-series) table 3100 is updated.

In this manner, in the image generating system 100 according to the fourth embodiment, in a case where a region value of a region of the avatar is changed by a predetermined amount or more, within a sufficiently close period, data lines which have been added to the motion-type determination log table 1600 due to the occurrence of the change are united. In the image generating system 100 according to the fourth embodiment, the united data line is managed as the motion type determination log (time-series) table 3100. Thus, the model candidate reading portion 1014 can read pieces of time-series avatar region displacement data of the time period specified by each data line of the motion type determination log (time-series) table 3100, as a model candidate.

As a result, according to the fourth embodiment, a model candidate can be selected so as to suppress a gap between an impression to other person by a motion obtained by an avatar continuously acting, and an impression to the other person by behavior obtained by a person continuously acting in the real space. That is, it is possible to suppress a gap between an impression to other person through an avatar which continuously moves, and an impression to the other person by continuous behavior which is actually done by a person functioning as the source of the avatar.

Fifth Embodiment

In the first and the second embodiments, a case where the model candidate is read based on the type of a motion or tendency of a motion for another avatar. On the contrary, in a fifth embodiment, regarding a region value of the model candidate which has been read based on the type of a motion or tendency of a motion for another avatar, similarity with the region value of each region of the avatar, which has been calculated by the motion (change of motion) determination portion 1012 is calculated. Narrowing model candidates is performed based on the calculated similarity. In the fifth embodiment, a region connected to a region in which fallibility exceeds the fallibility threshold value is specified by using a hierarchy structure of the model candidates, and narrowing model candidates is performed based on the region value of the specified region. The fifth embodiment will be described below focused on a difference from the first embodiment.

Functional Configuration of Server Apparatus

Figure 34:
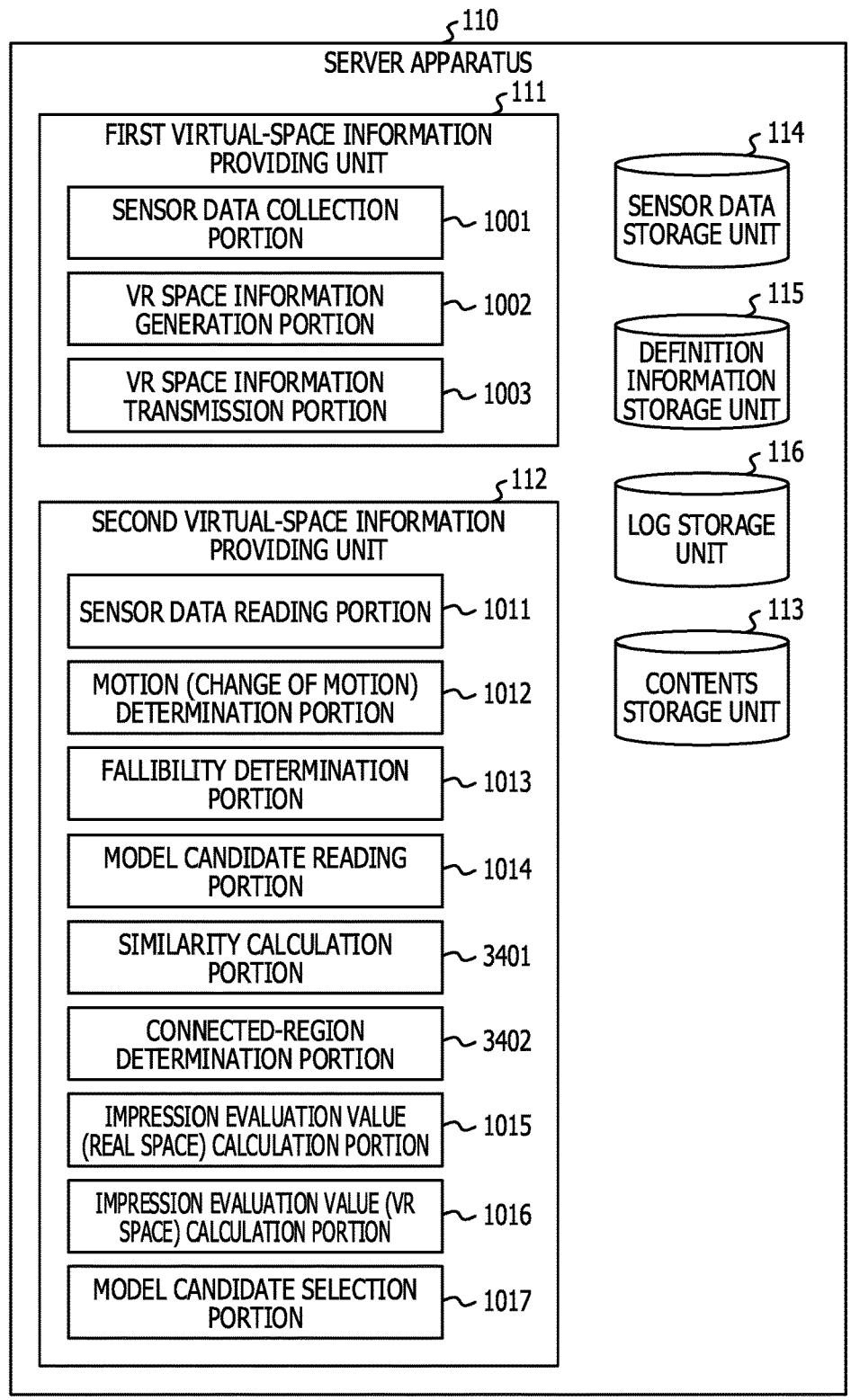
FIG. 34 is a fifth diagram illustrating an example of the functional configuration of the server apparatus.

Firstly, a functional configuration of the server apparatus 110 in the fifth embodiment will be described. FIG. 34 is a fifth diagram illustrating an example of the functional configuration of the server apparatus. The functional configuration illustrated in FIG. 34 is different from the functional configuration illustrated in FIG. 10, in that a similarity calculation portion 3401 and a connected-region determination portion 3402 are provided.

The similarity calculation portion 3401 specifies a region of the avatar, which has been determined not to be the region in which fallibility exceeds the fallibility threshold value, by the fallibility determination portion 1013. The similarity calculation portion 3401 calculates similarity with a region value of the same region in each of the model candidates which have been read, regarding a region value of each region (region determined not to be a region in which fallibility exceeds the fallibility threshold value) of the avatar. The similarity calculation portion 3401 notifies the connected-region determination portion 3402 of model candidates in which the calculated similarity is equal to or more than a predetermined threshold value.

The connected-region determination portion 3402 recognizes a plurality of model candidates of which a notification is performed by the similarity calculation portion 3401. The connected-region determination portion 3402 extracts region values (for example, positions) of regions which are connected to the region in which fallibility exceeds the fallibility threshold value, among regions of the plurality of model candidates, and performs grouping on the extracted region values, for each region. Thus, region values of the region connected to the region in which fallibility exceeds the fallibility threshold value, among regions of the plurality of model candidates can be grouped into a plurality of groups.

The connected-region determination portion 3402 determines whether the region values of the regions of the avatar, which have been calculated by the motion (change of motion) determination portion 1012 is classified as a certain group of the plurality of groups.

The connected-region determination portion 3402 extracts a model candidate belonging to a group as which the region values of the regions of the avatar, which have been calculated by the motion (change of motion) determination portion 1012 is classified. The connected-region determination portion 3402 notifies the impression evaluation value (VR space) calculation portion 1016 of the extracted model candidate.

Figure 35:
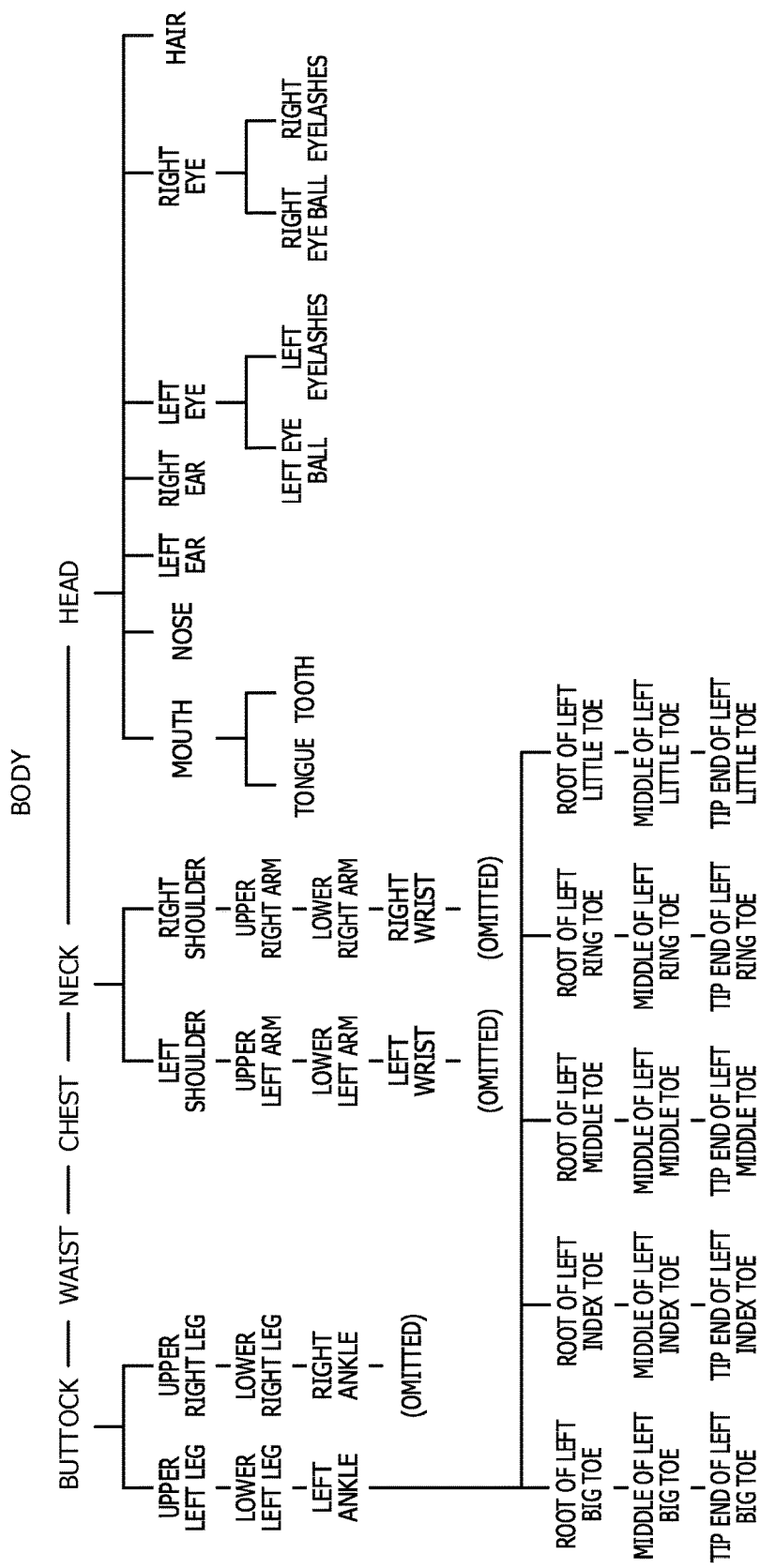
FIG. 35 is a diagram illustrating a connecting state between regions of an avatar.

The connected-region determination portion 3402 refers to information indicating a connecting state between regions of the avatar, and thus recognizes regions connected to each other. FIG. 35 is a diagram illustrating an example of the information indicating the connecting state between regions of the avatar.

As illustrated in FIG. 35, the connecting state between the regions of the avatar can be indicated by a plurality of levels. FIG. 35 illustrates that a higher region is disposed at a higher level, and a lower region is disposed at a lower level. In a case where a region disposed at a higher level, and a region disposed at a lower level are connected to each other by using a straight line, this indicates that the regions are connected to each other in the up-and-down direction (term). In a case where regions disposed at the same level are connected to each other by using a straight line, this indicates that the regions are connected to each other in the right-and-left direction (term). Regarding a connecting state between a toe and a finger, only a connecting state of a toe of the left foot will be described. Descriptions for a connecting state of a toe of the right foot, a connecting state of a finger of the left hand, and a connecting state of a finger of the right hand will be omitted.

Figure 36:
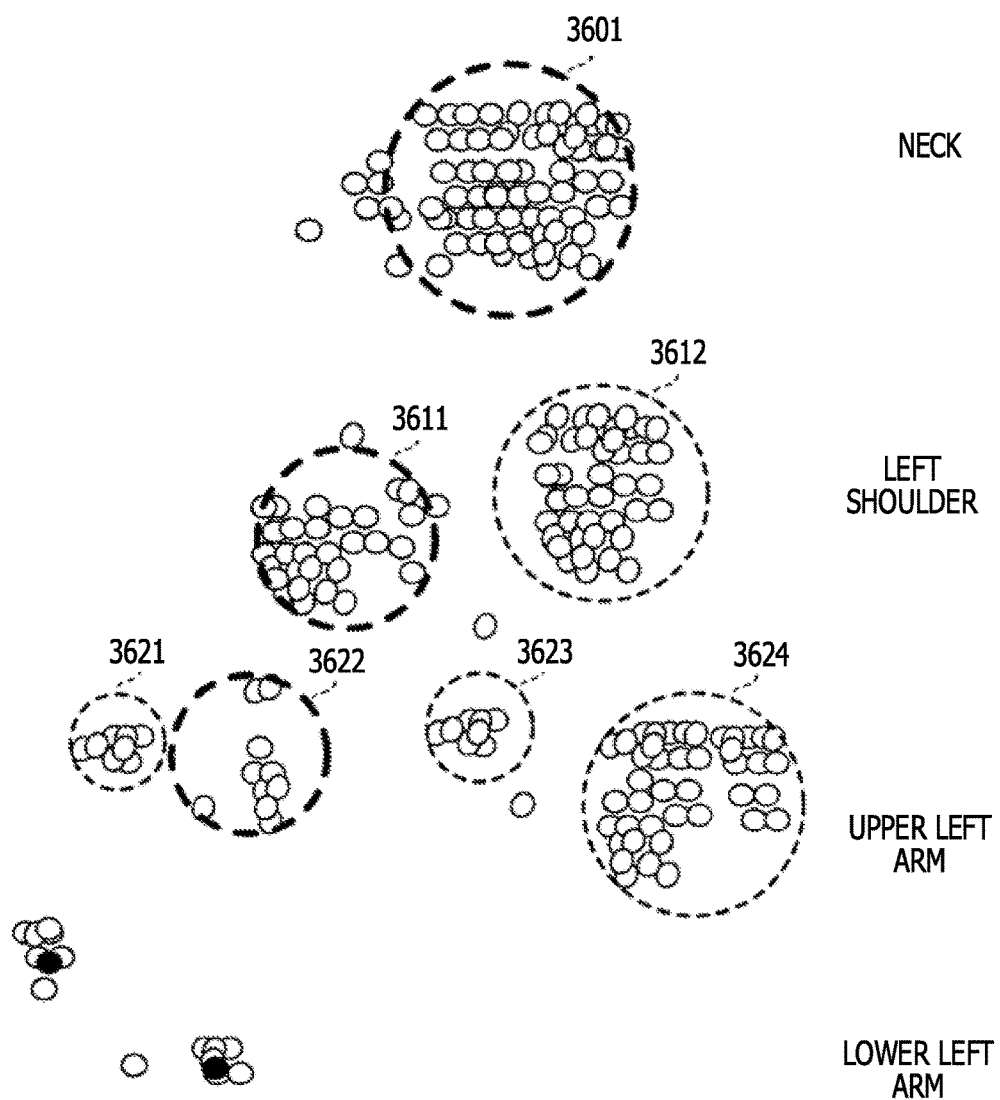
FIG. 36 is a diagram illustrating a form in which positions of regions in avatar region displacement data are grouped.

FIG. 36 is a diagram illustrating a form in which region values of regions of a model candidate are grouped. Specifically, FIG. 36 illustrates a form in which region values (here, positions) of regions connected to the region in which fallibility exceeds the fallibility threshold value, among the regions of the model candidate of which the connected-region determination portion 3402 is notified are grouped into a plurality of groups. In the example of FIG. 36, the connected-region determination portion 3402 extracts "a neck", "the left shoulder", and "an upper left arm" as regions which are connected downwardly (corresponding to a region disposed at a level which is equal to or lower than a level of the lower left arm) from a region (elbow on the left side) in which fallibility exceeds the fallibility threshold value. The connected-region determination portion 3402 plots a position of each of the regions of the model candidate of which a notification is performed, by using white circles.

In the example of FIG. 36, the connected-region determination portion 3402 performs grouping of region values (positions) of which a region of the model candidate of which a notification is performed corresponds to a neck, into one group (group 3601). In the example of FIG. 36, the connected-region determination portion 3402 performs grouping of region values (positions) of which a region of the model candidate of which a notification is performed corresponds to the left shoulder, into two groups (groups 3611 and 3612). In the example of FIG. 36, the connected-region determination portion 3402 performs grouping of region values (positions) of which a region of the model candidate of which a notification is performed corresponds to the upper left arm, into four groups (groups 3621 to 3624). Data of the avatar at each level, which has been calculated by the motion (change of motion) determination portion 1012 and is not displayed yet is classified so as to be similar to a group indicated by a bold dot line (neck indicated by 3601, left shoulder indicated by 3611, and upper left arm indicated by 3622). A coordinate value of a lower left arm depicted by a model belonging to all of the groups (neck indicated by 3601, left shoulder indicated by 3611, and upper left arm indicated by 3622) indicated by bold dot lines is also indicated by a white circle in FIG. 36. All coordinate values may be employed as a model candidate for the next processing. As illustrated in FIG. 36, a form in which pieces of data for the lower left arm, which have been obtained here are also grouped, and coordinates indicated by a black circle is obtained by using the median value of pieces of data in the group may be made.

Figure 37:
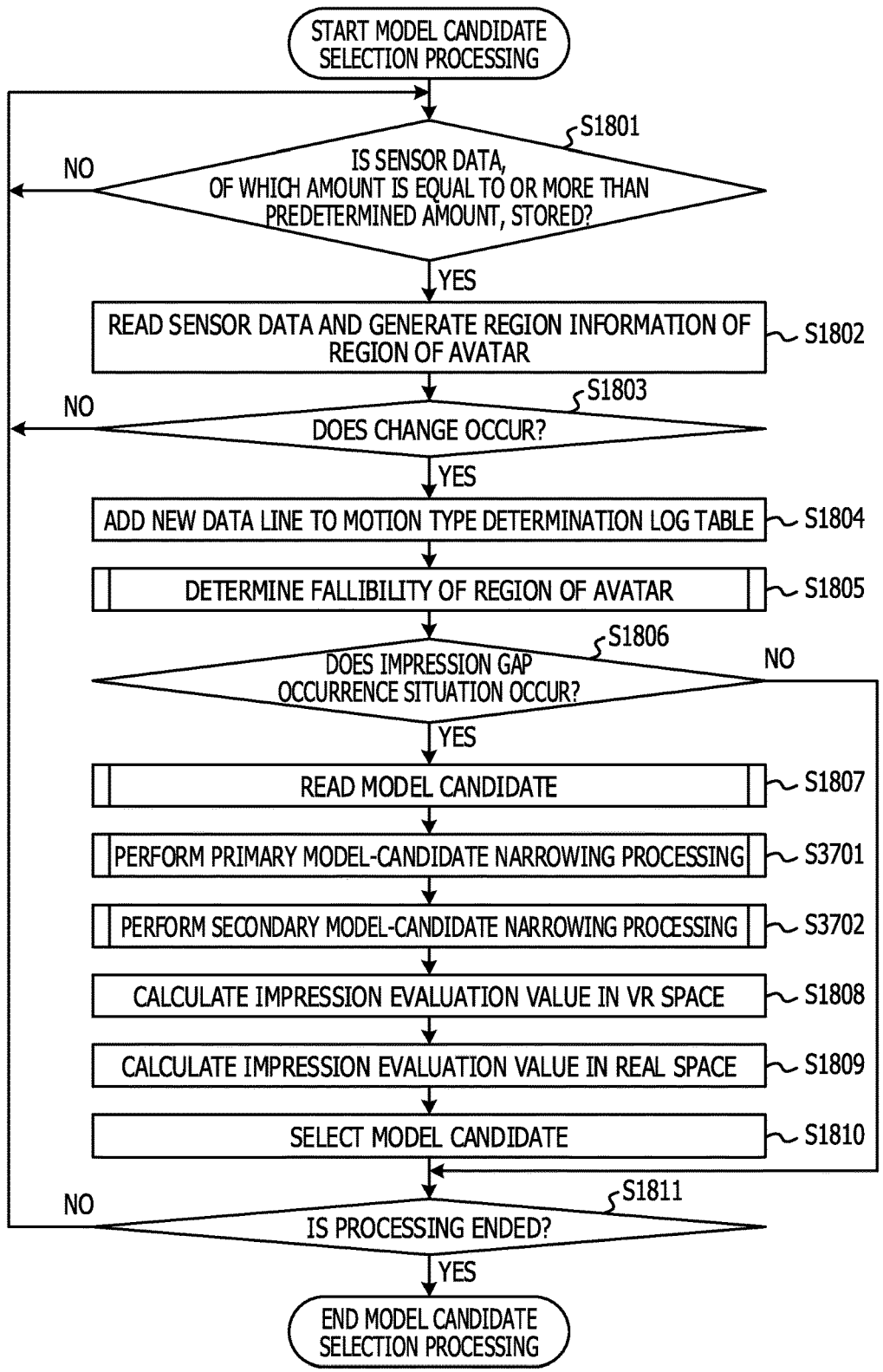
FIG. 37 is a fourth flowchart illustrating the model candidate selection processing.

Model Candidate Selection Processing Performed by Second VR Space Information Providing Unit of Server Apparatus Next, a flow of the model candidate selection processing performed by the second VR space information providing unit 112 of the server apparatus 110 will be described. FIG. 37 is a flowchart illustrating the model candidate selection processing. Processes which are the same as those in the flowchart described by using FIG. 18 are denoted by the same reference signs, and descriptions thereof will be omitted. Steps S3701 and S3702 are different from those in FIG. 18.

In Step S3701, the similarity calculation portion 3401 performs primary model-candidate narrowing processing in which a plurality of model candidates which have been read in Step S1807 is narrowed based on similarity of the region value.

In Step S3702, the connected-region determination portion 3402 performs secondary model-candidate narrowing processing in which model candidates narrowed in Step S3701 are narrowed based on the region value of a region connected to the region in which fallibility exceeds the fallibility threshold value.

Details of the primary model-candidate narrowing processing (Step S3701) and the secondary model-candidate narrowing processing (Step S3702) will be described below with reference to FIGS. 38 and 39.

Primary Model-Candidate Narrowing Processing

Figure 38:
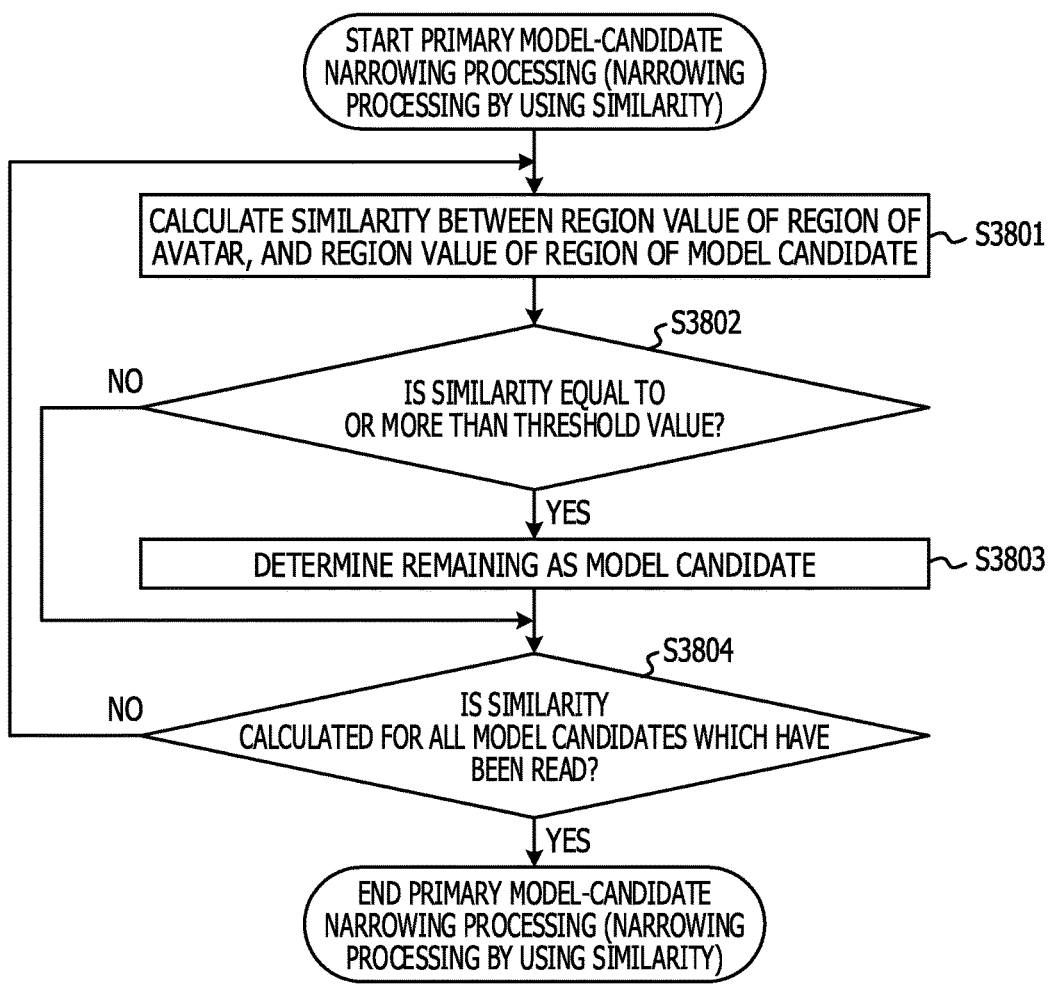
FIG. 38 is a first flowchart illustrating primary model-candidate narrowing process.

FIG. 38 is a flowchart illustrating the primary model-candidate narrowing processing. In Step S3801, the similarity calculation portion 3401 recognizes a region of the avatar, which is determined not to be the region in which fallibility exceeds the fallibility threshold value, among the regions of the avatar calculated by the motion (change of motion) determination portion 1012, as a processing target. The similarity calculation portion 3401 extracts a region value of the region which is recognized as the processing target. The similarity calculation portion 3401 extracts the region value of each region set as the processing target, regarding each of the model candidates which have been read in Step S1807. The similarity calculation portion 3401 calculates similarity between the region value of the region (processing target) of the avatar and the region value of the same region of the model candidate. The similarity of the region value may be calculated by a call of an external API. In addition, computation in which region values are compared for each region as a processing target, a similarity score is obtained by normalizing differences of the region values, and similarity score for all regions as the processing target is obtained may be performed. In addition, computation in which some of regions as the processing targets are grouped (for example, two adjacent regions or three regions linked to each other are determined in advance), and the similarity score between the grouped regions is obtained may be performed.

In Step S3802, the similarity calculation portion 3401 determines whether or not the calculated similarity is equal to or more than a predetermined threshold value. In Step S3802, in a case where it is determined to be less than the predetermined threshold value (No in Step S3802), the process proceeds to Step S3804. In this case, the connected-region determination portion 3402 is not notified of the model candidate.

In Step S3802, in a case where it is determined to be equal to or more than the predetermined threshold value (Yes in Step S3802), the process proceeds to Step S3803. In Step S3803, the similarity calculation portion 3401 notifies the connected-region determination portion 3402 of the model candidate.

In Step S3804, the similarity calculation portion 3401 determines whether or not the similarity is calculated for all of the model candidates which have been read in Step S1807 of FIG. 37. In Step S3804, in a case where it is determined that there is a model candidate of which similarity is not calculated yet (No in Step S3804), the process returns to Step S3801, and the primary model-candidate narrowing processing continues.

In Step S3804, in a case where it is determined that there is no model candidate of which similarity is not calculated yet (Yes in Step S3804), the primary model-candidate narrowing processing is ended.

Secondary Model-Candidate Narrowing Processing

Figure 39:
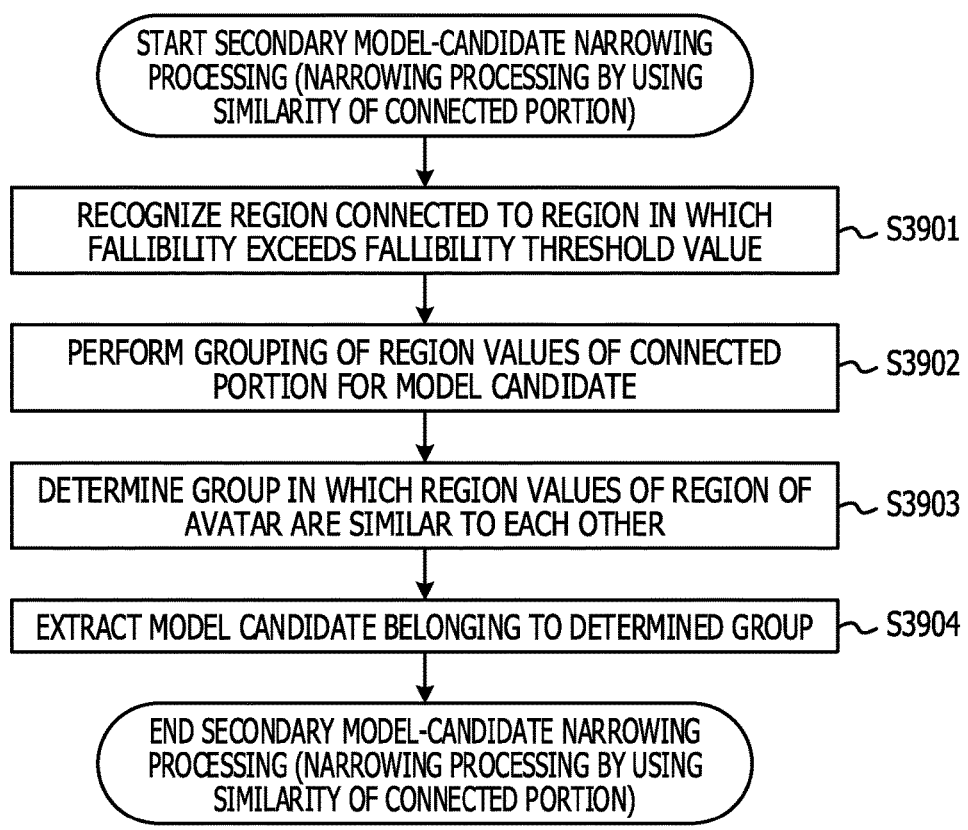
FIG. 39 is a first flowchart illustrating secondary model-candidate narrowing process.

FIG. 39 is a flowchart illustrating the secondary model-candidate narrowing processing. In Step S3901, the connected-region determination portion 3402 recognizes a region connected to a region of the avatar, which has been determined to be a region in which fallibility exceeds the fallibility threshold value. For example, in a case where the region in which fallibility exceeds the fallibility threshold value corresponds to the lower left arm, the connected-region determination portion 3402 recognizes the upper left arm, the left shoulder, and the neck as regions connected to each other.

In Step S3902, the connected-region determination portion 3402 performs grouping of region values of the regions connected to each other, and the recognized region, regarding the model candidate of which a notification is performed by the similarity calculation portion 3401. The grouping is performed for each level.

For example, in a case where 100 model candidates of which a notification is performed by the similarity calculation portion 3401 are provided, for each level, 100 pieces of region values of the region corresponding to a neck are provided, 100 pieces of region values of the region corresponding to the left shoulder are provided, and 100 pieces of region values of the region corresponding to the upper left arm are provided. The region values are grouped for each level, by similarity between 100 pieces of region values for each of the 100 pieces of region values at each level. A method of grouping may use an average of region values in the group, or may define the number of pieces of region values which are determined as one group. In the example of FIG. 36, in a case where the region corresponds to a neck, one group is provided at each level. In a case where the region corresponds to the left shoulder, two groups are provided at each level. In a case where the region corresponds to the upper left arm, four groups are provided at each level.

In Step S3903, the connected-region determination portion 3402 determines a group to which a region value of a region of the avatar, which has been calculated, based on sensor data belongs at each level. The example of FIG. 36 indicates that the region value of a region of the avatar is determined to belong to the group indicated by a bold dot line, and is classified as the group.

In Step S3904, the connected-region determination portion 3402 notifies the impression evaluation value (VR space) calculation portion 1016 of a model candidate belonging to the group as which the group is determined to be classified. As described above, in the example of FIG. 36, the group to which the region value of a region of the avatar is determined to belong corresponds to the group 3601 in a case where the region corresponds to a neck. This group corresponds to the group 3611 in a case where the region corresponds to the left shoulder. This group corresponds to the group 3622 in a case where the region corresponds to the upper left arm. Accordingly, the impression evaluation value (VR space) calculation portion 1016 is notified of a model candidate belonging to this group. The example in FIG. 36 illustrates also region values of the lower left arm corresponding to a region which is the region in which fallibility exceeds the fallibility threshold value among the region values of the region of the model candidate of which a notification is performed by the similarity calculation portion 3401. The neck illustrated in FIG. 36 belongs to the group 3601. The left shoulder illustrated in FIG. 36 belongs to the group 3611. The upper left arm illustrated in FIG. 36 belongs to the group 3622. All model candidates in which region values of the lower left arm are indicated by white circles in FIG. 36 may be employed in the next processing. In addition, as illustrated in FIG. 36, the region values for the lower left arm may be also grouped, and positions indicated by black circles may be obtained as the median value of the region values of the group. As the model candidate, a form using a model in which a neck belongs to the group 3601, the left shoulder belongs to the group 3611, and the upper left arm belongs to the group 3622, and the lower part of the left arm corresponds to region values indicated by black circles in FIG. 36 may be made.

As described above, in the image generating system 100 in the fifth embodiment, a model candidate which has high similarity with region values of a region of the avatar is extracted from a plurality of model candidates which have been read.

In the image generating system 100 according to the fifth embodiment, regarding the extracted model candidate, region values of a region connected to the region in which fallibility exceeds the fallibility threshold value are grouped.

In the image generating system 100 according to the fifth embodiment, among groups obtained by grouping, a model candidate to which a group in which region values of a region of the avatar are similar to each other belongs is further extracted.

Thus, according to the fifth embodiment, a model candidate having a value close to an impression evaluation value can be selected from model candidates which have been narrowed more than in the first or the second embodiment.

When, region values of a region connected to the lower left arm which corresponds to 100 pieces (which is described as an example) of region values are grouped, for example, in a case where one region includes a plurality of region values such as a position and an rotation angle, like region values of "bone", a form in which grouping is performed for each region value. The example in FIG. 36 illustrates a case where grouping is performed by using positions as 100 pieces of region values.

Sixth Embodiment

In the fifth embodiment, primary narrowing processing in which similarity is used for a region other than the region in which fallibility exceeds the fallibility threshold value, and secondary narrowing processing in which similarity is used for a region connected to the region in which fallibility exceeds the fallibility threshold value are performed as narrowing processing of a model candidate.

On the contrary, in a sixth embodiment, secondary narrowing processing in which cost depending on a posture of a model candidate is used. The cost depending on a posture of a model candidate is a parameter indicating difficulty of behavior of a person in the real space. Specifically, digitization is performed so as to distinguish a posture occurring by a person in the real space unconsciously acting, and a posture for which conscious acting of a person in the real space is desired, from each other. In the sixth embodiment, the secondary narrowing processing is performed by extracting a model candidate which has low cost (that is, behavior which is easy to act). The sixth embodiment will be described below focused on a difference from the fifth embodiment.

Functional Configuration of Server Apparatus

Figure 40:
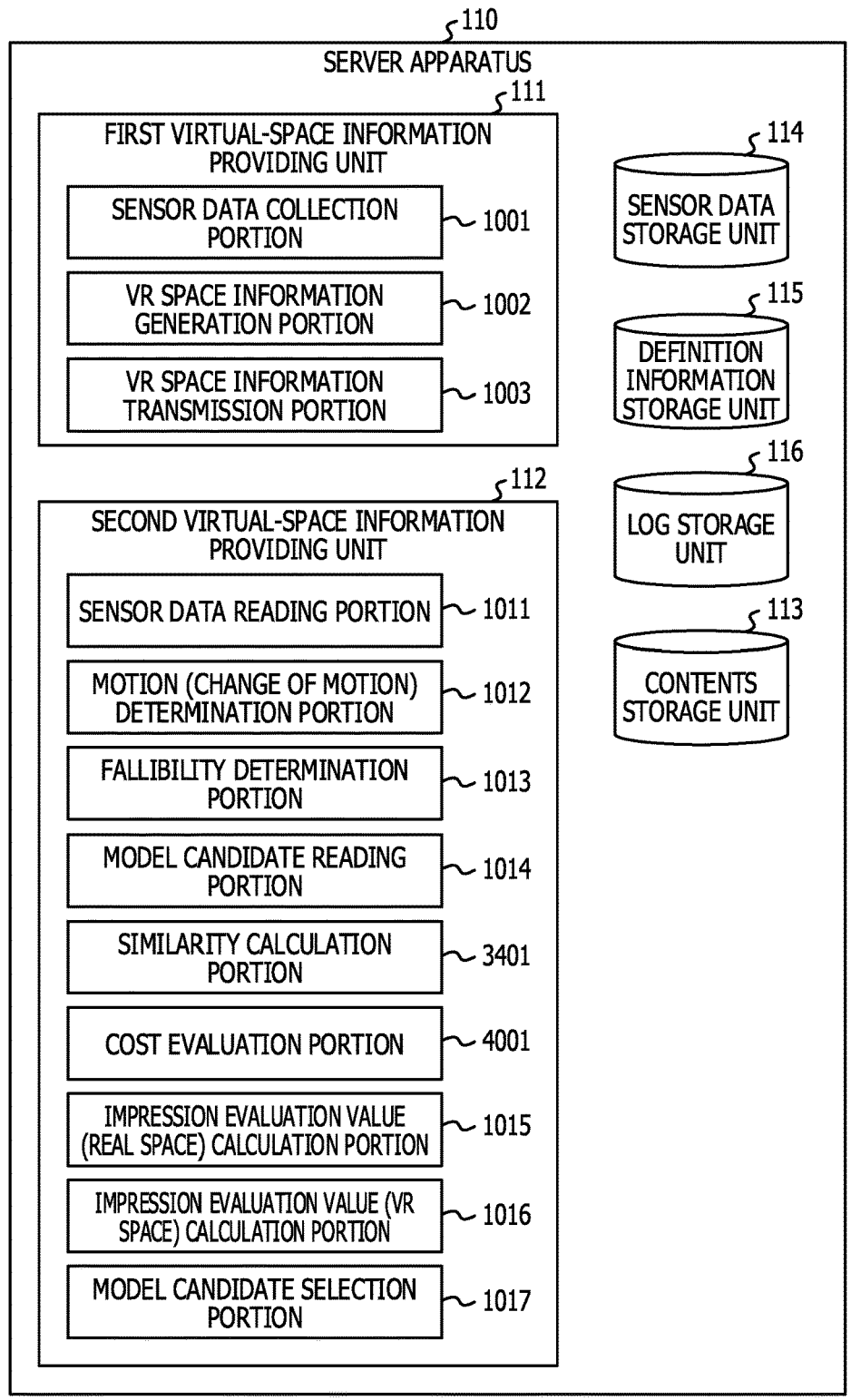
FIG. 40 is a sixth diagram illustrating an example of the functional configuration of the server apparatus.

Firstly, a functional configuration of the server apparatus 110 according to the sixth embodiment will be described. FIG. 40 is a sixth diagram illustrating an example of the functional configuration of the server apparatus. The functional configuration illustrated in FIG. 40 is different from the functional configuration illustrated in FIG. 34 in that a cost evaluation portion 4001 is provided.

The cost evaluation portion 4001 calculates cost for a posture of the avatar, which is specified by each of a plurality of model candidates of which a notification is performed by the similarity calculation portion 3401. The cost evaluation portion 4001 extracts a model candidate which causes the calculated cost to be equal to or less than a predetermined threshold value, as a model candidate.

Cost Calculated by Cost Evaluation Portion

FIGS. 41A to 41F are diagrams illustrating cost calculated by the cost evaluation portion 4001. The cost evaluation portion 4001 assigns a weight to each region of the avatar in advance. Here, the weight of 4 kg is assigned to the head of the avatar, and the weight of 8 kg is assigned to the chest of the avatar.

As illustrated in FIG. 41A, in a case of a posture in which the spine and the head are stretched straight, the weight of the upper body (head and chest) is in a state of being supported by the lower body, and the upper body is in a state where cost is smallest. Specifically, the weight m of the upper body satisfies an expression of 4 kg+8 kg=12 kg, but the cost of the upper body satisfies an expression of cost $C = m \times \cos \theta = 12 \times \cos 90° = 0$.

As illustrated in FIGS. 41B and 41C, in a case of a posture in which the waist is bent and thus the upper body is inclined, the weight of the upper body is desired to be supported by the upper body, and the cost of the upper body becomes large. For example, in a case where an inclination of the upper body to the bottom surface is set as 0, cost applied to the head which is the top end of the upper body satisfies an expression of cost $C = \frac{1}{2} \times m \times \cos \theta \times \cos \theta$.

The cost of the upper body varies depending on whether or not a state where the upper body is supported occurs, and depending on an object which supports the upper body. FIG. 41D illustrates a state where the upper body is supported by the backrest of a chair, and the like. In this case, it can be considered that the weight of a lower side than a position at which the upper body is supported is countervailed by the backrest of a chair and the like, and this weight is not applied to calculation of the cost. That is, in a case of FIG. 41D, only the weight (m=4 kg) of the head is used for calculating the cost.

Similarly, FIG. 41E illustrates a state where the upper body is supported by putting the elbow on a desk. In this case, it can be also considered that the weight of a lower side than a position at which the upper body is supported is countervailed by putting the elbow on the desk, and this weight is not applied to calculation of the cost. That is, in a case of FIG. 41E, only the weight (m=4 kg) of the head is used for calculating the cost.

FIG. 41F illustrates a state where the head is supported by putting the elbow on a desk. In this case, because the supported location is the head, the weight of a lower side than the head is not applied to calculation of the cost. That is, in a case of FIG. 41F, the cost C becomes zero.

Secondary Model-Candidate Narrowing Processing

Figure 42:
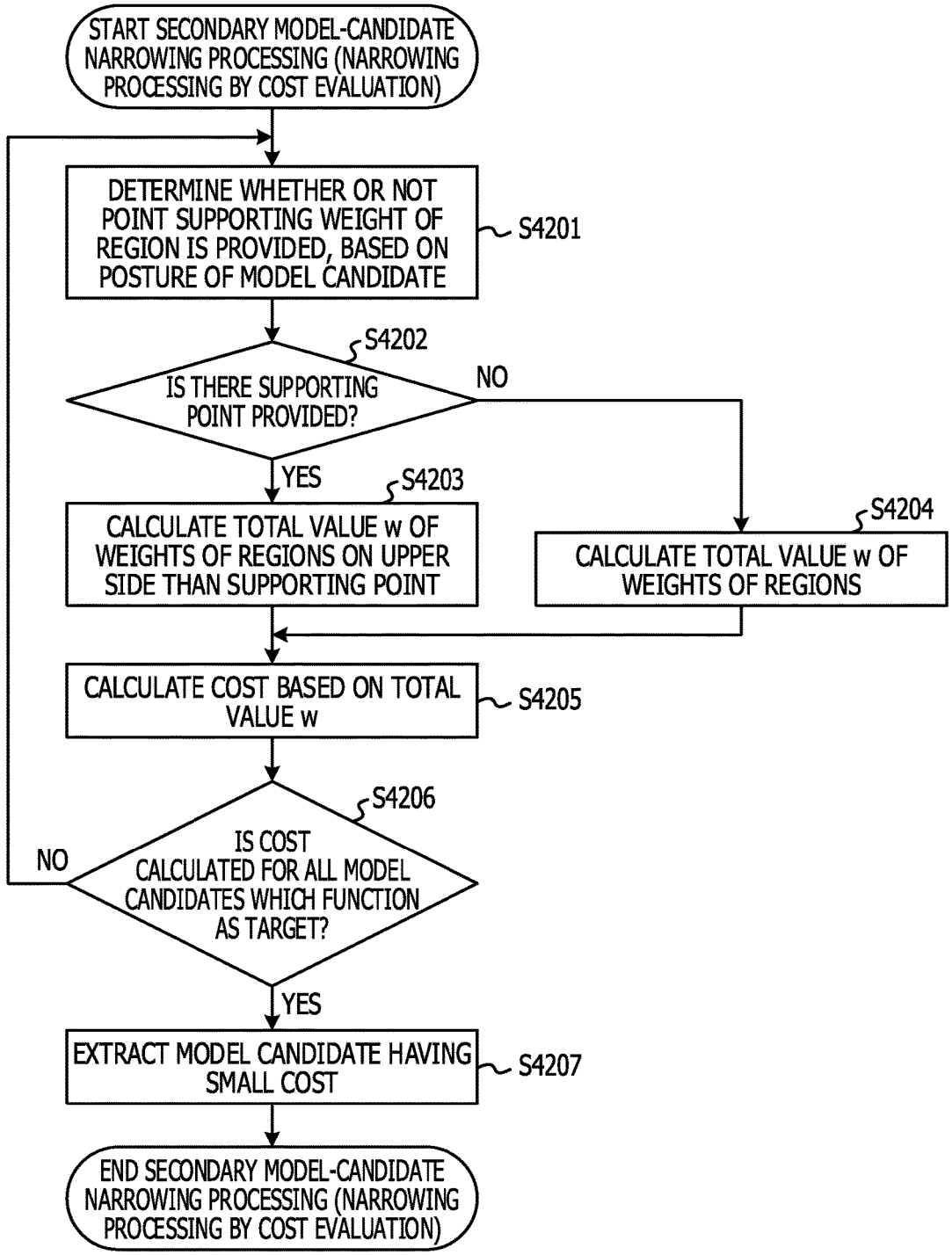
FIG. 42 is a second flowchart illustrating the secondary model-candidate narrowing process.

Next, the secondary model-candidate narrowing processing in the sixth embodiment will be described. FIG. 42 is a second flowchart illustrating the secondary model-candidate narrowing processing. In Step S4201, the cost evaluation portion 4001 analyzes a posture specified by a model candidate of which a notification is performed by the similarity calculation portion 3401, and the cost evaluation portion 4001 determines whether or not the avatar is in a state of being supported, and determines what supports the avatar, by using an rotation angle of the corresponding region. For example, the cost evaluation portion 4001 easily determines whether a rotation angle of a region lower than the chest is a rotation angle obtained by the backrest of a chair supporting the region, or whether a rotation angle of an upper arm or a lower arm is a rotation angle obtained by supporting the chest or the head. As another form, determination may be performed by using, for example, color image data which is one of the input sensor data.

As a result of the determination in Step S4201, in a case where it is determined that the posture of the avatar is not in the state of being supported (No in Step S4202), the process proceeds to S4204 from Step S4202. In Step S4204, the cost evaluation portion 4001 calculates the total value w by summing weights assigned to the regions of the avatar.

As a result of the determination in Step S4201, in a case where it is determined that the posture of the avatar is in the state of being supported (Yes in Step S4202), the process proceeds to S4203 from Step S4202. In Step S4203, the cost evaluation portion 4001 calculates the total value w by summing weights which are assigned to regions on an upper side than the supported location, among weights assigned to all of the regions of the avatar.

In Step S4205, the cost evaluation portion 4001 calculates a cost for the model candidate as a processing target, based on the total value w. The numerical value itself of the weight may be used as cost. A numerical value obtained by performing normalization on the assumption that a value when θ is 0 is the maximum value may be used as the cost.

In Step S4206, the cost evaluation portion 4001 determines whether or not cost is calculated for all model candidates of which a notification is performed by the similarity calculation portion 3401.

In Step S4206, in a case where it is determined that there is a model candidate for which the cost is not calculated (No in Step S4206), the process returns to Step S4201, and cost for the next model candidate is calculated. In Step S4206, in a case where it is determined that cost has been calculated for all of the model candidates (Yes in Step S4206), the process proceeds to Step S4207.

In Step S4207, the cost evaluation portion 4001 extracts a model candidate for which the calculated cost is equal to or less than a predetermined threshold value. The cost evaluation portion 4001 notifies the impression evaluation value (VR space) calculation portion 1016 of the extracted model candidate, and then the secondary model-candidate narrowing processing is ended.

In this manner, in the image generating system 100 according to the sixth embodiment, the secondary narrowing processing of a model candidate is performed based on cost which is calculated based on a posture specified by a model candidate. Thus, it is possible to extract a model candidate including a posture occurring by a person in the real space unconsciously acting, as a model candidate which has priority higher than a model candidate including a posture of which an occurrence desires that a person in the real space consciously doing behavior.

Seventh Embodiment

In the sixth embodiment, the secondary narrowing processing of a model candidate is performed based on cost which is calculated based on a posture specified by a model candidate. On the contrary, in a seventh embodiment, predetermined weighting is performed on cost which is calculated based on a posture specified by a model candidate, and the secondary narrowing processing of a model candidate is performed based on the weighted cost which has been calculated. The seventh embodiment will be described below focused on a difference from the sixth embodiment.

Functional Configuration of Server Apparatus

Figure 43:
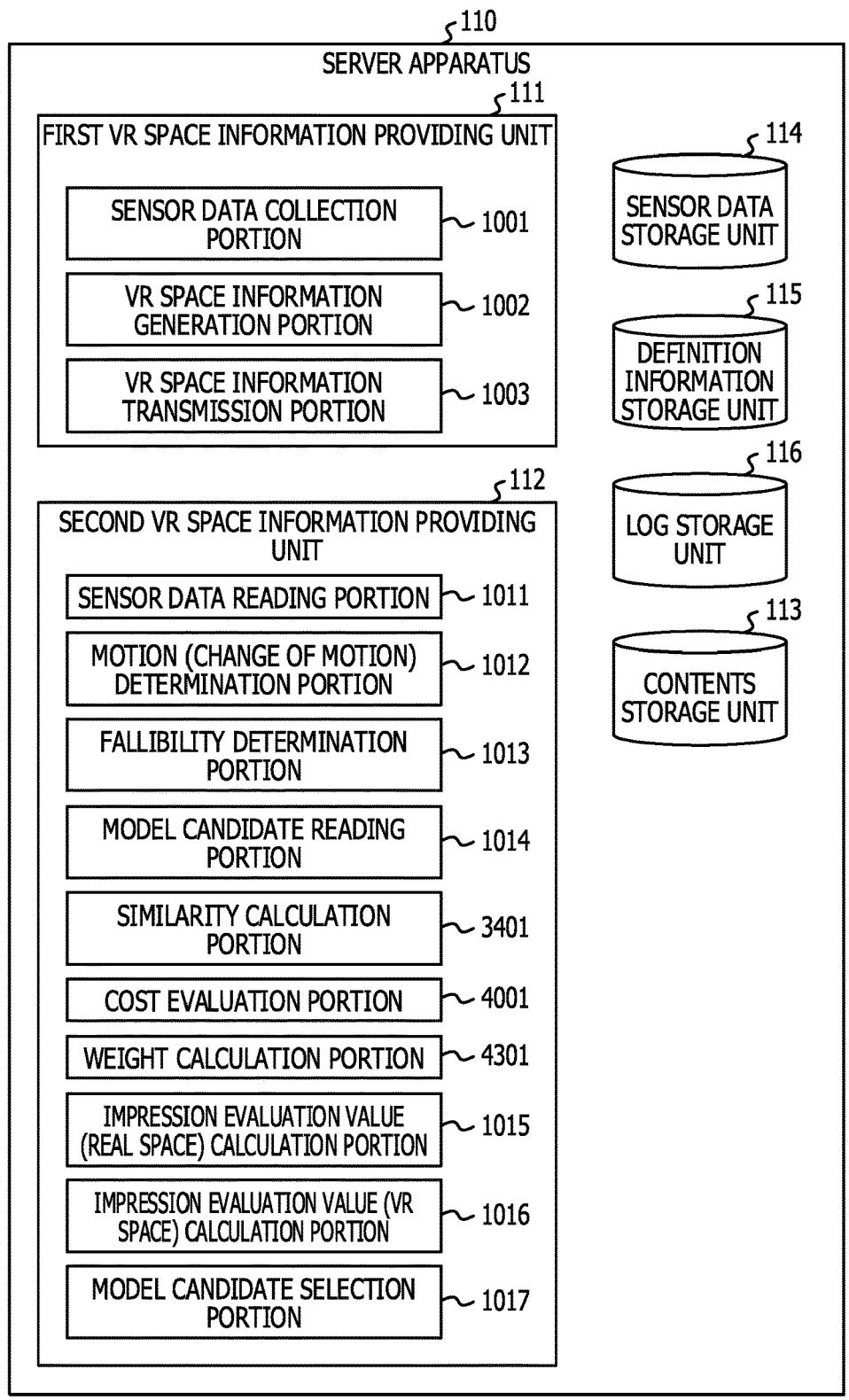
FIG. 43 is a seventh diagram illustrating an example of the functional configuration of the server apparatus.

Firstly, a functional configuration of the server apparatus 110 according to the seventh embodiment will be described. FIG. 43 is a seventh diagram illustrating an example of the functional configuration of the server apparatus. The functional configuration illustrated in FIG. 43 is different from the functional configuration illustrated in FIG. 40 in that a weight calculation portion 4301 is provided.

The weight calculation portion 4301 classifies postures of the avatar, which are respectively specified by a plurality of model candidates of which a notification is performed by the similarity calculation portion 3401, into plural types of groups. The weight calculation portion 4301 recognizes a model candidate belonging to each of the groups.

The weight calculation portion 4301 counts the number of model candidates classified as each of the groups, and thus calculates a frequency value (weighting coefficient) of each of the groups. The weight calculation portion 4301 multiplies a frequency value (weighting coefficient) of a group to which each of the model candidates belongs, by cost of each of the model candidates, which has been calculated by the cost evaluation portion 4001, so as to calculate the weighted cost.

The weight calculation portion 4301 extracts a model candidate in which the weighted cost which has been calculated is equal to or less than the predetermined threshold value. The weight calculation portion 4301 notifies the impression evaluation value (VR space) calculation portion 1016 of the extracted model candidate.

Secondary Model-Candidate Narrowing Processing

Figure 44:
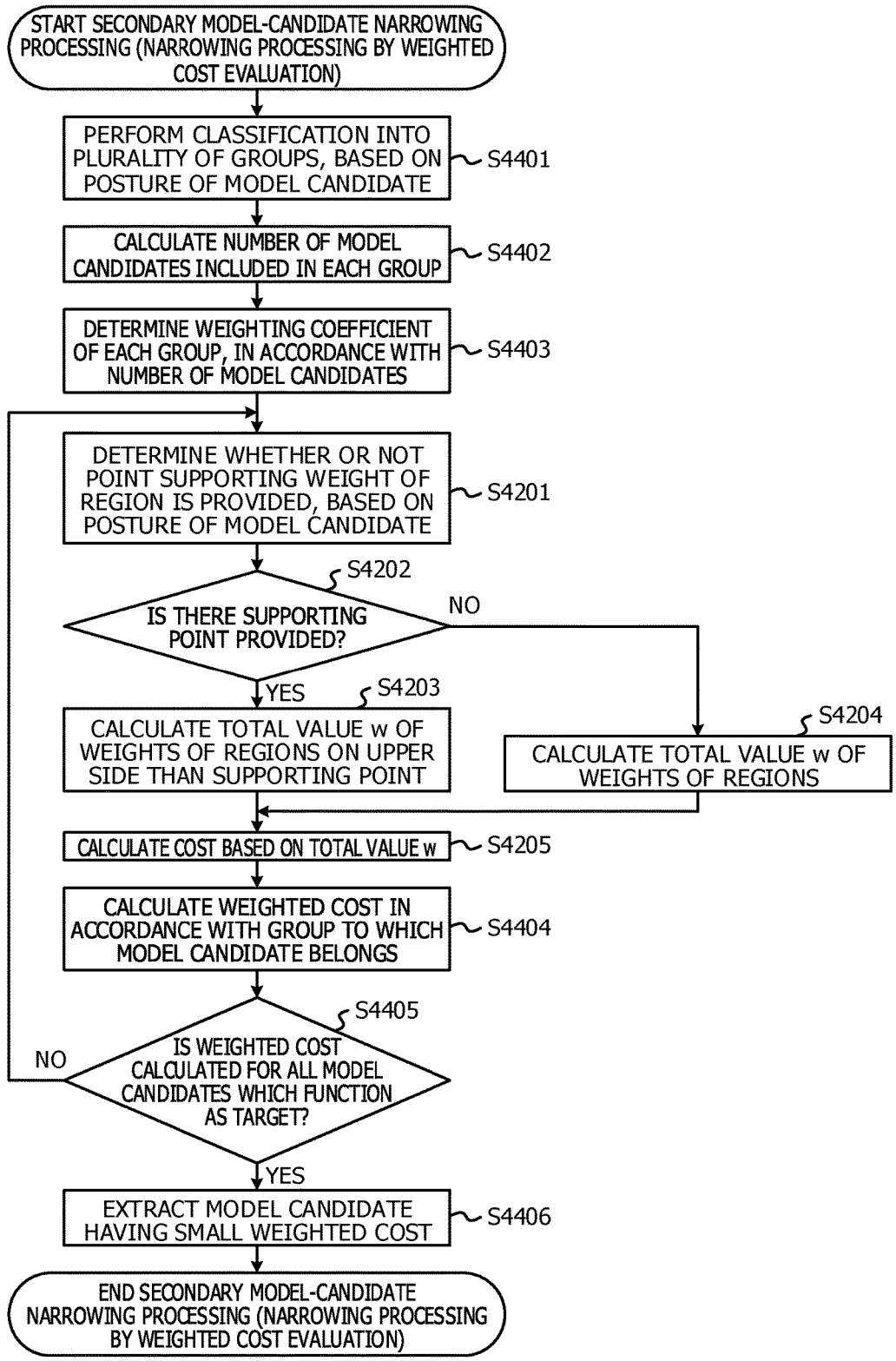
FIG. 44 is a third flowchart illustrating the secondary model-candidate narrowing process.

Next, the secondary model-candidate narrowing processing in the seventh embodiment will be described. FIG. 44 is a third flowchart illustrating the secondary model-candidate narrowing processing. In Step S4401, the weight calculation portion 4301 analyzes a posture specified by a model candidate of which a notification is performed by the similarity calculation portion 3401. The weight calculation portion 4301 classifies analyzed postures into plural types of groups, and recognizes a model candidate belonging to each of the groups.

In Step S4402, the weight calculation portion 4301 counts the number of model candidates which have been classified in Step S4401, and respectively belong to the groups. In Step S4403, the weight calculation portion 4301 calculates a frequency value (weighting coefficient) of each of the groups, based on the counted number of model candidates. The process proceeds to Step S4201.

Because processes of Step S4201 to Step S4206 are the same as the processes of Step S4201 to Step S4206 in FIG. 42, descriptions thereof will be omitted.

In Step S4404, the weight calculation portion 4301 multiplies a frequency value (weighting coefficient) of a group to which each of the model candidates belongs, by cost of each of the model candidates, which has been calculated in Step S4206, and has been obtained by normalizing each of the model candidates, so as to calculate the weighted cost.

In Step S4405, the weight calculation portion 4301 determines whether or not the weighted cost is calculated for all model candidates of which a notification is performed by the similarity calculation portion 3401.

In Step S4405, in a case where it is determined that there is a model candidate for which the weighted cost is not calculated (No in Step S4405), the process returns to Step S4301, and weighted cost for the next model candidate is calculated. In Step S4405, in a case where it is determined that the weighted cost has been calculated for all of the model candidates (Yes in Step S4405), the process proceeds to Step S4406.

In Step S4406, the weight calculation portion 4301 extracts a model candidate for which the weighted cost which has been calculated is equal to or less than a predetermined threshold value. The weight calculation portion 4301 notifies the impression evaluation value (VR space) calculation portion 1016 of the extracted model candidate, and then the secondary model-candidate narrowing processing is ended.

In this manner, in the image generating system 100 according to the seventh embodiment, the weighting coefficient depending on a frequency of each posture occurring is multiplied by cost calculated from the posture which is specified by a model candidate, so as to calculate the weighted cost. In the image generating system 100 according to the seventh embodiment, the secondary narrowing processing of a model candidate is performed based on the weighted cost which has been calculated. Thus, a model candidate including a posture which occurs by a person in the real space unconsciously acting is preferentially extracted. Accordingly, it is possible to select a model candidate similar to behavior which is actually performed well under this environment.

Eighth Embodiment

In the fifth embodiment, a model candidate is extracted based on a region value of a region connected to the region in which fallibility exceeds the fallibility threshold value. However, in a case of such an extraction method, it is considered that a result that the number of model candidates is small is obtained. Thus, in an eighth embodiment, in a case where the number of model candidates which have been extracted based on region values of regions which are connected to the region in which fallibility exceeds the fallibility threshold value is small, a model candidate is extracted based on a region value of an movement-linking which has high probability of being interlocked with the connected region. The eighth embodiment will be described below focused on a difference from the fifth embodiment.

Functional Configuration of Server Apparatus

Figure 45:
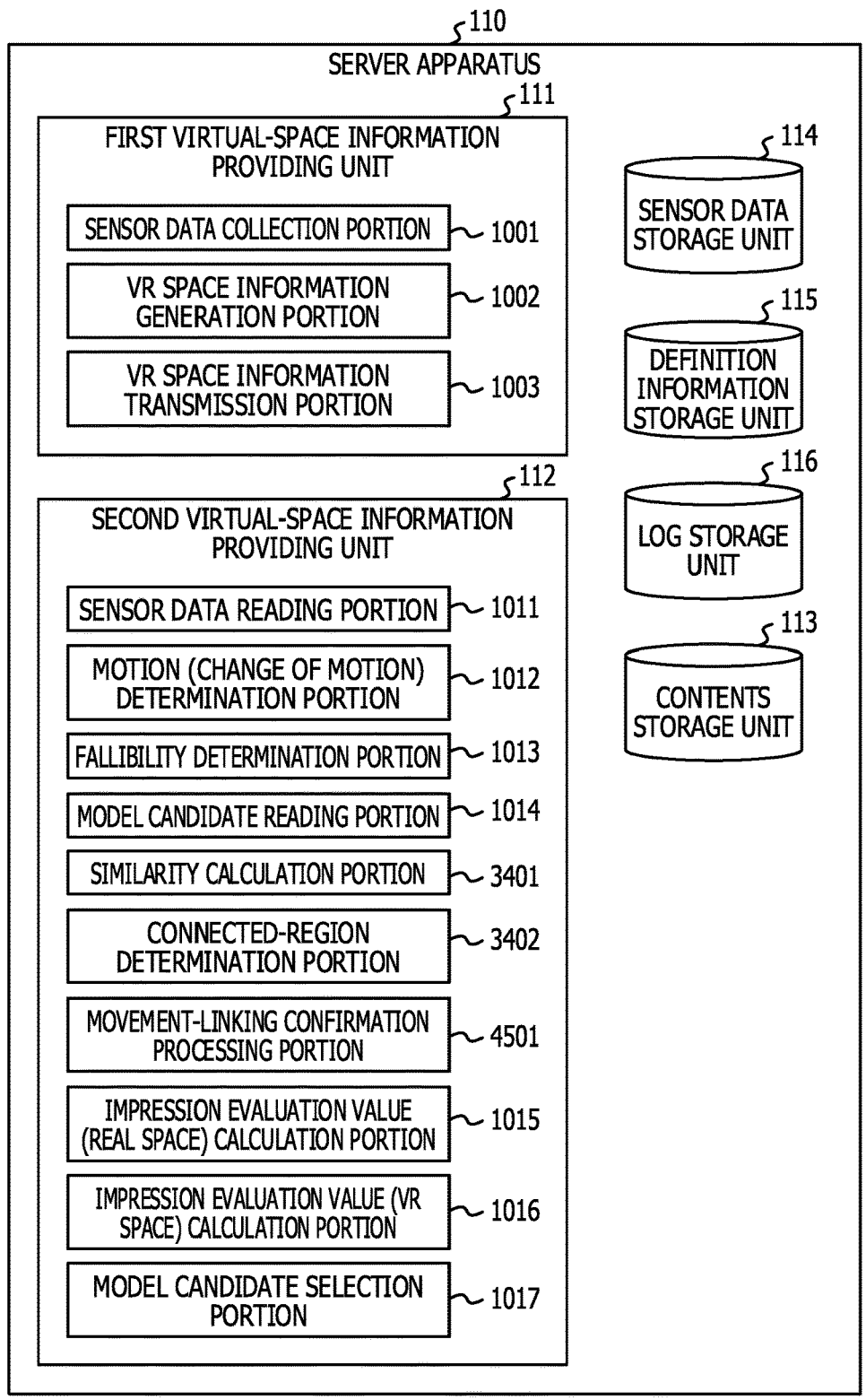
FIG. 45 is an eighth diagram illustrating an example of the functional configuration of the server apparatus.

Firstly, a functional configuration of the server apparatus 110 according to the eighth embodiment will be described. FIG. 45 is an eighth diagram illustrating an example of the functional configuration of the server apparatus. The functional configuration illustrated in FIG. 45 is different from the functional configuration illustrated in FIG. 34 in that a movement-linking confirmation processing portion 4501 is provided.

The movement-linking confirmation processing portion 4501 determines whether or not the number of model candidates calculated by the secondary model-candidate narrowing processing (FIG. 39) which is performed by the connected-region determination portion 3402 is equal to or less than a predetermined value. In a case where it is determined that the number of model candidates calculated by the secondary model-candidate narrowing processing (FIG. 39) is equal to or less than the predetermined value, the movement-linking confirmation processing portion 4501 extracts other model candidates by using the model candidate of which a notification is performed by the similarity calculation portion 3401.

Specifically, the movement-linking confirmation processing portion 4501 specifies a movement-linking having high probability of being interlocked with a region which is connected to the region in which fallibility exceeds the fallibility threshold value. The movement-linking confirmation processing portion 4501 extracts a model candidate based on a region value of the movement-linking which has been specified. The extraction is performed from model candidates of which a notification is performed by the similarity calculation portion 3401. Thus, the impression evaluation value (VR space) calculation portion 1016 can calculate an impression evaluation value for a model candidate extracted by the connected-region determination portion 3402, and for a model candidate extracted by the movement-linking confirmation processing portion 4501.

Secondary Model-Candidate Narrowing Processing

Figure 46:
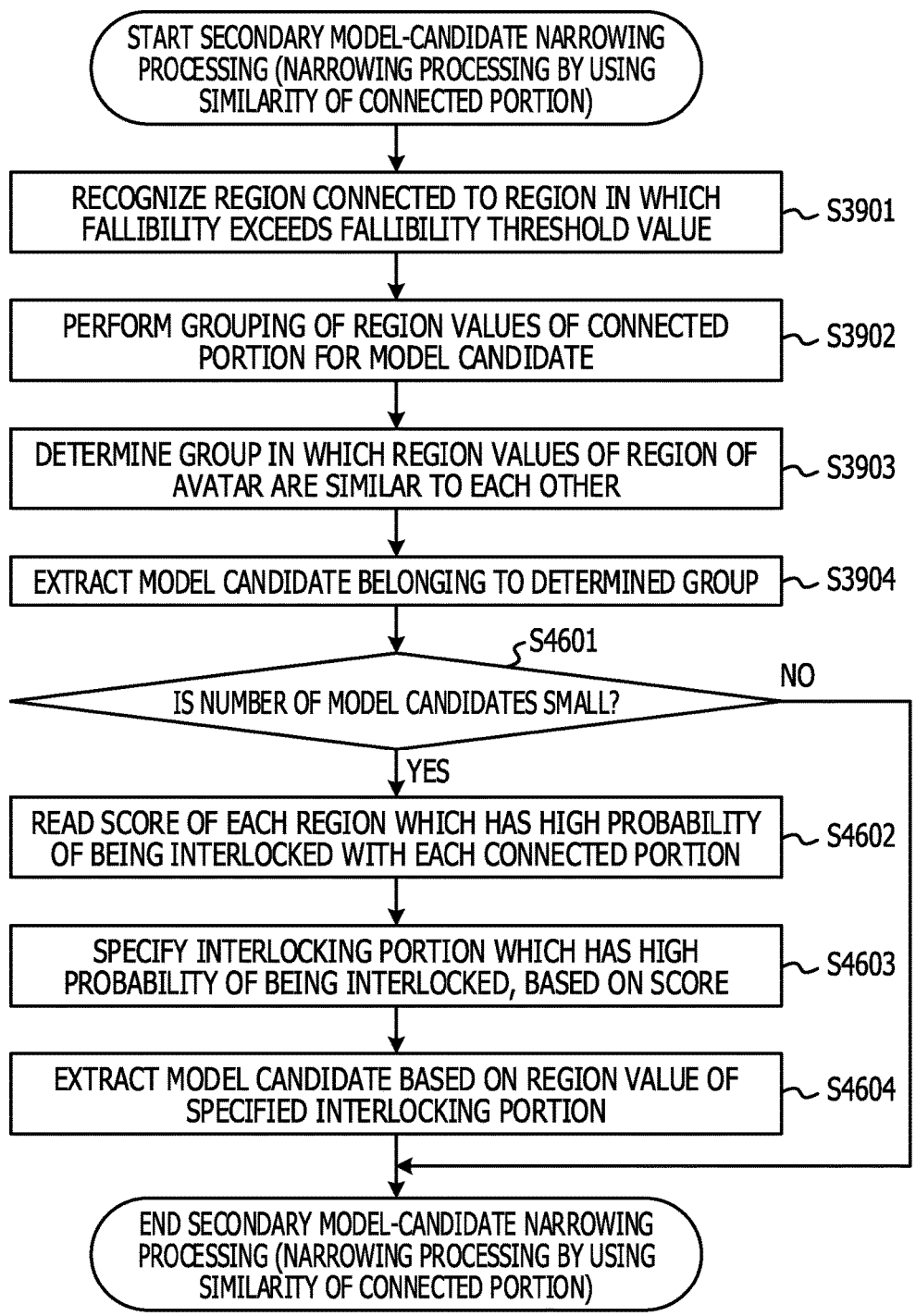
FIG. 46 is a fourth flowchart illustrating the secondary model-candidate narrowing process.

Next, the secondary model-candidate narrowing processing in the eighth embodiment will be described. FIG. 46 is a fourth flowchart illustrating the secondary model-candidate narrowing processing. Processes of Steps S3901 to S3904 are the same as the processes of Steps Step S3901 to S3904 in FIG. 39.

In Step S4601, the movement-linking confirmation processing portion 4501 determines whether or not the number of model candidates extracted in Step S3904 is equal to or less than a predetermined threshold value.

In Step S4601, in a case where it is determined that the number of extracted model candidates is not equal to or less than the predetermined threshold value (No in Step S4601), the movement-linking confirmation processing portion 4501 determines that the number of model candidates is not small. The secondary model-candidate narrowing processing is ended.

In Step S4601, in a case where it is determined that the number of extracted model candidates is equal to or less than the predetermined threshold value (Yes in Step S4601), the process proceeds to Step S4602. In Step S4602, the movement-linking confirmation processing portion 4501 reads a score of a region having high probability of being interlocked with a region (connected region) which is connected to the region in which fallibility exceeds the fallibility threshold value. The score of the region having high probability of being interlocked with a region is set to be predetermined.

In Step S4603, the movement-linking confirmation processing portion 4501 specifies a movement-linking having high probability of being interlocked with the connected region, based on the score which has been read in Step S4502.

In Step S4604, the movement-linking confirmation processing portion 4501 extracts a model candidate from model candidates of which a notification is performed by the similarity calculation portion 3401. The extraction is performed based on a region value of the movement-linking specified in Step S4503.

Thus, the impression evaluation value (VR space) calculation portion 1016 can calculate an impression evaluation value (VR space) for a model candidate extracted in Step S3904, and a model candidate extracted in Step S4604.

Details thereof will be described by using a specific example. In the fifth embodiment, regarding region values of each region, a target of grouping is a connected region. However, in the eighth embodiment, the target of grouping also includes a region interlocked to the connected region along with the connected region. It is assumed that connected regions respectively correspond to an upper left arm, the left shoulder, and a throat, and 5 higher regions having high probability of being interlocked to each of the regions are defined as follows by system data (lateral number of a region indicates a score depending on an order of the probability of being interlocked).

(Upper left arm: lower left arm 5, left shoulder 4, right shoulder 3, lower right arm 2, and left wrist 1)

(Left shoulder: upper left arm 5, lower left arm 4, throat 3, left wrist 2, and right shoulder 1)

(Throat: neck 5, head 4, left shoulder 3, right shoulder 2, and chest 1)

The movement-linking confirmation processing portion 4501 calculates the score (for example, the total value, an average value, and the like). The followings indicate a case where scores of connected regions (three regions of an upper left arm, the left shoulder, and a throat) are summed for each of the regions.

(Upper left arm, left shoulder, and throat: [lower left arm 9], [left shoulder 7], right shoulder 6, [upper left arm 5], neck 5, head 4, [throat 3], [left wrist 3], lower right arm 2, and chest 1)

The movement-linking confirmation processing portion 4501 specifies a movement-linking based on the calculated score. The movement-linking confirmation processing portion 4501 extracts a region value of each of regions (right shoulder, neck, head, lower right arm, and chest) which are specified as movement-linkings, from regions of model candidates of which a notification is performed by the similarity calculation portion 3401. The movement-linking confirmation processing portion 4501 performs grouping for each of the regions. The movement-linking confirmation processing portion 4501 extracts a model candidate to which a group in which region values of a region of the avatar are similar to each other belongs.

That is, in the fifth embodiment, a model candidate is extracted based on region values of connected regions (upper left arm, left shoulder, and throat). However, in the eighth embodiment, a model candidate is extracted based on region values of movement-linkings of the upper left arm, the left shoulder, and the neck.

Regarding all regions which have been specified as movement-linkings, a model candidate in which region values of the same region of the avatar are similar to each other may be extracted, or a model candidate in which region values of some regions among regions have been specified as movement-linkings are similar to the region value of the corresponding region of the avatar may be extracted.

In this manner, in the image generating system 100 according to the eighth embodiment, in a case where the number of model candidates which have been extracted based on region values of connected regions is small, a model candidate is extracted based on a region value of an movement-linking which has high probability of being interlocked with the connected region.

Thus, according to the eighth embodiment, even in a case where classification of model candidates by grouping region values for each region is not performed well only by a minute change of the left arm, a model candidate can be classified by using variation of a region value of the right arm side which is interlocked to the left arm side. According to the eighth embodiment, a model candidate which is truly similar to the avatar at each level, which has been calculated by the motion (change of motion) determination portion 1012 and is not displayed yet can be extracted. As a result, for example, it is easy to classify a case where both arms are moved so as to have the similar form, and a case where one arm is not moved and only another arm is moved. After that, variation in an impression occurs in processing and the like of an impression evaluation value which is performed for each of model candidates. Thus, it is possible to reduce probability of erroneously selecting a model in which regions are similar to each other in the vicinity of the connected region, but a different impression in the entirety of an avatar is provided.

Ninth Embodiment

In the second embodiment, a model candidate is read based on tendency of a motion for another avatar. On the contrary, in a ninth embodiment, priority is set in the tendency of a motion for another avatar, and a model candidate is read based on the tendency of the motion for another avatar, and the priority thereof. The ninth embodiment will be described below focused on a difference from the second embodiment.

Definition Information in which Relation Between Type of Motion for Another Avatar, Tendency, and Priority is Defined Firstly, priority of tendency of a motion for another avatar will be described. FIG. 47 is a diagram illustrating an example of definition information in which a relation between the type of a motion for another avatar, tendency, and priority thereof is defined.

As illustrated in FIG. 47, definition information 4700 includes "priority" as an item of the information, in addition to the "type of a motion for another avatar" and the "tendency of closeness/tendency of averting". Priority of the type of a motion for another avatar is stored in the "priority".

Model Candidate Reading Processing

Figure 48:
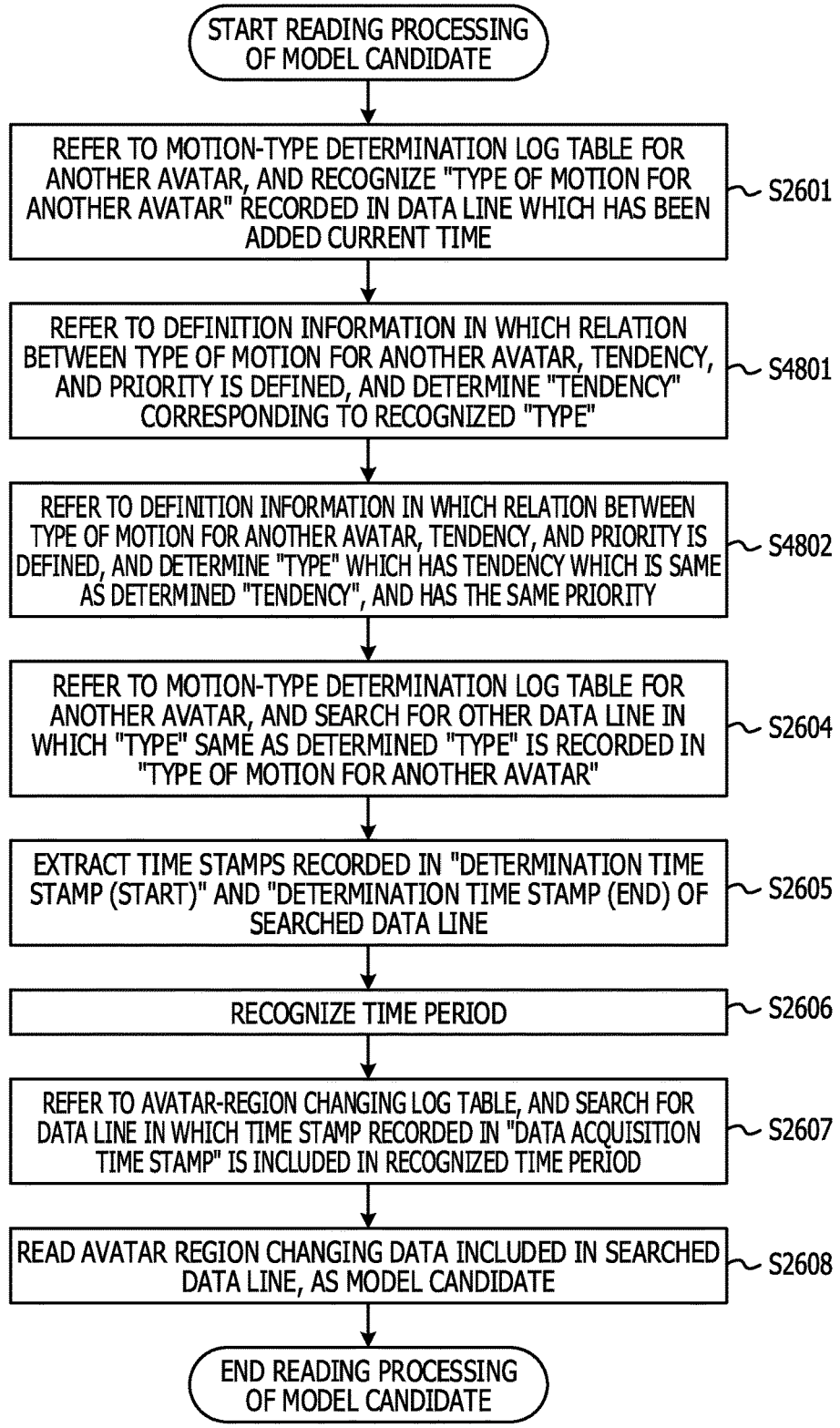
FIG. 48 is a fourth flowchart illustrating the model candidate reading processing.

Next, details of the model candidate reading processing (Step S2502 in FIG. 25) will be described. FIG. 48 is a fourth flowchart illustrating the model candidate reading processing. Processes which are the same as those in the flowchart described by using FIG. 26 are denoted by the same reference signs, and descriptions thereof will be omitted. Steps S4801 and S4802 are different from that in FIG. 26.

In Step S4801, the model candidate reading portion 2102 refers to the definition information 4700, and determines "tendency of a motion for another avatar" corresponding to the "type of a motion for another avatar" which has been recognized in Step S2601.

In Step S4802, the model candidate reading portion 2102 refers to the definition information 4700, and extracts the "type of a motion for another avatar" which has the same tendency as the "tendency" which has been determined in Step S4801, and has the same priority. In a case where the same priority is not provided, the "type of a motion for another avatar" having priority which is closed to the above priority may be extracted. For example, the "type of a motion for another avatar" having priority within a range of plus/minus 1 may be extracted.

In this manner, in the image generating system 100 according to the ninth embodiment, a model candidate is read based on tendency of a motion for another avatar and priority thereof.

Thus, according to the ninth embodiment, regarding impressions to the counterpart of communication for behavior of a user and an avatar, the tendency of closeness/tendency of averting can be set to be the same as each other, and the avatar having priority which is also similar to priority of the social behavior can be displayed.

Tenth Embodiment

According to the second embodiment, regarding each of a plurality of regions of an avatar, even in a case where region values are changed at the same timing, the type of a motion for another avatar is determined for a change of each of the region values. In the second embodiment, each model candidate is read based on tendency which corresponds to the type of a motion for another avatar, which has been determined for a change of each of the region values.

However, the tendency (tendency of closeness/tendency of averting) of social behavior in the real space may be changed by the social behavior being performed simultaneously with another social behavior or by the social behavior being continuously performed. Thus, even in the VR space, the tendency of a motion for another avatar may be changed by a plurality of combinations of motions having different types (motion for another avatar).

Thus, in the tenth embodiment, in a case where motions having different types (motions for another avatar) form a plurality of combinations, and thus the tendency may be changed, reading a model candidate based on the tendency of a motion for another avatar is not performed.

Definition Information in which Relation Between Type of Motion for Another Avatar, Tendency, and Combination Having Probability of Changing Tendency is Defined FIG. 49 is a diagram illustrating an example of definition information in which the type of a motion for another avatar, the tendency, and a combination having a probability of changing the tendency.

As illustrated in FIG. 49, definition information 4900 includes a "combination having a probability of changing tendency" as an item of the information, in addition to the "type of a motion for another avatar" and the "tendency of closeness/tendency of averting". The type of a motion (type of a motion for another avatar) having a probability of changing tendency is stored in the "combination having a probability of changing tendency" by being combined to a motion which has been stored in the "type of a motion for another avatar".

Model Candidate Reading Processing

Figure 50A:
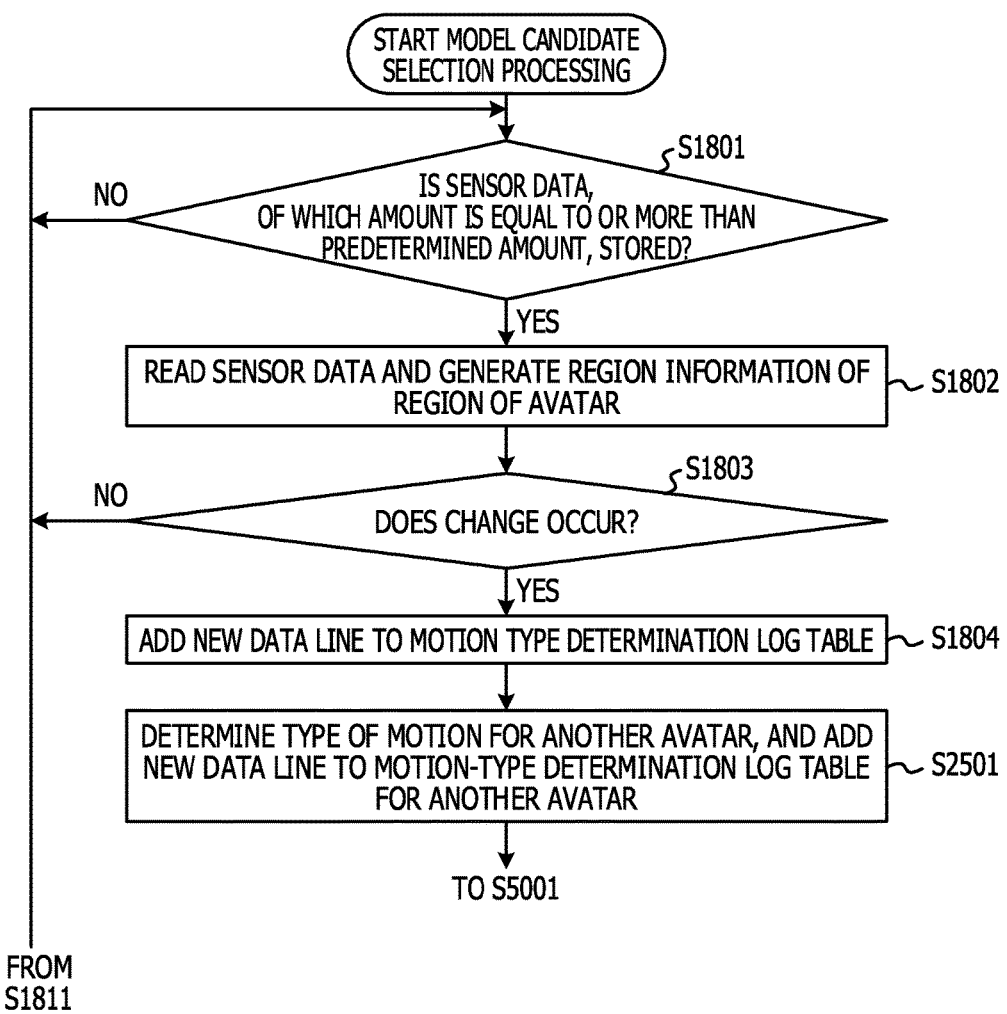
FIGS. 50A and 50B are a fifth flowchart illustrating the model candidate reading processing.
Figure 50B:
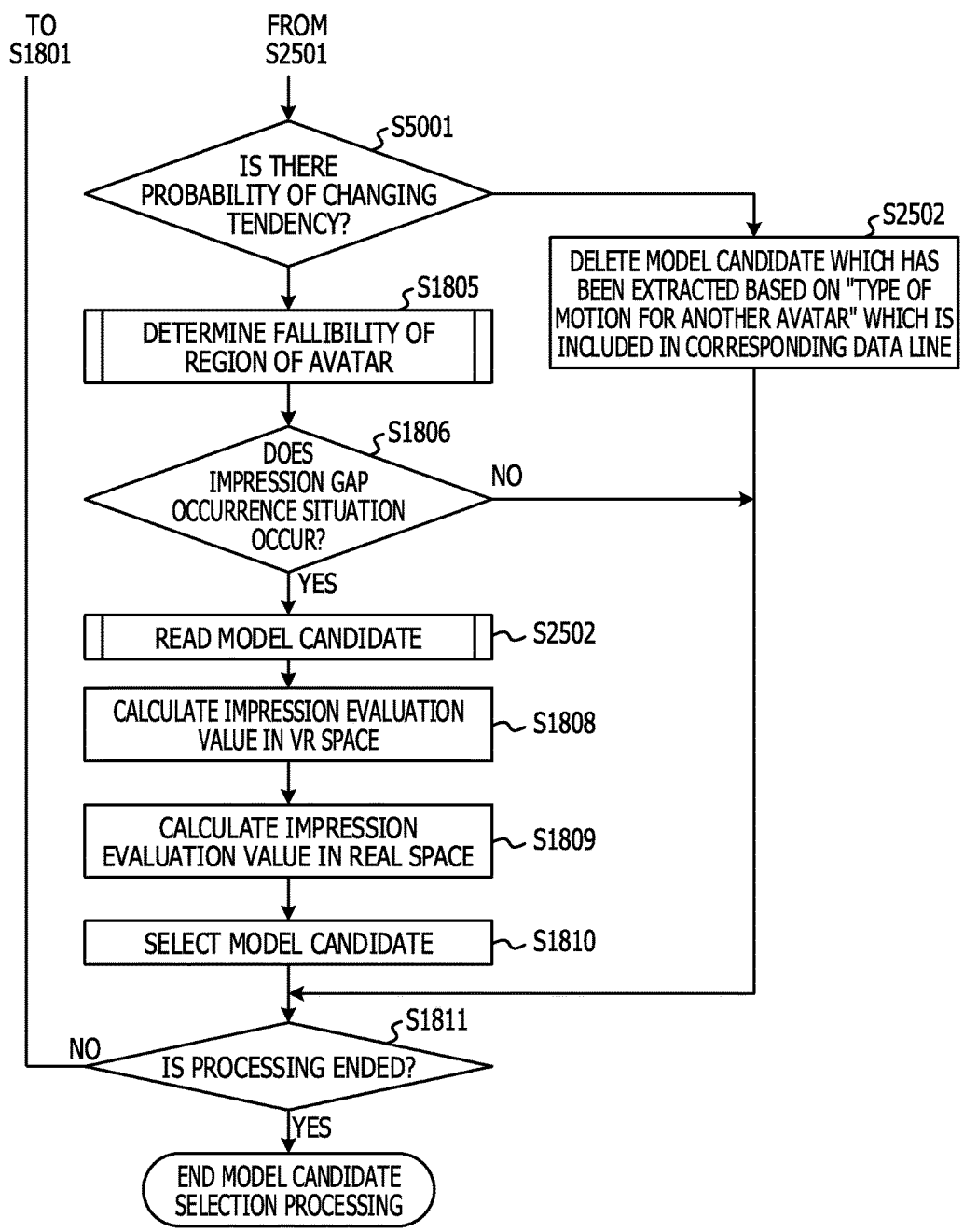

Next, details of the model candidate reading processing (Step S2502 in FIG. 25) will be described. FIGS. 50A and 50B are a fifth flowchart illustrating the model candidate reading processing. Processes which are the same as those in the flowchart described by using FIG. 26 are denoted by the same reference signs, and descriptions thereof will be omitted. Steps S5001 and S5002 are different from that in FIG. 26.

In Step S5001, the motion (tendency) determination portion 2101 refers to the definition information 4900, and thus determines whether or not there is a probability of changing tendency of a motion for another avatar. Specifically, the motion (tendency) determination portion 2101 refers to the motion-type determination log table for another avatar 2400, and extracts time stamps recorded in the "determination time stamp (start)" and the "determination time stamp (end)" by using the data line which has been added in Step S2501. The motion (tendency) determination portion 2101 refers to the motion-type determination log table for another avatar 2400. The motion (tendency) determination portion 2101 searches for a data line having a "determination time stamp (start)" and a "determination time stamp (end)" in a time period overlapping a time period (time period between the "determination time stamp (start)" and the "determination time stamp (end)") which is recognized by using the extracted time stamps. The motion (tendency) determination portion 2101 compares a combination of the "type of a motion for another avatar" of the searched data line, and the "type of a motion for another avatar" of the data line which has been added in Step S2501. The motion (tendency) determination portion 2101 refers to the definition information 4900, and determines whether or not the combination has a probability of changing tendency of a motion for another avatar.

In Step S5001, in a case where it is determined that the combination does not have a probability of changing tendency (No in Step S5001), the process proceeds to Step S1805.

In Step S5001, in a case where it is determined that the combination has a probability of changing tendency (Yes in Step S5001), the process proceeds to Step S5002.

In Step S5002, the model candidate reading portion 2102 deletes a model candidate which has been already read, based on the searched data line.

In this manner, in the image generating system 100 according to the tenth embodiment, a plurality of combinations is formed by motions having a different type (motion for another avatar), and thus reading a model candidate is not performed in a case where the combination has a probability of changing tendency of a motion for another avatar. The model candidate which has been already read is deleted. Processing subsequent to reading of a model candidate is not performed, and thus the VR space information is not updated. Thus, a motion having a probability of tendency of a motion for another avatar is not provided for another user.

Thus, according to the tenth embodiment, it is possible to avoid providing of social behavior in which implication is changed, for another user, in the comparison to the second embodiment.

Other Embodiments

In each of the embodiments, the VR space information generation portion 1002 generates an image of an avatar, and thus the avatar-region displacement log table 2000 of the log storage unit 116 is updated. The updated avatar-region displacement log table 2000 is set as a target of the subsequent reading of a model candidate. However, among pieces of avatar region displacement data stored in the avatar-region displacement log table 2000 of the log storage unit 116, avatar region displacement data which does not satisfy a predetermined condition may be deleted from the log storage unit 116.

The embodiment may be randomly combined, and thus a new embodiment may be obtained. For example, the fifth to the eighth embodiments may be combined with the ninth or the tenth embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image generation apparatus, comprising:
   a memory storing avatar data, the avatar data including a plurality of data sets and each of the data sets represents a motion of an avatar in a virtual space; and
   a processor coupled to the memory and the processor configured to:
   obtain sensor information that represents a motion of a person in a real space acquired from at least one sensor;
   determine, for each body region of the person in the real world, a reliability of the sensor information;
   determine, for each first body region corresponding to the sensor information of which reliability is higher than a threshold, a motion of the first body region based on the sensor information and the avatar data;
   determine, for each second first body region corresponding to the sensor information of which reliability is lower than the threshold, a motion of the second body region based on the sensor information, the avatar data and a first value that indicates an impression of the person in the real world, the first value being determined based on the motion of the first body region; and
   generate an avatar image based on the motion of the first body region and the motion of the second body region.

2. The image generation apparatus according to claim 1, wherein the processor is further configured to determine a type of the motion based on the obtained sensor information, the type of motion representing a social behavior of the person to the another person.

3. The image generation apparatus according to claim 1, wherein
the processor is configured to:
store, after the avatar image is generated, data set that represents the generated avatar image in the memory.

4. An image generation system comprising:
a terminal apparatus; and
an image generation apparatus including:
a memory storing pieces of avatar information, each of the pieces of avatar information indicating a motion of an avatar in a virtual space and being associated with a type of motion; and
a processor coupled to the memory and the processor configured to:
obtain sensor information that indicates a motion of a person in a real space by using one or more sensor devices, the person in the real space corresponding to the avatar in the virtual space;
determine, for each body region of the person in the real world, a reliability of the sensor information;
determine, for each first body region corresponding to the sensor information of which reliability is higher than a threshold, a motion of the first body region based on the sensor information and the pieces of avatar information;
determine, for each second body region correspond to the sensor information of which reliability is lower that the threshold, a motion of the second body region based on the sensor information, the pieces of avatar information and a first value that indicates impression of the person in the real world, the first value being determined based on the motion of the first body region;
and
output, to the terminal apparatus, an avatar image generated based on the motion of the first body region and the motion of the second body region.

5. The image generation system according to claim 4, wherein the processor is further configured to:
determine a type of a motion of a region of the avatar, in a case where a position of a part of the avatar is changed.

6. The image generation system according to claim 4, wherein the processor is further configured to:
determine a type of a motion of a region of the avatar relative to another avatar in the virtual space, in a case where a position of a part of the avatar is changed; and
wherein the processor configured to:
select a specified piece of avatar information based on the type of the motion of the region of the avatar relative to the another avatar.

7. A non-transitory computer-readable storage medium storing an image generation program that causes a computer to execute a process, the process comprising:
obtaining sensor information that indicates a motion of a person in a real space by using one or more sensor devices, the person in the real space corresponding to an avatar in a virtual space;
determining, for each body region of the person in the real world, a reliability of the sensor information;
determining, for each first body region corresponding to the sensor information of which reliability is higher than a threshold, a motion of the first body region based on the sensor information and avatar data of the avatar in the virtual space;
determining, for each second body region corresponding to the sensor information of which reliability is lower than the threshold, a motion of the second body region based on the sensor information, the avatar data and
a first value that indicates impression of the person in the real world, the first value being determined based on the motion of the first body region;
and
outputting, to the terminal apparatus, an avatar image generated based on the motion of the first body region and the motion of the second body region.

8. The image generation apparatus according to claim 4, wherein the processor is further configured to a specified type of motion based on the sensor information,
the specified type of the motion representing a social behavior of the person to the another person.

9. The image generation apparatus according to claim 4, wherein
the processor is configured to:
store, after the avatar image is generated, data set that represents the output avatar image in the memory.

* * * * *